United States Patent
Epstein et al.

(10) Patent No.: US 12,129,963 B2
(45) Date of Patent: *Oct. 29, 2024

(54) MOBILE DEVICE GRIP AND STAND

(71) Applicant: Black Jet Innovations, Inc., Wakefield, MA (US)

(72) Inventors: Jacob Epstein, Concord, MA (US); Lukas Scheurer, Providence, RI (US)

(73) Assignee: Black Jet Innovations, Inc., Concord, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,028

(22) Filed: Nov. 8, 2022

(65) Prior Publication Data

US 2023/0055632 A1   Feb. 23, 2023

Related U.S. Application Data

(63) Continuation of application No. 17/507,739, filed on Oct. 21, 2021, now Pat. No. 11,530,779, which is a
(Continued)

(51) Int. Cl.
*F16M 13/04*   (2006.01)
*F16M 13/06*   (2006.01)
*H04M 1/04*   (2006.01)

(52) U.S. Cl.
CPC ............ *F16M 13/04* (2013.01); *F16M 13/06* (2013.01); *H04M 1/04* (2013.01); *A45F 2200/0516* (2013.01)

(58) Field of Classification Search
CPC  A45F 2200/0516; F16M 13/04; F16M 13/06; H04M 1/04; H04B 1/3888; H04B 2001/3861
See application file for complete search history.

(56) References Cited

U.S. PATENT DOCUMENTS

D251,642 S   4/1979 Ramsey
D514,463 S   2/2006 Levine
(Continued)

FOREIGN PATENT DOCUMENTS

KR   20060134749 A   12/2006
WO   2013138500 A1   9/2013
(Continued)

OTHER PUBLICATIONS

Amazon.com_Inevvay Cell Phone Stand, first available Sep. 14, 2021 [online], retrieved Aug. 31, 2022, available at URL:https://a.co/d/797QSpL (Year: 2021).
(Continued)

*Primary Examiner* — Dean J Kramer
(74) *Attorney, Agent, or Firm* — Nutter McClennen & Fish LLP

(57) ABSTRACT

An extendable grip for a mobile device includes a base configured to couple with a mobile device or a case of the mobile device. The plurality of elastic elements are coupled with the base at a first end. The plurality of elastic elements are coupled with a top at a second end. The plurality of elastic elements are configured to provide an expansion force that biases the top away from the base towards a neutral position when in the collapsed position. The base and the top are configured to produce a magnetic force that biases the top and the base towards one another. The extendable grip has the neutral position and a collapsed position. A distance between the top and the base is greater in the neutral position than in the collapsed position. The magnetic force is stronger than the expansion force in the retracted position.

13 Claims, 42 Drawing Sheets

Related U.S. Application Data continuation-in-part of application No. PCT/US2021/055920, filed on Oct. 20, 2021.

(60) Provisional application No. 63/212,522, filed on Jun. 18, 2021, provisional application No. 63/151,645, filed on Feb. 20, 2021, provisional application No. 63/124,915, filed on Dec. 14, 2020, provisional application No. 63/117,928, filed on Nov. 24, 2020, provisional application No. 63/094,633, filed on Oct. 21, 2020.

(56) References Cited

U.S. PATENT DOCUMENTS

| | | |
|---|---|---|
| D517,154 S | 3/2006 | Otto |
| D579,242 S | 10/2008 | Kilic |
| 7,908,693 B2 | 3/2011 | DeMoss |
| D661,925 S | 6/2012 | DeFranks et al. |
| D667,723 S | 9/2012 | Minamikawa |
| D668,946 S | 10/2012 | Minamikawa |
| D681,980 S | 5/2013 | DeFranks |
| 8,560,031 B2 | 10/2013 | Barnett et al. |
| D692,747 S | 11/2013 | Schwab |
| 8,689,380 B2 | 4/2014 | Gladney et al. |
| D722,965 S | 2/2015 | Perless et al. |
| 9,022,369 B2 | 5/2015 | DeMoss et al. |
| D735,825 S | 8/2015 | Lamkin et al. |
| D748,639 S | 2/2016 | Khodapanah et al. |
| 9,367,090 B2 | 6/2016 | Barnett et al. |
| D774,818 S | 12/2016 | Jorgensen et al. |
| D794,607 S | 8/2017 | Srour |
| 9,804,636 B2 | 10/2017 | Barnett et al. |
| D817,753 S | 5/2018 | Pedley et al. |
| 9,958,107 B1 | 5/2018 | Hobbs et al. |
| 9,970,589 B2 | 5/2018 | Hobbs et al. |
| D820,007 S | 6/2018 | Eigenmann |
| 10,019,034 B2 | 7/2018 | Barnett et al. |
| 10,030,807 B1 | 7/2018 | Hobbs et al. |
| 10,054,259 B2 | 8/2018 | Hobbs et al. |
| 10,060,573 B2 | 8/2018 | Hobbs et al. |
| D827,612 S | 9/2018 | Srour |
| D838,785 S | 1/2019 | Wonner |
| 10,200,518 B2 | 2/2019 | Richter |
| 10,215,329 B2 | 2/2019 | Hobbs et al. |
| 10,244,854 B1 | 4/2019 | Haber et al. |
| D847,805 S | 5/2019 | Lederer |
| 10,317,005 B2 | 6/2019 | Hobbs et al. |
| 10,386,009 B2 | 8/2019 | Hobbs et al. |
| 10,389,860 B2 | 8/2019 | Nahum et al. |
| 10,419,054 B1 | 9/2019 | VanTassell et al. |
| D871,490 S | 12/2019 | Wengreen |
| 10,571,964 B2 | 2/2020 | Barnett et al. |
| D878,350 S | 3/2020 | Stagge |
| D879,089 S | 3/2020 | Richter |
| 10,638,627 B1 | 4/2020 | Stime |
| D883,002 S | 5/2020 | Eigenmann et al. |
| D883,273 S | 5/2020 | Chen |
| 10,655,775 B2 | 5/2020 | Hobbs et al. |
| 10,694,835 B2 | 6/2020 | Peterson et al. |
| 10,721,343 B2 | 7/2020 | Nahum et al. |
| 10,721,434 B2 | 7/2020 | Saito et al. |
| 10,735,572 B2 | 8/2020 | Nahum et al. |
| 10,750,844 B2 | 8/2020 | Peterson et al. |
| 10,774,871 B1 * | 9/2020 | Srour .................. F16C 11/12 |
| D901,483 S | 11/2020 | Kory et al. |
| D921,359 S | 6/2021 | Roth et al. |
| D928,764 S | 8/2021 | Yeo |
| D929,985 S | 9/2021 | Yeo |
| D943,523 S | 2/2022 | Kim |
| D954,696 S | 6/2022 | Li |
| 11,530,779 B2 | 12/2022 | Epstein et al. |
| 2012/0042476 A1 | 2/2012 | Karmatz |
| 2017/0195000 A1 | 7/2017 | Srour |
| 2018/0146078 A1 | 5/2018 | Shin |
| 2020/0217449 A1 | 7/2020 | Barnett |
| 2020/0326030 A1 | 10/2020 | Surani et al. |
| 2020/0329133 A1 | 10/2020 | Surani et al. |
| 2021/0301976 A1 | 9/2021 | Cohen |

FOREIGN PATENT DOCUMENTS

| | | |
|---|---|---|
| WO | 2018187278 A1 | 10/2018 |
| WO | 2020009795 A1 | 1/2020 |
| WO | 2020009820 A1 | 1/2020 |
| WO | 2020027940 A1 | 2/2020 |
| WO | 2020091903 A1 | 5/2020 |
| WO | 2020091904 A1 | 5/2020 |

OTHER PUBLICATIONS

Karmatz M., U.S. Appl. No. 61/375,096, filed Aug. 19, 2010, 6 pages.

Notification of Transmittal of the International Searching Authority, International Search Report—International Application No. PCT/US2021/055920, dated Feb. 3, 2022 together with the Written Opinion of the International Searching Authority, 15 pages.

United States Patent and Trademark Office, Non-Final Office Action for U.S. Appl. No. 29/814,697, dated Sep. 15, 2022, 9 pages.

* cited by examiner

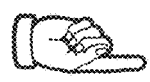
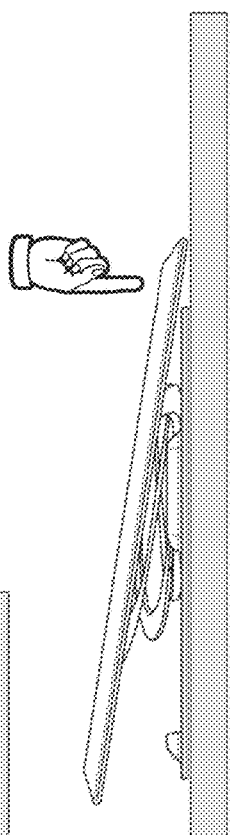
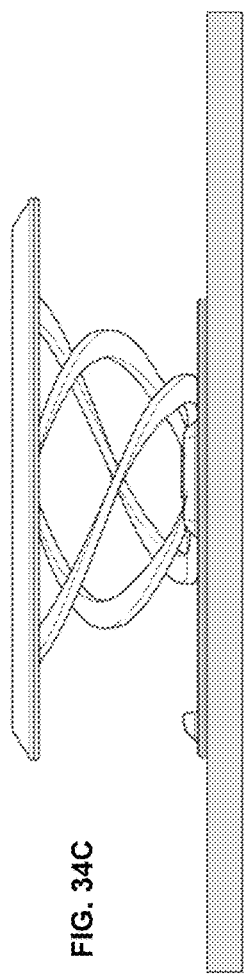
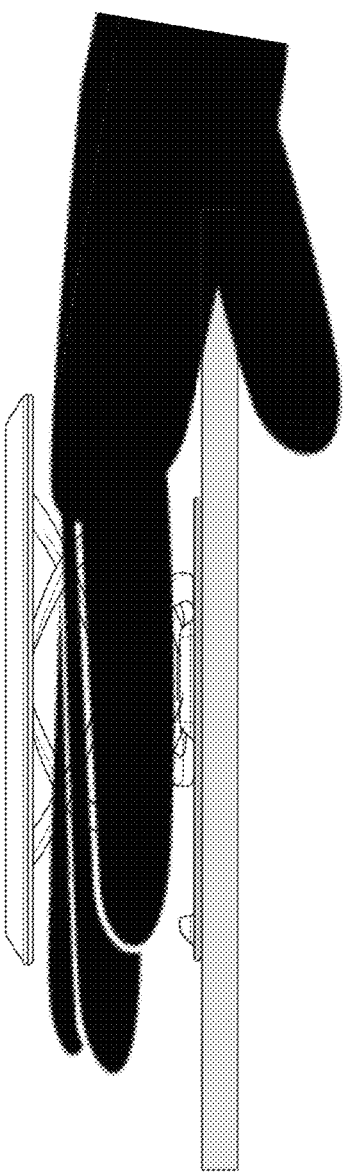
FIG. 34A
FIG. 34B
FIG. 34C
FIG. 34D

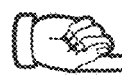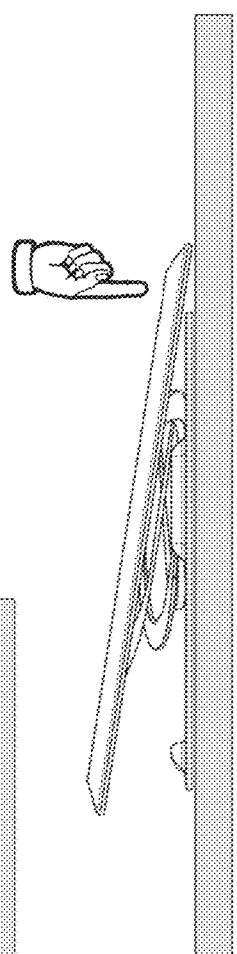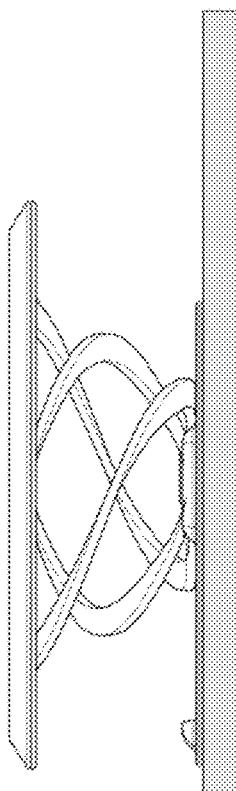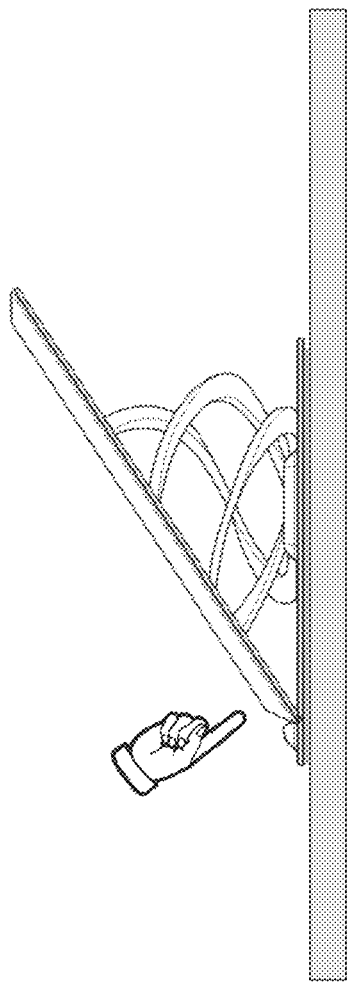
FIG. 35A
FIG. 35B
FIG. 35C
FIG. 35D

MOBILE DEVICE GRIP AND STAND

PRIORITY

This patent application is a continuation of U.S. patent application Ser. No. 17/507,739, which claims priority to U.S. provisional patent application 63/094,633, filed Oct. 21, 2020, U.S. provisional patent application 63/117,928, filed Nov. 24, 2020, U.S. provisional patent application 63/124,915, filed Dec. 14, 2020, U.S. provisional patent application 63/151,645, filed Feb. 20, 2021, and U.S. provisional patent application 63/212,522, filed Jun. 18, 2021, the disclosures each of which are incorporated herein, in their entirety, by reference.

This patent application is also a continuation-in-part of PCT patent application PCT/US21/55920, filed Oct. 20, 2021, which is incorporated herein by reference in its entirety.

FIELD OF THE INVENTION

Illustrative embodiments of the invention generally relate to devices that add physical functionality to an electronic device (e.g., a mobile phone) and, more particularly, illustrative embodiments relate to a device that allow users to more easily grip and/or stand their electronic device up for viewing.

BACKGROUND

Many people use their phones for hours every day for work and entertainment. In order to make holding (or watching) a phone more comfortable and stable, mobile accessory makers have invented a wide variety of straps, rings, knobs and other mechanical devices for the user to get a better grip on their phone while interacting with it.

SUMMARY

Generally, there is a relationship between the bulk of mobile device accessories and their utility. Very thin, sleek accessories are not bulky on a phone, yet they provide the user with limited utility (e.g., a thin strap to put a finger through). Larger accessories offer more volume for the user to grip or prop up their phone on a flat surface, but they add uncomfortable bulk to the phone, make the surface uneven, and prevent easy wireless charging.

There is therefore a need for a very thin mobile accessory which sticks to the back of any mobile device, and which can be expanded and contracted very quickly. There is also a need for the accessory to provide a very stable comfortable grip in the expanded state. There is also a need for the accessory which, in the expanded state, provides a mechanism to prop up the phone on a flat surface as a "kickstand". Illustrative embodiments advantageously provide a phone accessory of minimal thickness that can expand (and contract) to a large profile quickly and easily to provide mechanical stability when holding or propping up a phone. It should therefore be understood that the mobile device accessory, also referred to generally as expandable grip, may operate as a grip and/or a kickstand. Furthermore, although illustrative embodiments refer to a mobile device accessory, it should be understood that various embodiments may be used with non-mobile devices.

One advantage of illustrative embodiments is that in the collapsed state, the expandable grip is extremely thin.

Another advantage of illustrative embodiments is that the expandable grip can be expanded very quickly and easily with one hand (e.g., via single press operation using one finger) to a larger comfortable grip to provide mechanical stability when holding the mobile device.

Another advantage of illustrative embodiments is that the expandable grip can be quickly and easily collapsed back to an extremely thin state.

Another advantage of illustrative embodiments is that, in the expanded state, the expandable grip can be bent such that it provides a rigid "kickstand" to prop up a mobile device for viewing on a flat surface.

In accordance with an embodiment, an extendable grip for a mobile device includes a base configured to couple with a mobile device or a case of the mobile device. The extendible grip includes a plurality of elastic elements having a first and a second end. The plurality of elastic elements are coupled with the base at the first end. The plurality of elastic elements are coupled with a top at the second end. The plurality of elastic elements are configured to provide an expansion force that biases the top away from the base towards a neutral position when in the collapsed position. The base and the top are configured to produce a magnetic force that biases the top and the base towards one another. The extendable grip has the neutral position and a collapsed position. A distance between the top and the base is greater in the neutral position than in the collapsed position. The magnetic force is stronger than (e.g., overcomes) the expansion force in the retracted position.

To that end, the base may be magnetically attractive, and the top may include one or more magnets. Alternatively, the top may be magnetically attractive and the base may include one or more magnets. Additionally, or alternatively, both the top and the base may be formed from or include ferromagnetic material (e.g., be magnetically attractive). Therefore, some embodiments may omit magnets. Furthermore, some embodiments may integrate the base directly into a housing of an electronic device or a case for an electronic device. Accordingly, the base may be formed by the electronic device itself or the case.

In various embodiments, the elastic elements are unsheathed. This advantageously allows a user to position their fingers in direct contact with the elastic elements. To that end, the elastic elements may have a non-polygonal outer edge (e.g., a curved outer edge or a rounded outer edge). Furthermore, the elastic elements may have a greater cross-sectional width than cross-sectional height.

Some embodiments allow the user to transition the device from a collapsed configuration to the neutral configuration by pushing down the top. To that end, the base may have a truncated portion that forms a kick area. Pressing the top down into the kick area may overcome the magnetic attraction and allow the elastic elements to push the top to the neutral position.

In various embodiments, the base includes a detent configured to receive a portion of the top. The top may include corresponding detent holes in the frame configured to receive the detents in the collapsed position. The top may also include a recessed seat configured to receive one or more magnets therein. The base, the plurality of elastic elements, and the top, when in the collapsed position, have a total thickness of less than 5 mm. In some embodiments, the maximum height that the top extends from the base in the collapsed position is about 3 mm or less.

The elastic members may be configured to provide a contraction force that biases the top towards the neutral position when a user force pulls the top away from the neutral position.

In accordance with another embodiment, a method operates an extendable grip for a mobile device. The method provides an extendable grip having a base coupled with a mobile device or a case of a mobile device. The base has a truncated portion that defines a kick area. The extendible grip includes a plurality of elastic elements having a first end and a second end. The plurality of elastic elements are coupled with the base at the first end, and coupled with a top at the second end. The plurality of elastic elements are configured to provide an expansion force that biases the top away from the base. The base and the top are configured to produce a magnetic force that biases the top and the base towards one another. The method transitions the grip from a collapsed position, in which the elastic members are compressed, to a neutral position, in which the elastic members are at a stable extended position, by pressing down on a portion of the top that overhangs the kick area.

In various embodiments, the base is magnetically attractive. The top may include one or more magnets. The one or more magnets may be configured to provide the magnetic force that biases the top towards the base. Among other things, transition may include overcoming the magnetic force that biases the top towards the base. The transitioning may be performed by a user while holding the mobile device using a finger from the same hand that holds the mobile device. The transitioning may be caused by providing a single force on the top over the kick area.

In various embodiments, the extendable grip may be used as a grip by positioning a user's fingers against the plurality of elastic elements (e.g., when in the neutral position). The elastic elements may extend 10 mm to 13 mm from the base in the neutral position. The average finger has a cross-sectional height that is greater than the length that the elastic elements extend. Thus, the top provides a compression force against a user's fingers when the user grips the plurality of elastic elements.

In various embodiments, the extendable grip is used as a stand for the mobile device. To that end, the top may be positioned into or against a detent. Positioning the top into or against the detent may be performed with single-handed operation with the same hand that holds the mobile device.

In accordance with yet another embodiment, a device includes a magnetically attractive base having a truncated portion. The system also has a coupling portion for coupling the magnetically attractive base to a mobile device or a case of a mobile device. The system further includes an elastic array configured to transition from a collapsed state to an expanded state. The elastic array is further configured to move a button from a collapsed position to an expanded position. The elastic array may include magnets that are configured to retain the elastic array in the collapsed state. The total height of the device in the collapsed state is 4 mm or less.

The coupling portion may be an adhesive, and/or use microsuction. The expanded state is a neutral position at which the array is at rest. Magnets may be included to maintain the elastic array in the collapsed state.

The elastic array comprises a plurality of elastic elements. The device may also include a frame at which the elastic elements terminate. The frame may have a pocket to receive a magnet. The base may include a detent. The detent may have a curved outer surface. A cap over the elastic array may also have a curved edge surface.

The elastic elements may have a cross-sectional width to cross-sectional thickness ratio of greater than 1:1 and less than 15:1. The elastic elements may lay flat in the collapsed state. The elastic elements may have a curved contact surface. The elastic elements may form a virtual solid volume.

BRIEF DESCRIPTION OF THE DRAWINGS

The advantages of illustrative embodiments described herein, together with further advantages, may be better understood by referring to the following description taken in conjunction with the accompanying drawings. The drawings are not necessarily to scale; emphasis is instead generally being placed upon illustrating the principles of the embodiments. Unless the context otherwise suggests, like elements are indicated by like numerals.

FIGS. 34A-34D show a process of installing and using the expandable grip on a mobile device as a grip in accordance with illustrative embodiments of the invention.

FIGS. 35A-35D shows a process of installing and using the expandable grip on a mobile device as a stand in accordance with illustrative embodiments of the invention.

DETAILED DESCRIPTION

In various embodiments, the expandable grip is a self-contained mobile accessory that attaches to a mobile device, for example, to provide stability while holding (i.e. "grip") and kickstand functionality to prop a phone up on a surface (e.g., a flat surface) for ease of viewing.

Figure 1:
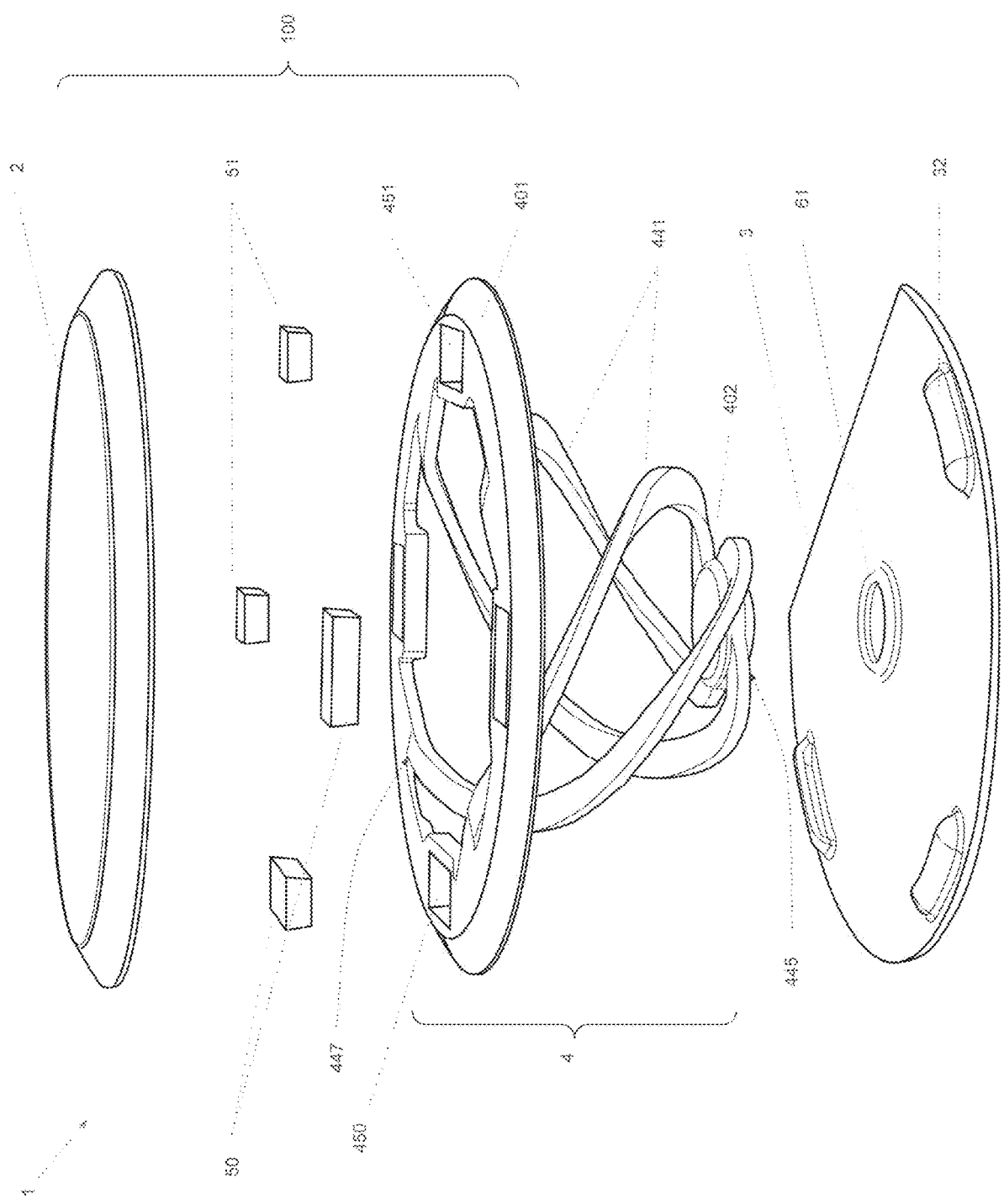
FIG. 1 is an exploded assembly view of the expandable grip in accordance with illustrative embodiments of the invention.

FIG. 1 shows an exploded view of the expandable grip 1. A magnetically attractive baseplate 3 (also referred to as the base, ferromagnetic baseplate or baseplate) is coupled with an elastic array 4 (e.g., via a mechanical connection 61). In various embodiments, the magnetically attractive baseplate 3 is formed from a ferromagnetic material and may also be referred to as the baseplate 3. The baseplate 3 may also include one or more detents 32 that allow the expandable grip 1 to function as a stand, as discussed further below. Although various embodiments refer to the baseplate 3 as being magnetically attractive, in some embodiments, the baseplate 3 may not be magnetically attractive. Furthermore, in some embodiments, the baseplate 3 may be formed from a magnet. Thus, discussion of features with respect to the magnetic baseplate 3 also apply to a non-magnetic baseplate 3, unless the context otherwise requires.

The elastic array 4 contains one or more compressible and expandable elastic elements 441 that may be coupled to a mechanical connection fastener 402 at a first end 445 and an elastic array frame 401 at a second end 447. In some embodiments, elastic array frame 401 may also be referred to as flange 401. One or more primary magnet 50 and one or more secondary magnet 51 are positioned into a primary seat 450 and a secondary seat 451, respectively. In this example, the primary seat 450 and the second seat 451 are recesses or holes within the elastic array frame 401 that are configured to receive the magnets, although the magnets 50, 51 may be secured to the elastic array frame 401 in other ways, e.g., using an adhesive. A cap 2 may be mounted over the elastic array frame 401 to create a flat smooth top surface. Alternatively, the cap 2 may be integrally formed with the frame 401. The cap may also be referred to as a button 2.

FIG. 1 also shows what may be referred to as the top 100. The top 100 may contain the elastic array frame 401, the magnets 50, 51 and the cap 2 as well as any other components which are separated from the baseplate 3 by elastic elements 441. Although the baseplate 3, the elastic array 4, and the top 100 are shown as separate elements, it should be understood that the baseplate 3, the elastic array 4, and/or the top 100 may be formed integrally. Additionally, or alternatively, although the baseplate 3, the elastic array 4, and the top 100 are shown as comprising a number of constituent components, the various components of the baseplate 3, the elastic array 4, and the top 100 may be, but are not necessarily, formed integrally.

Figure 2:
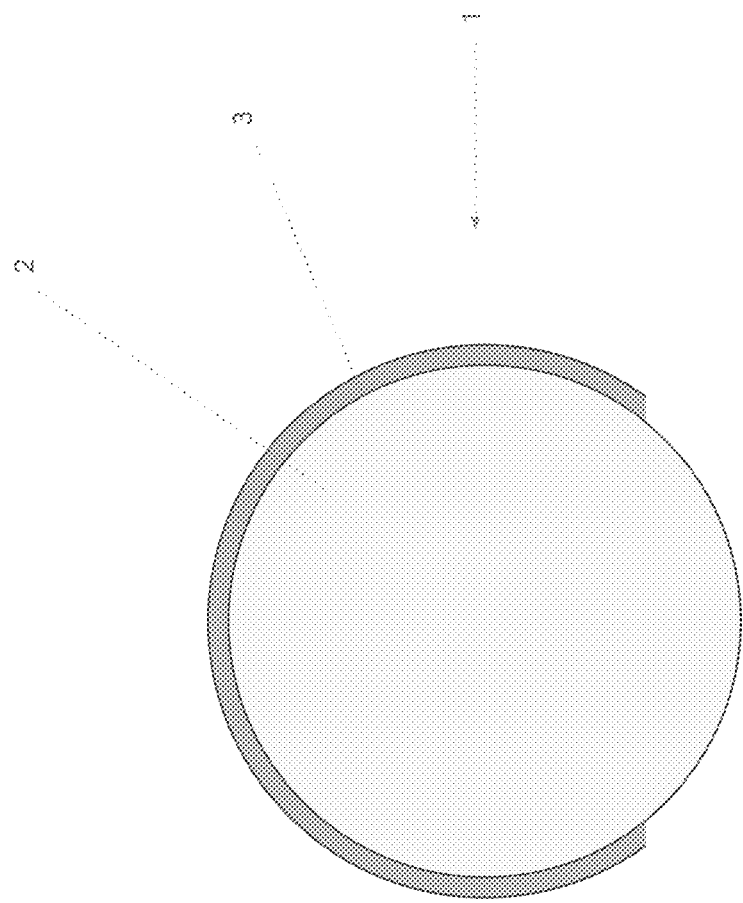
FIG. 2 is a top view of the expandable grip in accordance with illustrative embodiments of the invention.

FIG. 2 shows a top view of the expandable grip 1. Although referred to as a "grip," it should be understood that various embodiments are not limited to, nor necessarily used as, a grip. For example, illustrative embodiments may merely operate as a stand. Additionally, or alternatively, various embodiments may operate as a fidgeting tool. Regardless of the use, the device 1 is referred to herein as the expandable grip 1 for discussion purposes, and reference to a grip is not intended to limit various embodiments.

From the top view, the cap 2 is visible, and possibly, though not necessarily depending on diameter, the baseplate 3 also may be visible. Although the cap 2 is shown having a circular shape, it should be understood that the cap 2 may have other shapes, including, without limitation, a bar, a cross, a hexagon, a triangle, an octagon, etc., and is not limited to any particular shape. Furthermore, although the cap 2 is shown as having a diameter that is roughly within the bounds of the baseplate 3, it should be understood that in some embodiments the cap 2 may have a larger diameter or other major dimension than the baseplate 3.

Figure 3A:
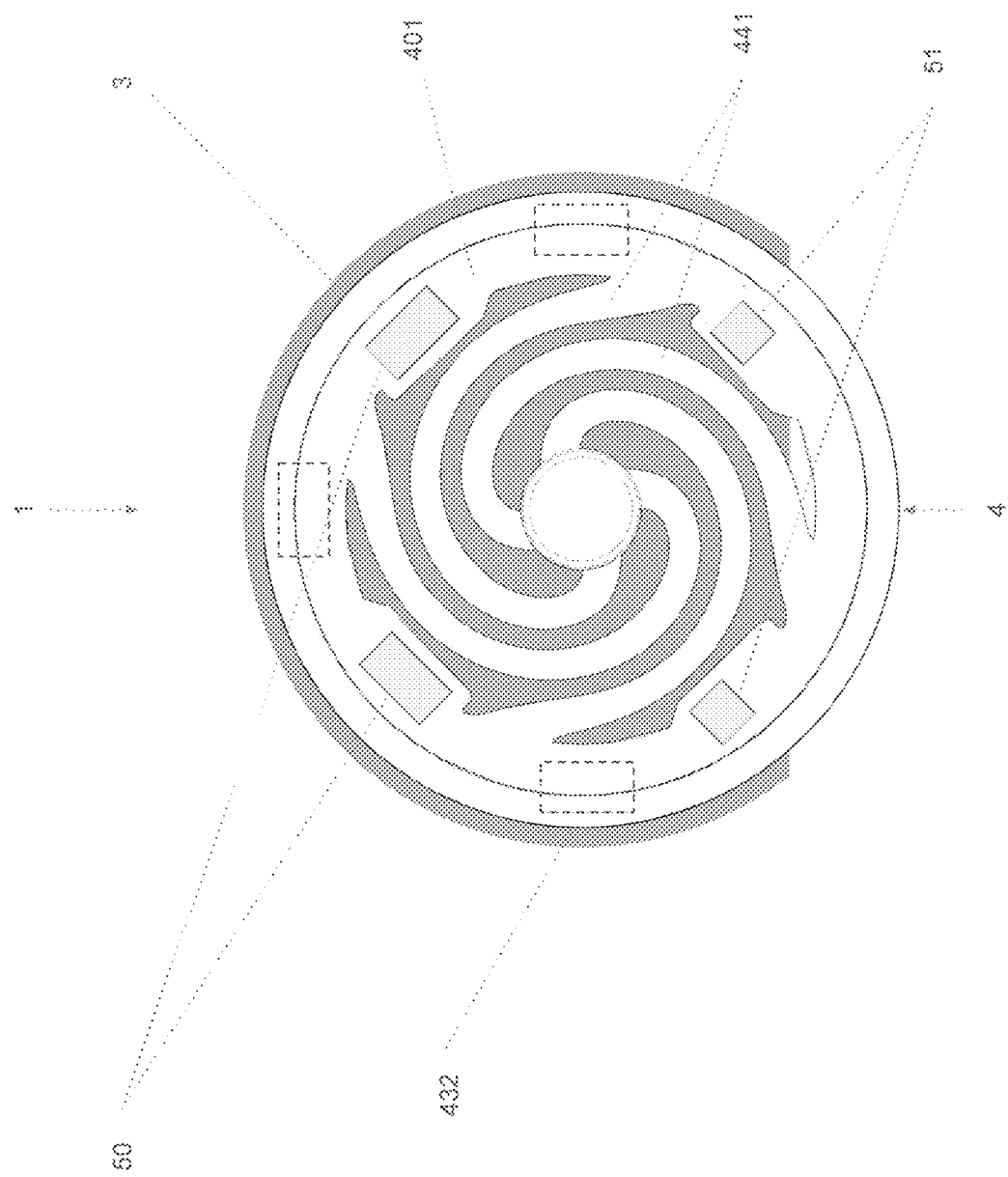
FIG. 3A is a cutoff top view of the expandable grip in accordance with illustrative embodiments of the invention.
Figure 3B:
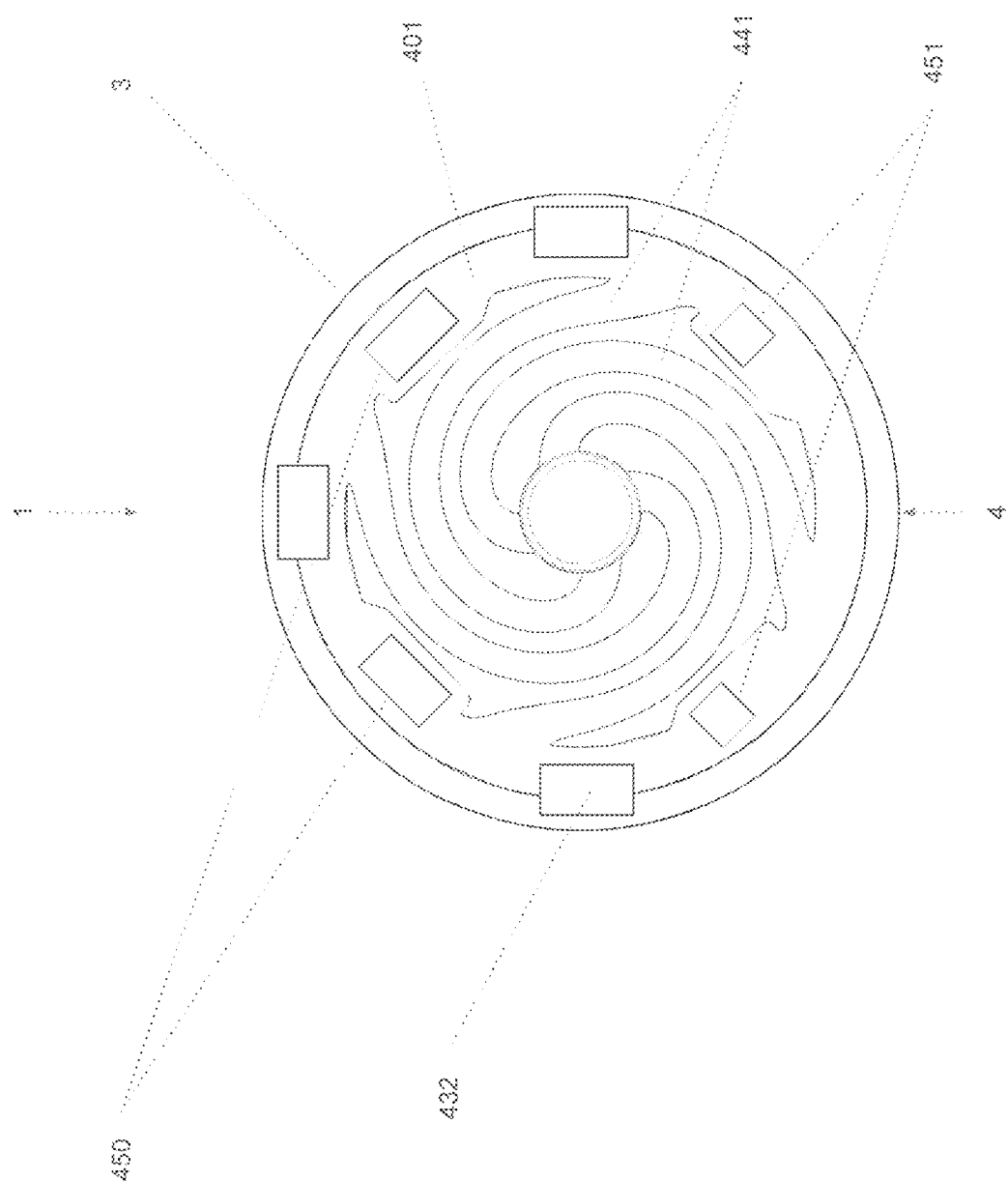
FIG. 3B is a bottom view of an isolated elastic array in accordance with illustrative embodiments of the invention.

FIG. 3A shows a cut off top view of the expandable grip 1. It can be seen that the elastic array 4 is configured such that the integrated magnets 50, 51 are positioned above the baseplate 3 so that, when the device 1 is compressed, a magnetic force is created between the magnets 50, 51 and the baseplate 3. Also, shown in FIG. 3A as dotted lines are detent pockets 432, which are recesses on the underside of the elastic array frame 401 and are configured to receive the detents 32 (not shown in this view). The detent pockets 432 advantageously reduce the thickness of the device 1, as the detents 32 are received in the pockets 432 and add little to no thickness to the overall device 1. Accordingly, in various embodiments, the frame 401 has detent pockets 432 that align with the positions of the detents 32. FIG. 3B shows a bottom view of an isolated elastic array 4 in accordance with illustrative embodiments. The various cavities in the elastic array frame 401 are visible, including primary 450 and secondary 451 seats for primary 50 and secondary 51 magnets, as well as the detent pockets 432.

Figure 4:
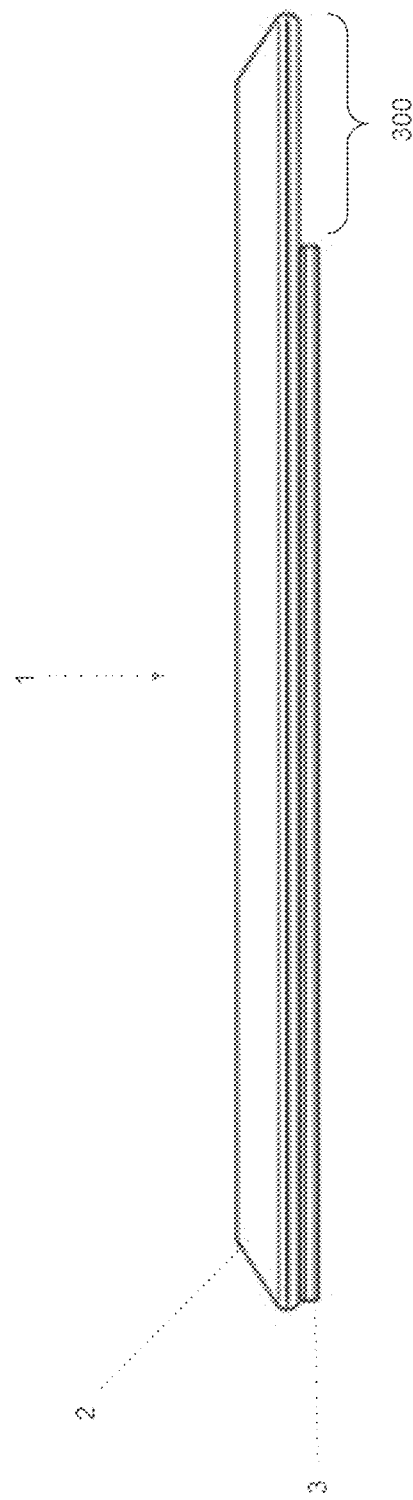
FIG. 4 is a side view of the expandable grip in a collapsed state in accordance with illustrative embodiments of the invention.

FIG. 4 shows a side view of the expandable grip 1. Much like the top view shown in FIG. 2, the only components that may be visible from the side are the cap 2 and the baseplate 3. Also seen in FIG. 4 is kick area 300, which is a gap under the cap 2 where the baseplate 3 is truncated. In some other embodiments, the kick area 300 may be formed by a thinned portion of the baseplate 3 sufficient to allow expanding operation of the expandable grip 1 as discussed below (e.g., as opposed to the kick area 300 formed by a truncated baseplate 3). To that end, the thinned portion may have a clearance of between about 0.1 mm and about 0.5 mm from the cap 2.

Figure 5:
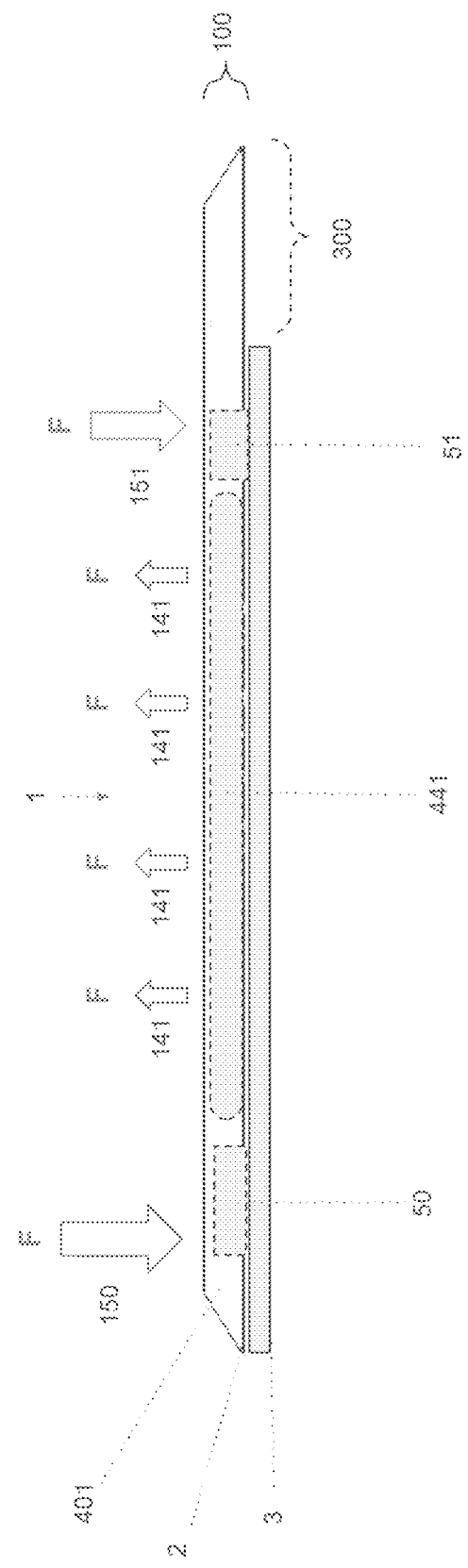
FIG. 5 is a cross-sectional side view of the expandable grip in a collapsed state in accordance with illustrative embodiments of the invention.

FIG. 5 shows a cutoff side view of the expandable grip 1 in a collapsed position with force arrows (141, 150, 151) representing the various forces acting on parts of the grip 1 in the collapsed configuration. For illustration purposes, the detents 32 and detent pockets 432 are not shown in this figure. It can be seen that, in the collapsed position, there are multiple expansion forces 141 from the elastic elements 441 which in this figure are collapsed flat. The elastic elements 441 are biased to push the top 100 towards an expanded position, and, therefore, the expansion forces 141 act to try to push the elastic array frame 401 and the rest of the top upwards away from the baseplate 3. However, in the collapsed state, the magnetic forces 150, 151 overpower the expansion forces 141 and the expandable grip 1 remains collapsed. However, some embodiments may use additional or alternative forces (e.g., magnetic forces in combination with a friction fit or twist lock mechanism, etc.) to hold the expandable grip 1 in the collapsed state.

Figure 6:
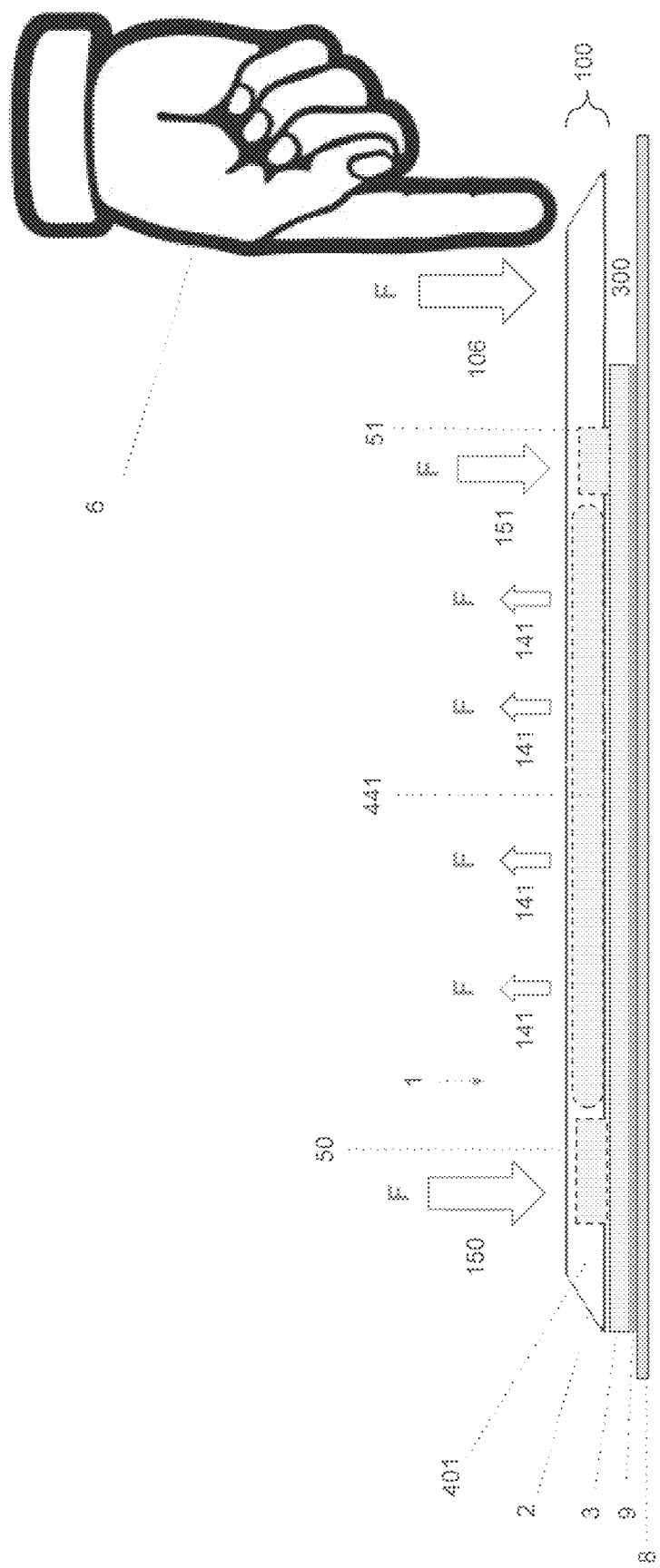
FIG. 6 is a cutoff side view of a user exerting a force to expand the expandable grip of FIG. 5 in accordance with illustrative embodiments of the invention.

FIGS. 6-9 show a process of transitioning the expandable grip 1 from the collapsed position to the expanded position. FIG. 6 shows a user 6 beginning the process of transitioning the grip 1 to an expanded position in accordance with illustrative embodiments. To that end, a user may expand the expandable grip 1 by exerting a user force 106 down on the top of the cap 2 over the kick area 300. In this figure, the expandable grip 1 generally would have been mounted to the back of a mobile device 8 or other surface such as by using an adhesive 9. In some embodiments, however, the grip 1 may be integrated into a mobile device and/or a case thereof. Accordingly, in some embodiments, the base 3 may be formed from a housing of the mobile device and/or case, and may not be a separate component (e.g., elastic members may extend from the device housing).

Figure 7:
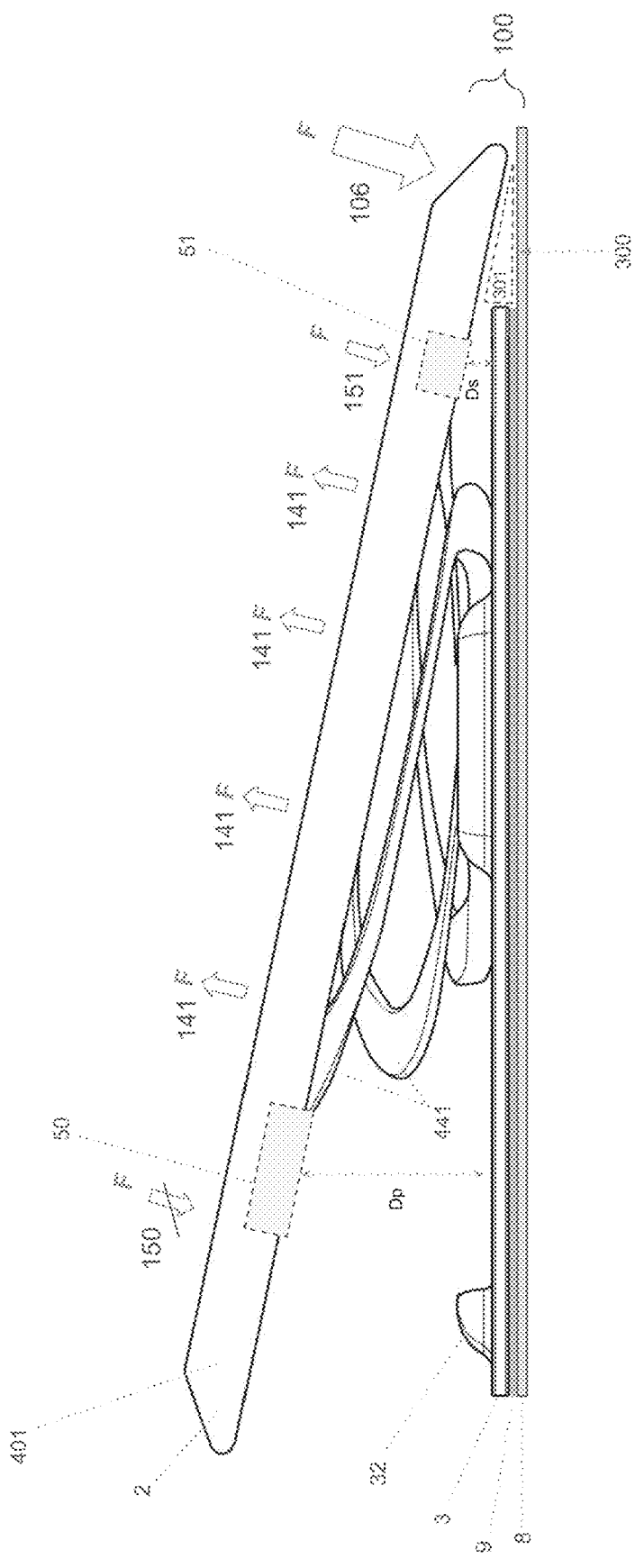
FIG. 7 shows the expandable grip of FIG. 6 expanding in accordance with illustrative embodiments of the invention.

FIG. 7 illustrates the expandable grip 1 beginning to expand after the action shown in FIG. 6. For simplicity, the user 6 has been removed from the drawing but note that the user force 106 may still be present and is shown in the figure. It can be seen in FIG. 7 that the user force 106 on the cap 2 drives one side of the top 100 of the device 1 down through the kick area 300, where it may contact the flat back of the mobile device 8 (or mobile device case) and can be pushed no further. Because the baseplate 3 and adhesive 9 are very thin, a kick angle 301 formed by the top of the device 1 against the surface and baseplate is small. Also, the top of the device 1 is still very close to (or in contact with) the baseplate 3 near the kick area However, despite the small angle and close proximity of the secondary magnets 51 to the baseplate 3 (Ds), the distance between the primary magnets 50 and baseplate 3 is relatively large (Dp). Because magnetically attractive forces are reduced quickly with even small distances between magnetic elements, the primary magnetic force 150 is reduced, e.g., to near zero. The secondary magnetic force 151 may still be present but generally would be greatly reduced since the secondary magnet 51 is fully separated or partly separated from the baseplate 3. Regardless of any residual magnetic force, it can be seen in FIG. 7 that the expansion forces 141 from the elastic elements 441 are still present and now, in the absence of strong uniform magnetic forces 150, 151, are now beginning to push the top 100 of expandable grip 1 upwards. Primary and secondary magnets, regardless of whether they are the same size or not, provide slightly different advantages. For example, the primary magnets primarily compress the biasing element and control the expansion strength. The secondary magnets primarily compress the biasing elements because they are closer to the fulcrum point.

Various embodiments may refer to primary magnets and secondary magnets. It should be understood by one skilled in the art that although various embodiments refer to primary magnets in the plural, that illustrative embodiments may include a single primary magnet. In a similar manner, reference to secondary magnets in the plural is also intended to include illustrative embodiments having a single secondary magnet. Furthermore, it should be understood that the magnets may be positioned in the top, or in/adjacent to the baseplate 3. Thus, the top 100 and/or the baseplate 3 may be magnetically attractive. Furthermore, some embodiments may have magnets on both the baseplate 3 and the top 100 (e.g., primary magnets 50 on the top and secondary magnets on the baseplate 3). In some other embodiments, the baseplate 3 and/or the top 100 may be formed from magnets. Additionally, the baseplate 3 and/or the top 100 may be formed from a magnetically attractive material. Accordingly, some embodiments may omit additional magnets 50, 51

Figure 8:
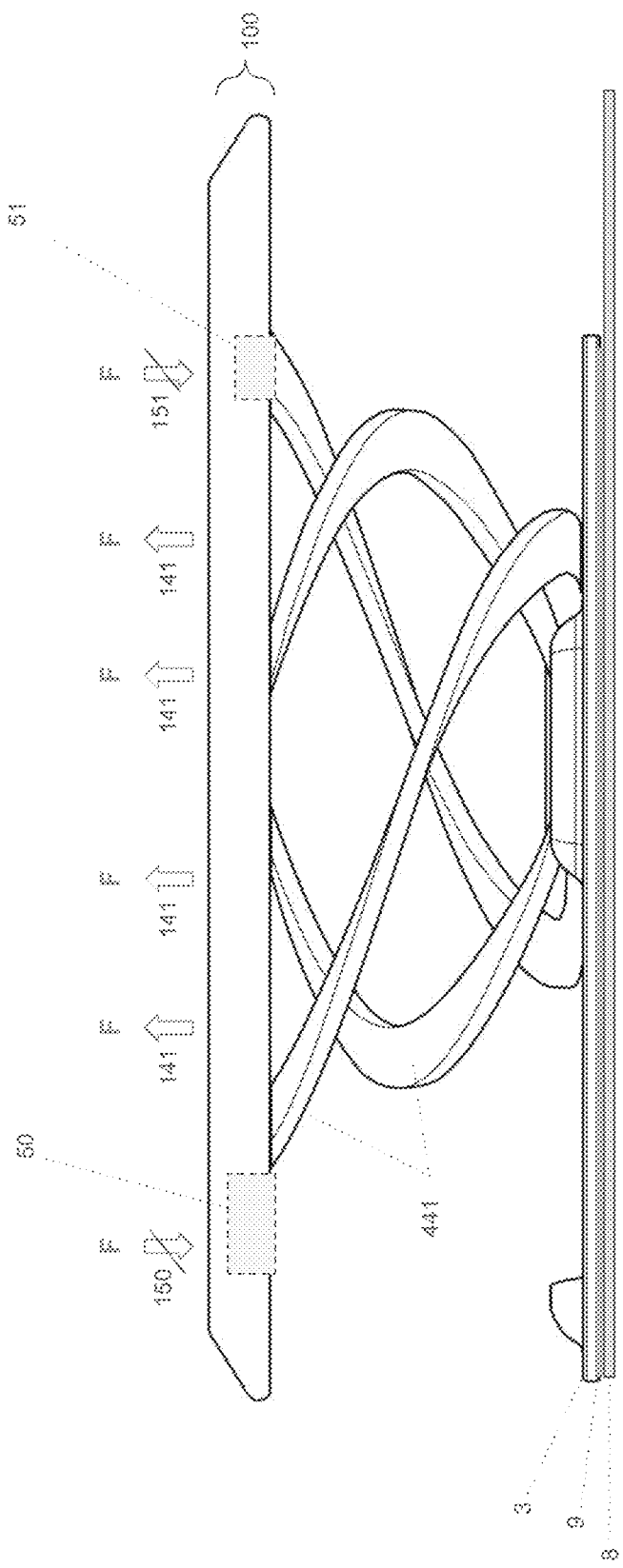
FIG. 8 shows the expandable grip of FIG. 7 at a later stage of expansion in accordance with illustrative embodiments of the invention.

In various embodiments, the top 100 may be raised relative to the baseplate 3 (e.g., by an intermediary wall, not shown). Accordingly, the baseplate 3 would not need to be truncated to provide the kick area 300. However, by removing a portion of the bottom plate 3 to provide the kick area 300, the overall thickness of the device 1 can be advantageously reduced (i.e., instead of increasing thickness by adding the intermediary wall). Accordingly, illustrative embodiments use a truncated baseplate 3 to advantageously reduce the thickness of the device (e.g., to under 4 mm). FIG. 8, which has been simplified for illustration purposes, shows the expandable grip 1 in an intermediate position as it is continuing to expand upwards. Generally, at this point, the user force 106 is removed from the top. In this state of expansion, the forces 141 are sufficient to overcome the forces 150, 151, because in this state there are virtually zero magnetic forces 150, 151 (e.g., illustrated by crossed-out magnetic force 150, 151) since both primary 50 and secondary 51 magnets are separated significantly from the baseplate 3. The expansion forces 141 are still present since the elastic elements 441 have not yet reached their neutral position so the top of the device 1 continues to be pushed away from the baseplate 3.

Figure 9:
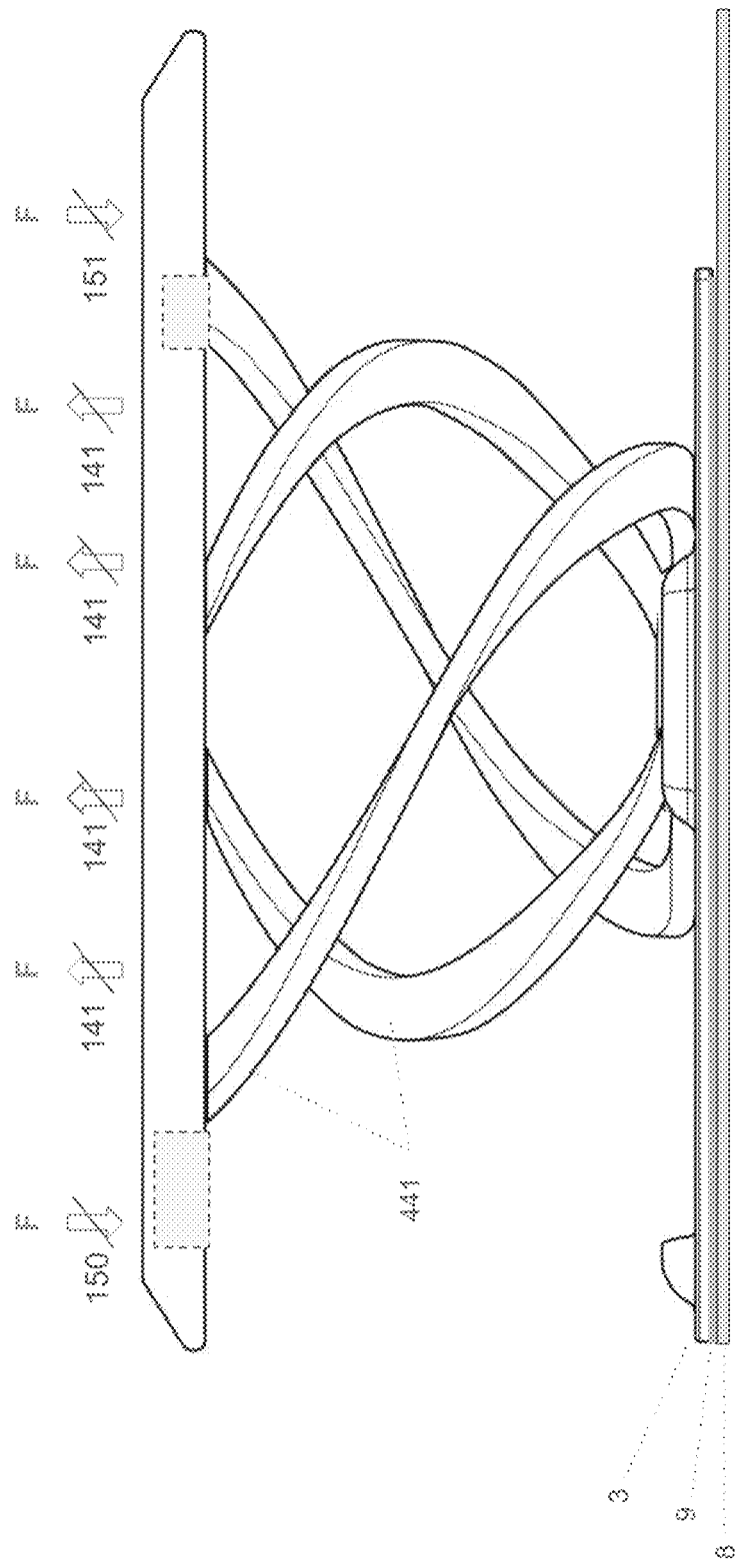
FIG. 9 shows the expandable grip of FIG. 6 expandable grip in a neutral expanded state in accordance with illustrative embodiments of the invention.

FIG. 9, which has been simplified for illustration purposes, shows the expandable grip 1 in the expanded position. The expanded position is a stable or neutral position of the elastic array 4. In this position, the elastic elements 441 no longer push the top 100 further upwards, and the force of the magnets 50, 51 is negligible. In this position, it can be considered that there are no net expansion forces 141 and magnetic forces 150, 151 pushing the top in any particular direction. Thus, the expandable grip 1 is stable in the expanded position. In various embodiments, the neutral position is the only position at which the elastic elements 441 are stable. In other positions, the elastic elements 441 bias the top towards the neutral position. Accordingly, in various embodiments, the elastic elements 441 are unstable biasing elements, i.e., they have a single stable position. Indeed, the use of bistable springs may cause problems with the operation of the device 1. For example, if the biasing elements 441 are stable in the collapsed configuration, this may make the device 1 unnecessarily difficult to open, as the biasing elements 441 would essentially provide a counter-expansion force in the collapsed configuration.

Figure 10:
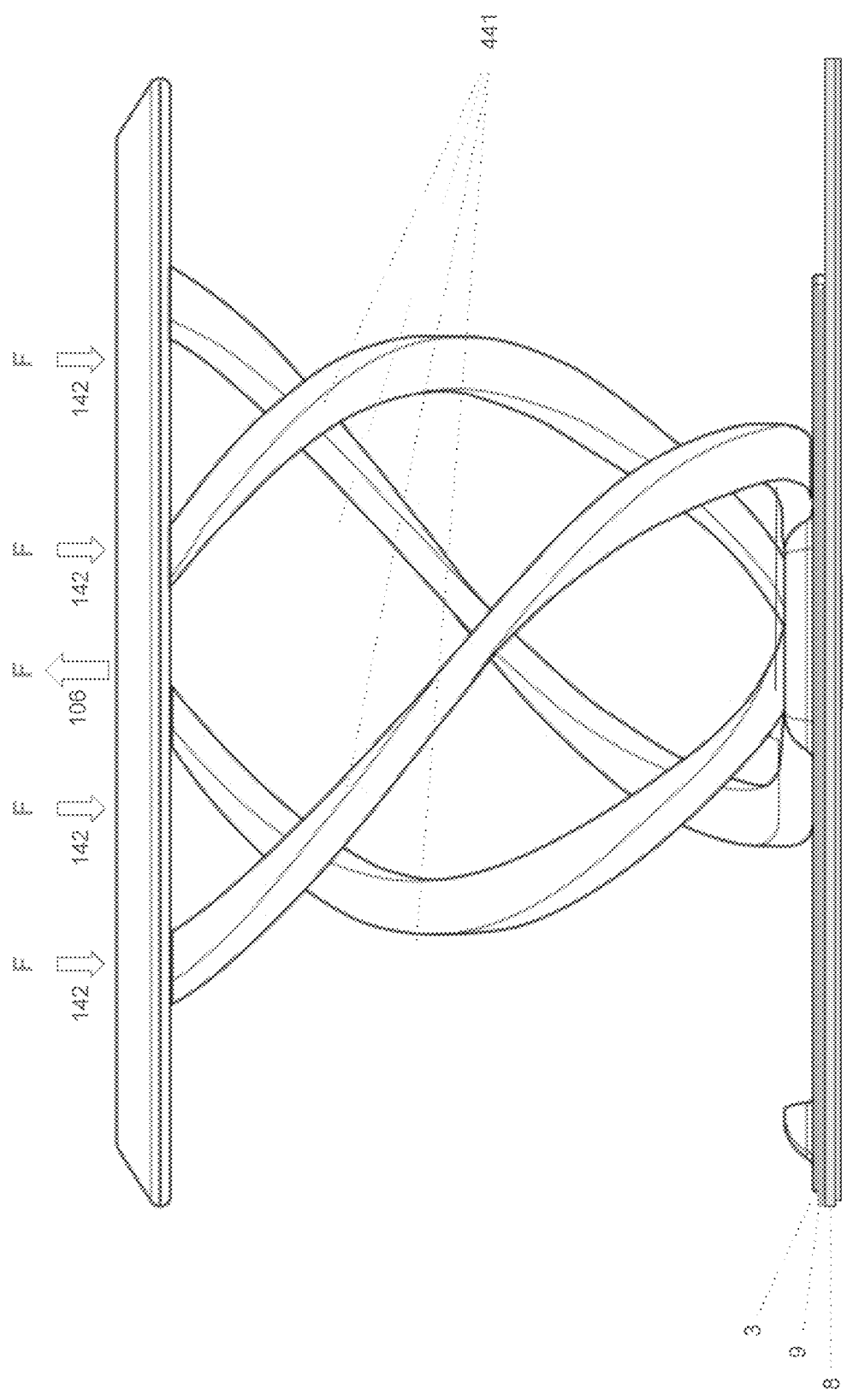
FIG. 10 shows the expandable grip of FIG. 6 in a stretched position in accordance with illustrative embodiments of the invention.

FIG. 10 shows the expandable grip 1 in a stretched position (e.g., because of user force 106 pulling the top 100 away from baseplate 3). Here the elastic elements 441 are stretched beyond their neutral expanded position and therefore each elastic element 441 exerts a contraction force 142 towards the baseplate 3. Accordingly, the elastic elements 441 may be formed from a resilient material that provides the contraction force 142. An advantage of illustrative embodiments is that the elastic elements 441, because of their increased thickness relative to a coil spring, do not deform under the normal forces applied by a user (e.g., pull weight of 6 lbs. or less).

Figure 11:
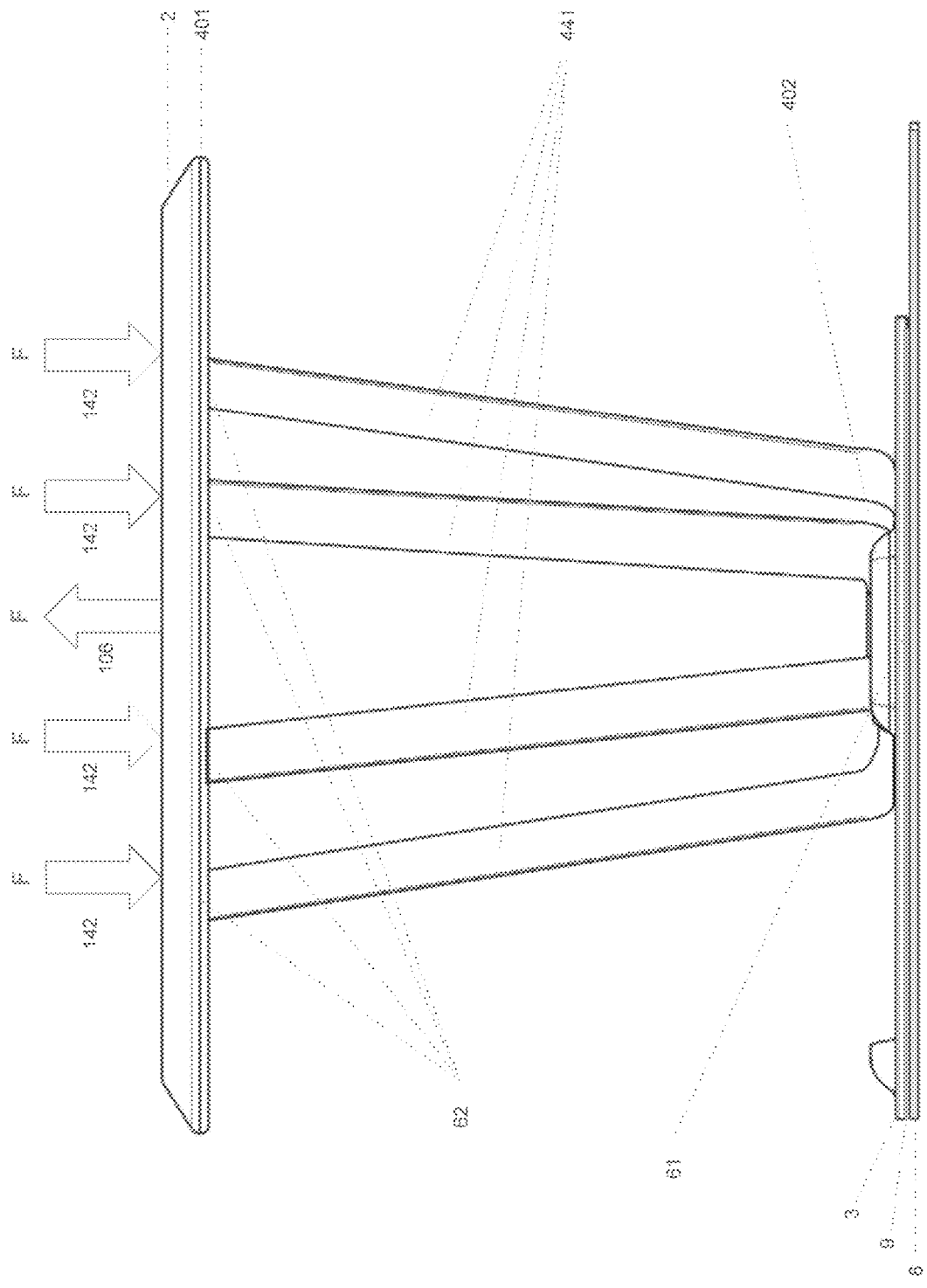
FIG. 11 shows the expandable grip of FIG. 10 in a near-maximally stretched position in accordance with illustrative embodiments of the invention.

FIG. 11 shows a fully stretched expandable grip 1. The user force 106 pulls the elastic elements 441 close to their maximum expansion height (e.g., when they would be straight up and down with no curvature left to expand). As the elastic elements 441 approach their maximum expansion height, the contraction force 142 continues to increase until the user force 106 is essentially pulling against the material strength itself (like a cable), not necessarily the elastic shape (the curved "spring" shape).

As mentioned, FIG. 9 shows the elastic array 4 in the neutral position (also referred to as the expanded position/expanded configuration). The performance of the elastic elements 441 is defined by both the material used to form the elastic elements 441 and the shape of the elements 441. It can be seen in FIG. 9 that each elastic element 441 is curved in the neutral position. From the neutral position, shown in FIG. 9, the curved diagonal shape of each elastic element 441 distorts into a flat shape when compressed, as shown in FIG. 5 and FIG. 6. Similarly, from the neutral position, when pulled to maximum expansion, the curved shape of each elastic element 441 approaches a straight line (e.g., up and down as shown in FIG. 11). In the neutral position, the frame/top 100 does not apply a contraction force back towards the base 3. Accordingly, a user's fingers that are positioned around the array 4 are not crushed or tightly squeezed by the device when it is used as a grip. However, it is anticipated that in various embodiments that the height of the elastic array 4 in the neutral position is shorter than the average adult user's finger thickness (e.g., index finger and middle finger). Thus, the elastic array 4 may be slightly expanded beyond the neutral position during use as a grip (e.g., from an upward force 106 such as depicted in FIG. 10) and therefore may provide some force towards the base 3. However, various embodiments are tuned so as not to overly compress the user's fingers, as discussed further below. Illustrative embodiments also provide the force towards the base 3 when the elastic array 4 is stretched/expanded beyond its neutral position (e.g., if the user holds the grip 1 without supporting the weight of the attached mobile device).

Figure 12:
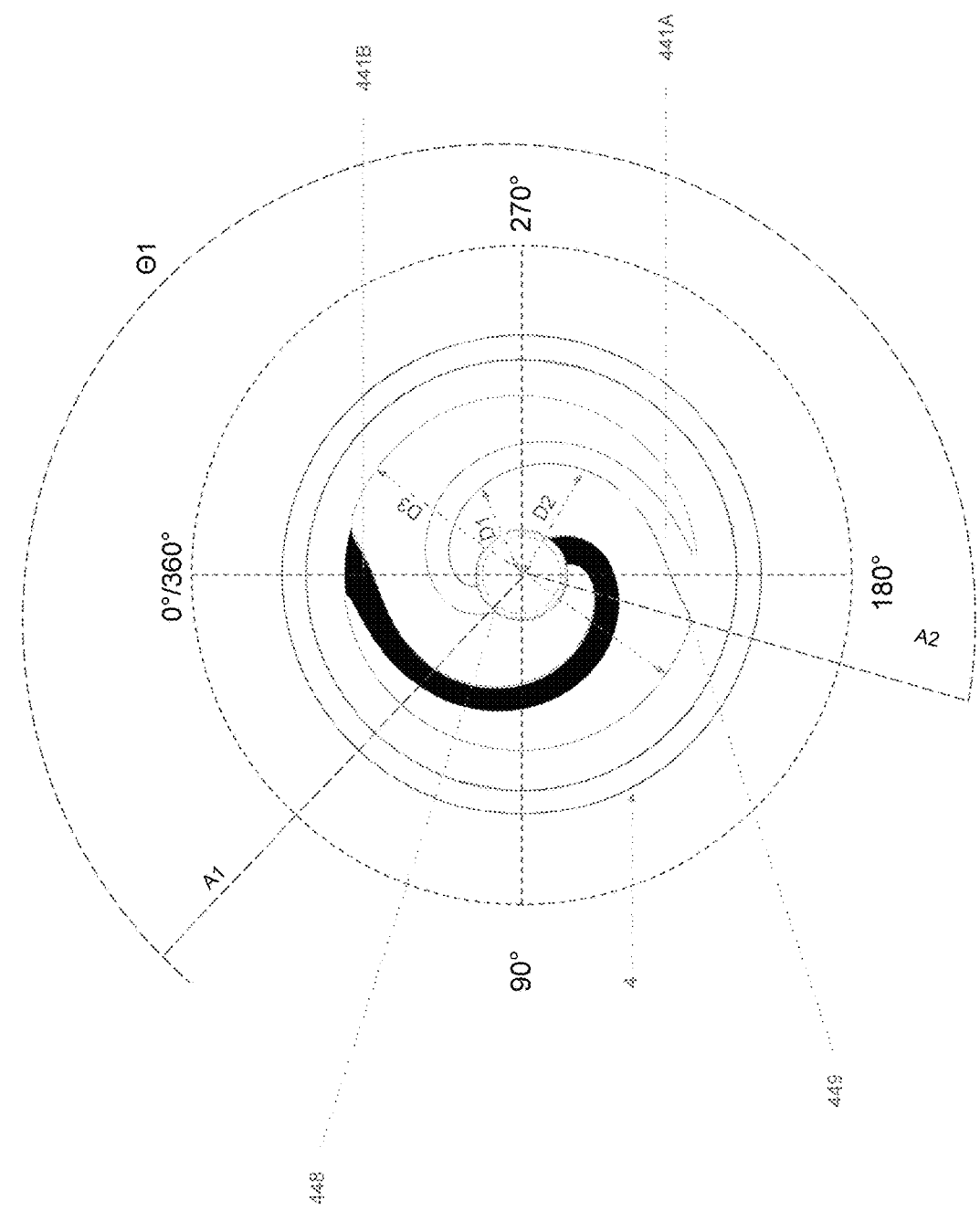
FIG. 12 is a top view of the elastic array having two elastic elements in accordance with illustrative embodiments of the invention.

FIG. 12 illustrates the elastic array 4 with two elastic elements 441A and 441B. One elastic element 441B has been shaded to further illustrate the distinction between elements 441. Each elastic element 441 forms a segment of a spiral, and each element 441 preferably does not overlap with the other element 441. Accordingly, when the device 1 is in the collapsed configuration, the elements 441 do not lay on top of one another, and, therefore, do not add unnecessary thickness to the device 1. To that end, in various embodiments, the elastic elements 441 may have an increasing "inner diameter" or increasing "inner distance" D as they extend from the radial beginning point 448 towards the radial ending point 449, or vice-versa. For example, D2 is a greater distance than D1.

Furthermore, in various embodiments, the elastic elements 441 may not exceed 360 degrees of rotation around a central longitudinal axis of the grip 1. However, it is possible to exceed 360 degrees of rotation without overlapping the elements (e.g., by having an increasing spiral diameter). If the spiral elastic elements 441 do overlap, the overlap may undesirable add to the overall thickness of the device 1.

As illustrated in FIG. 12, each elastic element 441 can be considered to have a radial beginning point 448, and a radial ending point 449. A rotational angle $\Theta$ may be defined by these points for each element 441. For example, an Axis $A_1$ may run from a central longitudinal axis of the array 4 to the radial beginning point 448. Similarly, an Axis $A_2$ may run from the central longitudinal axis of the array 4 to the radial ending point 449. An angle $\Theta_1$ is defined by the axis $A_1$ to the axis $A_2$. In various embodiments, the elastic array radial angle $\Theta$ may be between 15 and 720 degrees. Although it is dependent on many factors (e.g., the diameter of the array 4, the elastic tension of each leg, the desired neutral height, etc.), the inventor found that an angle of between 270 degrees and 450 degrees provides a good balance for the array 4 (e.g., when the inside diameter D3 of the elastic array frame 401 diameter is approximately 30 mm) and also provides enhanced user comfort when directly gripping the elastic elements 441. Furthermore, although the elastic elements 441 are described as not being overlapped, this is from the top down perspective. As shown in FIG. 12, illustrative embodiments may have angular overlap with elements 441 (e.g., $\Theta_1$ and $\Theta_2$ have angular overlap). It should be understood that the elastic array 4 shown in FIG. 12 is used for discussion purposes, and that other embodiments may have more or fewer elastic elements 441 of varying dimensions and radial angles $\Theta$.

It should be apparent that illustrative embodiments provide several advantages, including:

(1) Multiple points of contact between the baseplate 3 and the elastic frame 401 advantageously (a) provide more balanced compression and expansion pressure on the top 100, and (b) increases the amount of force needed to extend the array 4 beyond its maximum designed stretch. In some embodiments, a single elastic element 441 may provide multiple points of contact (e.g., by splitting into multiple smaller sub-elements);

(2) Elastic elements that transition from a collapsed position to an expanded position and are also configured to be gripped by a user's fingers. Surfaces of the elastic element 441 that contact the user's fingers are rounded and not sharp. This advantageously allows the elastic elements 441 to be unsheathed, and therefore, provides an overall thinner device in the collapsed configuration;

(3) Stability in a horizontal plane B2 (i.e., in an axis perpendicular to a longitudinal axis of the array 4). In other words, the top 100 does not feel flimsy, wobbly, or unstable to the touch; and/or (4) Increased elastic element surface area advantageously provides a "virtual solid volume" that makes contact with the user's fingers for both comfort and stability while gripping the array 4.

Figure 13:
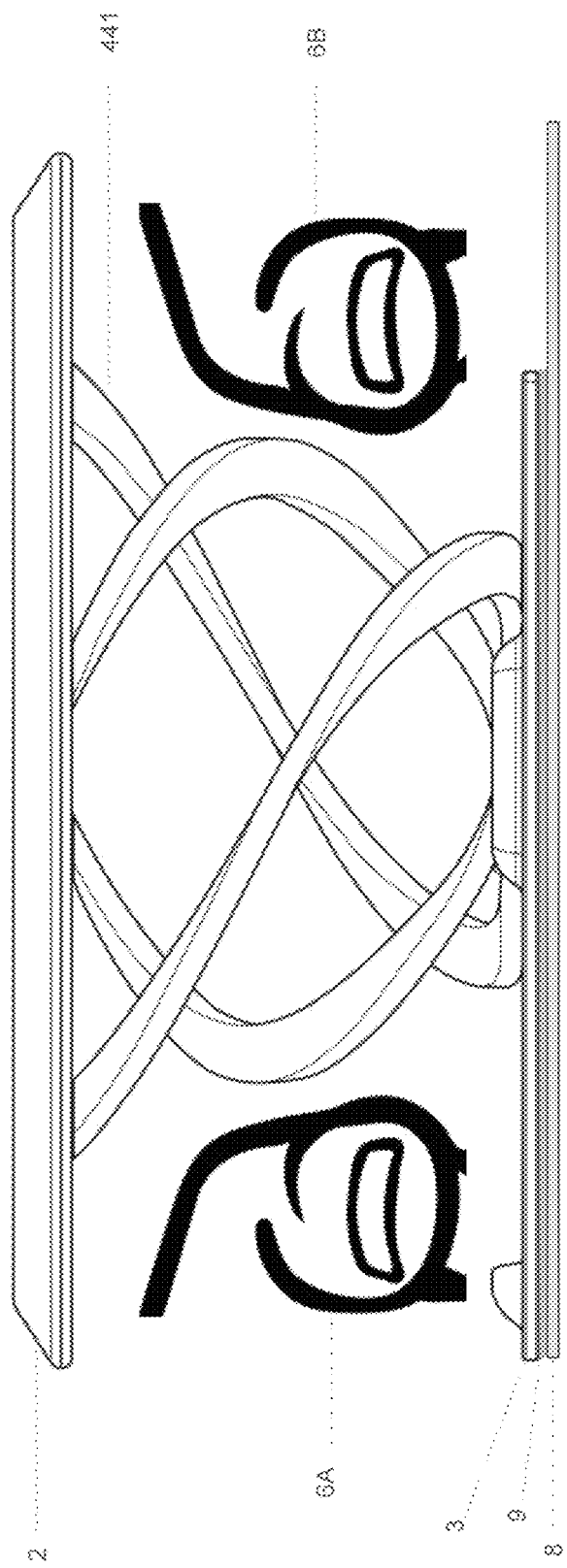
FIG. 13 shows a user positioning a finger against the expanded grip in accordance with illustrative embodiments of the invention.
Figure 14:
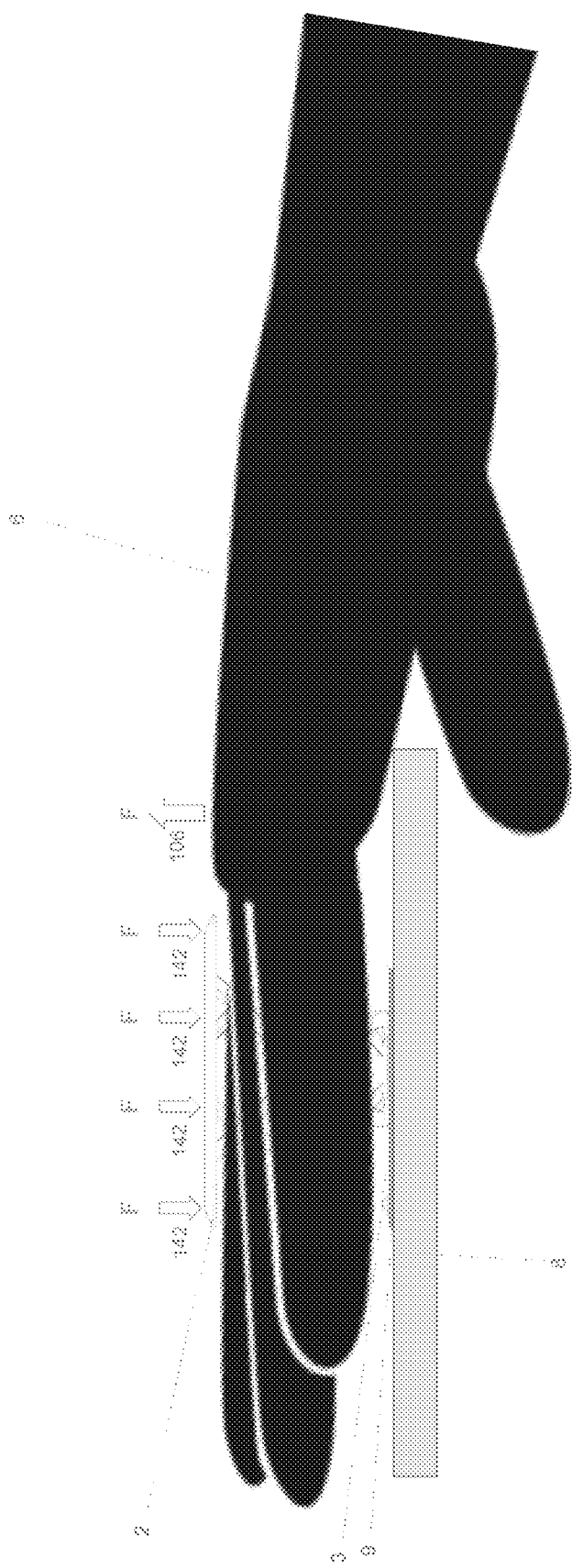
FIG. 14 is a side view of a user positioning a hand between the expandable grip top and a ferromagnetic baseplate that is adhered to a mobile device in accordance with illustrative embodiments of the invention.
Figure 15:
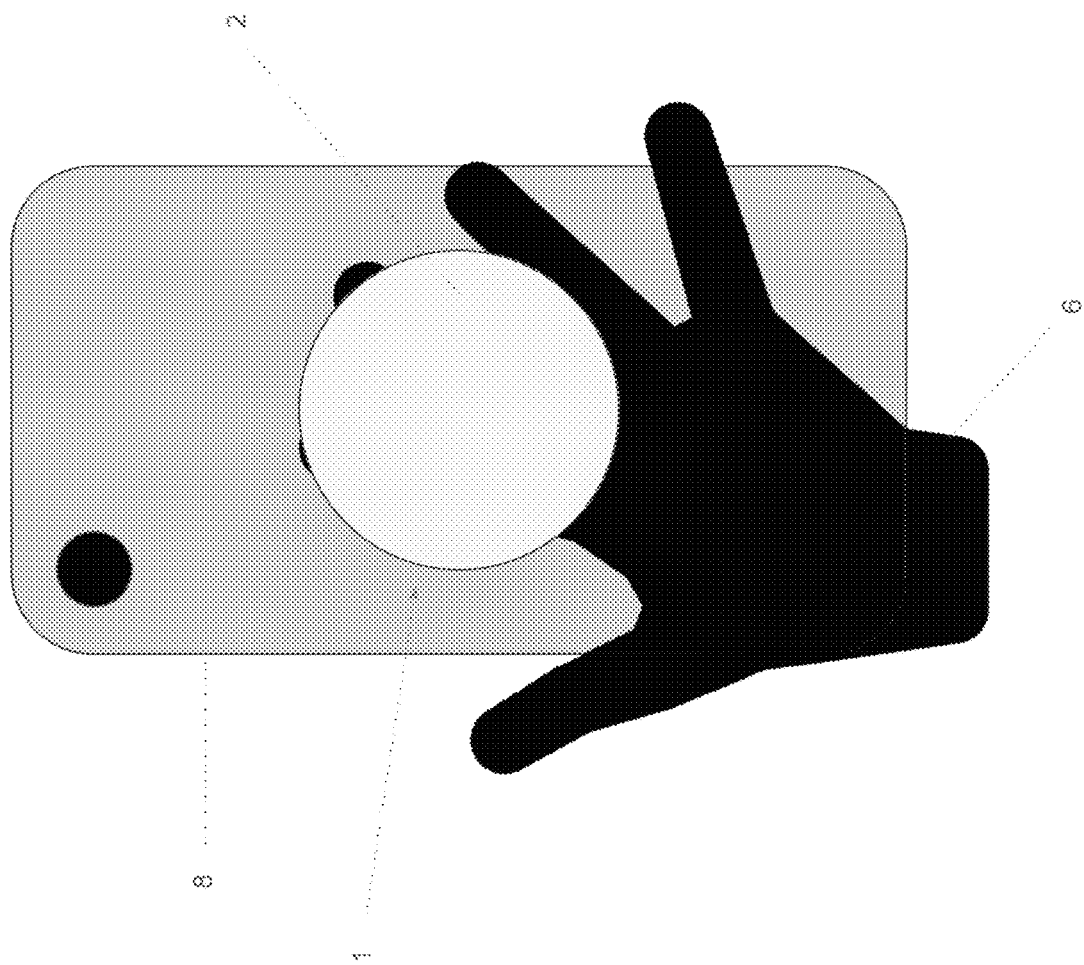
FIG. 15 is a top view of a user positioning a hand between the expandable grip top and the baseplate that is adhered to the mobile device in accordance with illustrative embodiments of the invention.

Thus, the elastic elements 441 in various embodiments may advantageously increase surface area and form a virtual solid volume. For example, as illustrated in FIG. 13, when the user 6 contacts one or more elastic elements 441 within the elastic array 4 in the neutral position/expanded position, their fingers (e.g., middle finger 6A and index finger 6B) are obstructed by one or more wide, diagonal objects (i.e., the outwardly facing surfaces of the elastic elements 441). Further, when multiple fingers contact multiple sides of the elastic array 4, they all are in contact with at least one wide, diagonal object (e.g., multiple elastic elements 441). Thus, the elastic array 4 creates a "virtual solid volume" that can be easily gripped with two fingers by squeezing the array 4, e.g., as depicted in FIG. 14 and FIG. 15, without the user's fingers falling between elastic elements 441. In various embodiments, the thickness and shape of the elastic elements 441 complements or adds to the virtual solid volume that is easy to grasp and/or comfortable to contact using two fingers 6A and 6B. Accordingly, the user's fingers 6A and 6B don't slide between the members 441 of the elastic array 4 because there is ample surface area to squeeze or rest fingers 6A and 6B against.

FIG. 16A-16D show top views of four alternative embodiments. FIG. 17A-17D show corresponding side views of the four alternative embodiments on FIG. 16A-16D.

Various embodiments preferably use a plurality of elastic elements 441 that contact the top 100 (e.g., the frame 401) at different positions. An advantage of using multiple elastic elements 441, as illustrated in FIGS. 5-8, is that the multiple elements 441 provide a more balanced upward expansion force 141. The balanced expansion force 141 helps control the expansion action by ensuring that when the top 100 is depressed into the kick area 300, that the magnetic forces 150, 151 are overpowered. The distributed forces balance the top 100 and bias the top 100 towards a horizontal orientation as the top 100 expands upward (e.g., as opposed to a lopsided or unbalanced top that might rock back and forth as it attempts to reach equilibrium and settle into the neutral position). Furthermore, the balanced forces ensure the expansion system works in a manner similar to that shown in FIGS. 7-9 (e.g., the distributed expansion forces 141 effectively cancel out all of the distributed magnetic forces 150, 151, rather than concentrating an expansion force to push up one side of the top 100 while the opposing side of the top 100 is pulled downwardly towards the base 3 with a magnetic force). Multiple elastic elements 441 are pushing upwards at each connection point 62, which spreads the net upward expansion force. Other embodiments formed using a standard wire spring 1004 (e.g., as shown in FIG. 16A and FIG. 17A) may be formed so that the wire spring has a flat top, however since it is only a single coil, the force with which it pushes against the flat top is inherently imbalanced and lopsided towards the single point of contact 1060. Thus, having multiple elastic elements 441 advantageously provides a more balanced and stable expansion motion. This motion is unlikely to cause injury or discomfort to the user and also provides a satisfying expanding motion that allows the device 1 to operate as a fidget device. Further, as described in detail below, having multiple elastic elements 441 allows for multiple magnets to be used around the outer edge of the top and therefore provides more stability against errant expansion of the device.

Another benefit of illustrative embodiments using multiple elastic elements 441 is that they exert a substantially balanced and distributed contraction force 142 when the elastic elements 441 are expanded beyond their neutral position. This contraction force 142 further aids in the comfort and safety of the expandable grip 1 on a mobile device 8 by biasing the user's 6 hand against the mobile device 8, as shown in FIG. 14. Here, it is assumed that a typical user's fingers, when inserted under the top of the expandable grip 1, stretch the elastic elements 441 beyond the neutral position and accordingly the top 100 pushes back (i.e., a contraction force) against the user's 6 fingers and help anchor the user's 6 hand to the mobile device 8 in any orientation.

Another benefit of illustrative embodiments using multiple elastic elements 441 is that they act as a hard, durable break to expansion of the expandable grip 1. As shown in FIG. 11, when fully expanded, the elastic elements 441 act as multiple tethers between the top of the device 1 and the baseplate 3. As the elastic elements 441 expand beyond their neutral position, it becomes increasingly more difficult to stretch. This breaking mechanism on expansion aids in user 106 comfort and safety when using the device as a grip, as in FIG. 14. If the elastic elements continued to expand large distances under a user force 106, the mobile device 8 would not be secure and could "yo-yo" up and down (e.g., when using a coil spring). Further, the multiple elastic elements 441 acting as tethers when fully expanded as shown in FIG. 11 significantly mitigate or prevent damage to the expandable grip 1 when a large user force 106 is exerted. This benefit is illustrated by contrasting the use of multiple relatively short elastic elements 441 versus using the wire spring 1004 in a similar device 1 as shown in FIG. 18.

Figure 18:
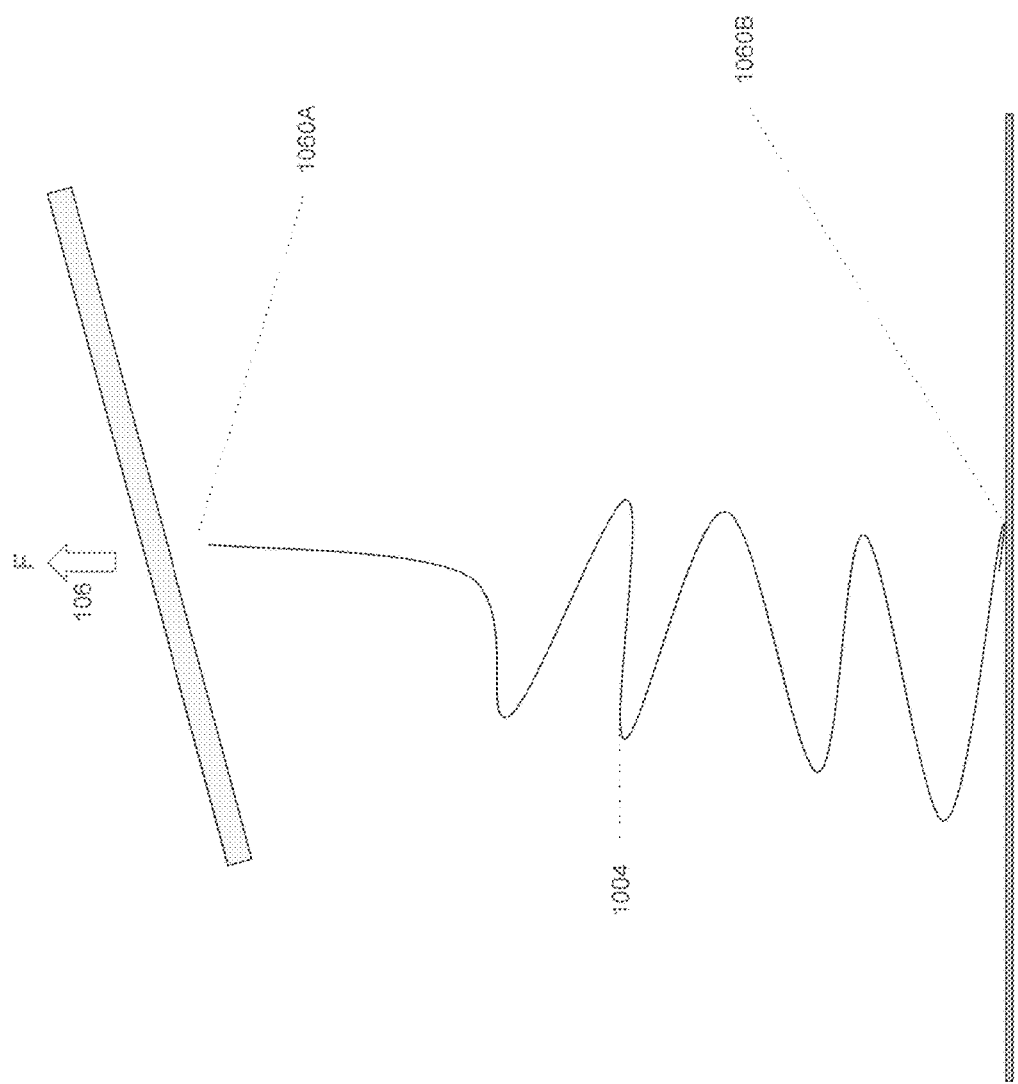
FIG. 18 is a side view of a conical wire spring breaking when stretched in accordance with illustrative embodiments of the invention.

FIG. 18 illustrates that under a large user force 106, the wire spring 1004 can be permanently distorted (e.g., the material fails) and then, since there is only a single point of contact, may tear away the top (as shown) or the bottom from the wire spring 1004, permanently destroying the device 1. It can be seen in FIG. 11 that when fully stretched, and since each elastic element 441 is relatively short compared to a wire coil 1004, the pull force required to exceed the desired maximum expansion point is a multiple of the expansion force required using a wire spring 1004 or for that matter any single elastic element 441 because of the multiple connection points 62, which act as mechanical anchors. Testing has shown that having multiple elastic elements 441 may increase the pull force required to permanently damage the array 4 to up to 6 lbs. of force or more, far beyond what could be accidentally achieved by a user during normal use (e.g. catching the top when removing the grip 1 from a pocket). Furthermore, the cap 2 may have a beveled edge to assist with reducing the likelihood of catching on a user's 6 pocket.

In addition to the multiple elastic elements 441 having shorter runs and multiple points of contact that aid in the device 1 durability, the elastic array 4 itself may be constructed to maximize the strength of the points of contact between the elastic elements 441, the top 100, and the baseplate 3. The elastic elements 441 may be materially connected to the elastic frame 401 (e.g., the same part through a plastic injection molding process). The elastic elements 441 may also be connected to the baseplate 3 by coming together materially (e.g. the same part through a plastic injection molding process) to a mechanical connection fastener 402 which can be mechanically connected to the baseplate 3 (e.g. with a heat stake, weld, rivet, etc.).

In various embodiments, the elastic array 4 includes of two or more elastic elements 441. Preferred embodiments employ 3-5 elastic elements 441 but it can be seen in the figures that more elastic elements 441 may be used. At some point, when more and more elastic elements 441 are used, it may be required to reduce the width of each elastic element 441 so they can fit within the circular area. Very small widths of elastic elements 441 may complicate the manufacturing process as well as weaken any one elastic element 441 and introducing a possibility of "tearing" when exerting a strong force on just one side of the top 100.

As discussed below, the elastic elements 441 may be formed from, amongst other things, plastic, metal, rubber, or a combination thereof. Material choice may impact the final width and stiffness of each elastic element 441 to provide the appropriate expansion force 141 and contraction force 142 that enables the functionality of the expandable grip. The material choice may also impact the thickness of each elastic element 441. For example, illustrative embodiments may form the elastic element 441 thin enough to be collapsed within a thin top (e.g., under 1.5 mm thick) yet not so thin to cause discomfort (e.g., cut) to a user's 6 fingers 6A and 6B (e.g., over 0.5 mm thick). Certain embodiments coat the elastic element(s), as discussed below.

Figure 19A:
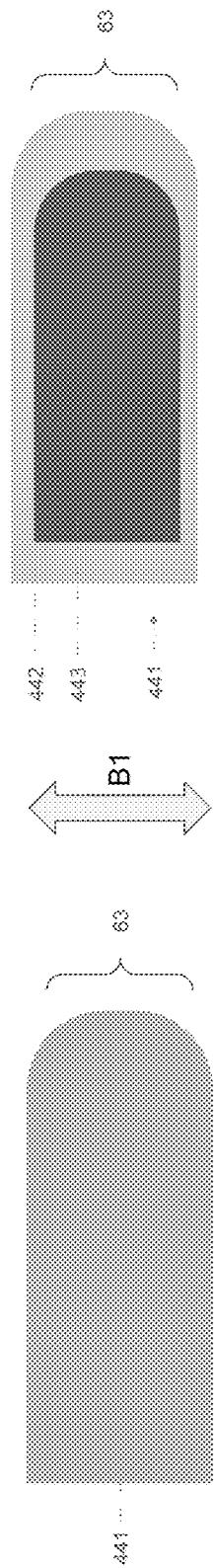
FIGS. 19A-19F schematically show various examples of cross-sections of the elastic elements in accordance with illustrative embodiments of the invention.
Figure 19B:
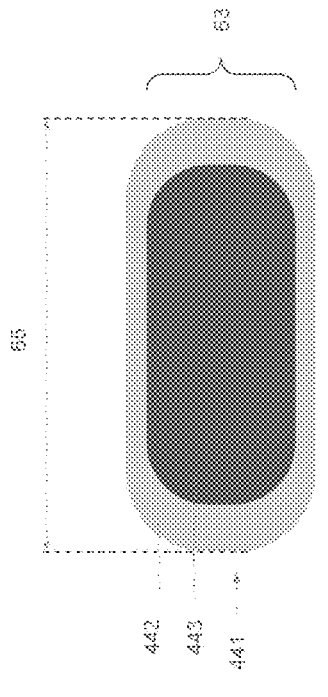
Figure 19C:
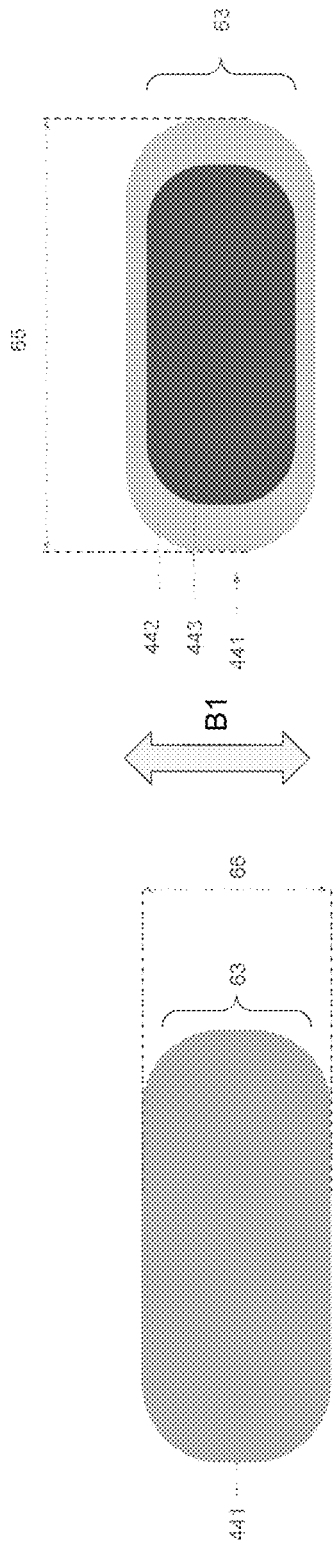
Figure 19D:
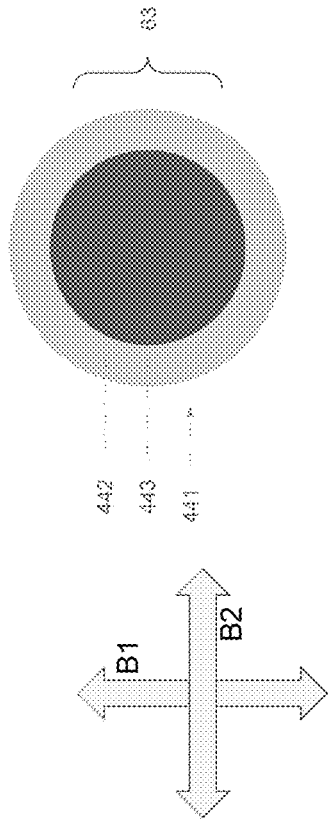
Figure 19E:
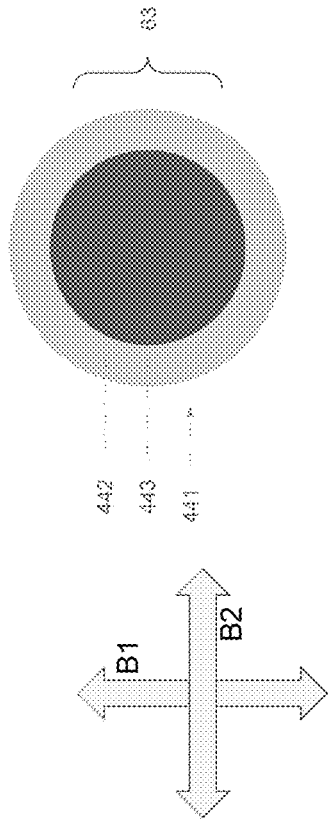
Figure 19F:
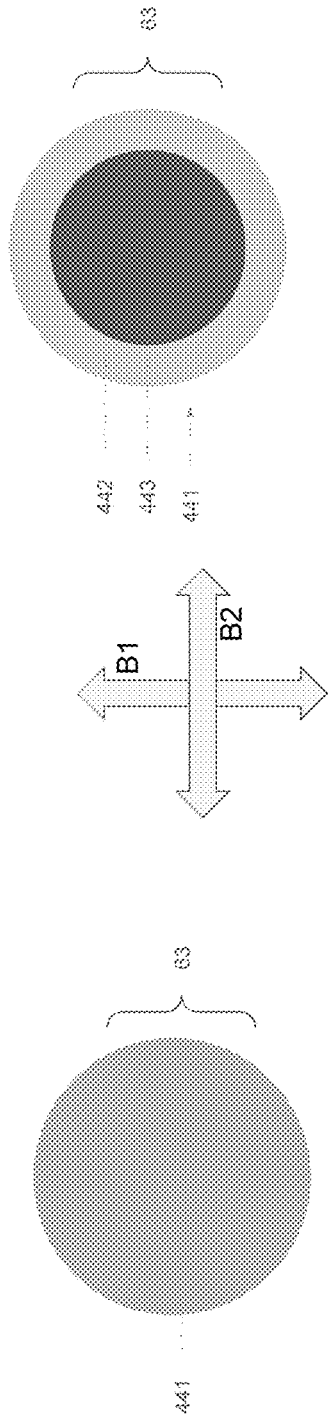

FIGS. 19A-19F schematically show various examples of cross-sections of the elastic elements 441 in accordance with illustrative embodiments of the invention. In various embodiments, a cross-sectional view of an elastic element 441 has a curved outwardly facing edge 63, which is the edge facing outward from the center of the elastic array 4. The curved edge 63 is the side on which a user's 6 fingers contact the elastic array 4. Illustrative embodiments do not have sharp corners or edges (e.g., outwardly facing edge 63) so that it is comfortable for the user 6 to grip. As examples, cross-sectional views of the elastic elements 441 may be, among other shapes, bullet shaped (FIG. 19A, FIG. 19D), pill shaped (FIG. 19B, FIG. 19E) and/or round (FIG. 19C, FIG. 19F). It can be seen that there a large number of cross-sectional shapes which could be used, to provide a softer curved edge 63 for user 6 comfort. Because the elastic elements 441 themselves are configured to be gripped by the user 6, this eliminates the need for an outer covering, sheath or skin that separates the user's 6 fingers from the elastic elements. Illustrative embodiments advantageously may provide a grip 1 with an uncovered or unsheathed elastic array 4. Accordingly, the device can be made considerably thinner in the collapsed position, because illustrative embodiments do not need to account for a collapsed sheath/covering/skin in between the top 100 and the base 3.

FIGS. 19A-C illustrate cross-sectional views of embodiments having a uniform solid material to compose elastic elements 441 (e.g., plastic). FIGS. 19D-F illustrate cross-sectional views of embodiments which use a material combination such as an elastic element core 443 (e.g., metal) which is surrounded by a softer elastic element coating 442 (e.g. powder coating), collectively referred to as the elastic element 441. Utilizing a material combination may be advantageous to reach optimal performance of the elastic element 441. For example, using a uniform plastic may produce the desired compression and expansion force, and may achieve an optimal thickness for comfort, but may be subject to deficiencies of plastic durability such as deterioration over time or "creep," where the elastic element 441 loses its shape over time. On the other hand, using a uniform metal elastic element may produce the desired compression and expansion force and may be very durable over time but may need to be extremely thin in order to not be too stiff. In some embodiments, the element 441 may be too sharp for a user's hands. Therefore, a preferred solution may be a thin metal elastic element core 443 (which achieves desired characteristics except thickness) having a softer elastic element coating 442 (e.g., powder coating) to achieve a softer, thicker, rounder outward facing edge 63. Further, the metal elastic element core 443 may be tumbled or otherwise dulled prior to coating in order to further curve the outer edge 63. Although the core 443 is shown as having a similar shape to the outer coating 442, it should be understood that the core 443 may have any shape (e.g., rectangular), and that the outer coating 442 may still have the various shaped discussed herein (e.g., bullet shaped, pill shaped, etc.).

Various embodiments may use other shapes. For example, the outwardly facing edge may be a polygon with corners. However, such outwardly facing edges 63 may not be as comfortable. While a curved/smooth outer edge 63 assists with grip, a completely circular cross-section (shown in FIG. 19C) either has reduced strength (i.e., less cross-sectional area per unit thickness 66) relative to other elongated shapes or otherwise has an increased thickness to compensate (which increases the overall thickness of the device in the collapsed position). This becomes apparent when comparing equal cross-sectional areas of an elongated shape (e.g., FIG. 19B) with a circular cross-section (e.g., FIG. 19C). That is to say, the circular cross-section has a greater thickness 66 than the thickness 66 of the elongated shape when placed side by side on a flat surface. To advantageously reduce thickness 66 and increase strength, illustrative embodiments preferably have an elongated cross-section (e.g., as shown in FIGS. 19A, 19B, 19D, 19E), preferably extending substantially in the horizontal orientation (as opposed to vertically, which undesirably would increase the overall thickness of the device 1 in the collapsed configuration).

In various embodiments, the cross-sectional thickness 66 may be about 0.3 mm to about 0.9 mm, and more preferably, about 0.5 mm to about 0.8 mm thick 66. In some embodiments, the core 443 may be about 0.2 mm to about 0.7 mm thick, and the coating may be about 0.1 mm thick (which may be applied on both sides of the core 443 for a total contribution of 0.2 mm to the overall thickness 66). In various embodiments, the cross-sectional width 65 may be between about 0.5 mm and about 1.7 mm, preferably about 1.0 mm to about 1.4 mm width 65. In some embodiments, the core 443 may be about 0.3 to about 1.5 mm thick, and the coating may be about 0.1 mm thick (which may be applied on both sides of the core 443 for a total contribution of 0.2 mm to the overall height 66). In various embodiments, the overall length of the elements 441 from the first end 445 to the second end 447 may be about 32 mm to about 98 mm, preferably between 50 mm and 80 mm (e.g., for arrays 4 having three to five elements 441). In various embodiments, an inside diameter of the elastic array frame 401 may be between about 25 mm to about 50 mm. In various embodiments, the elements 441 may extend between 8 mm and 20 mm from the base 3 in the neutral position.

Some embodiments may intentionally increase thickness to support a completely circular cross-section to match the required strength. However, due to the circular shape, the elastic element 441 has a tendency to bend both up and down (i.e., with usage of the expandable grip 1) but also radially inwardly and radially outwardly (e.g., towards and away from the center of the device). Elongated cross-sections, as shown for example in FIG. 19A-19B, have a strong bias towards bending up and down (i.e., perpendicular to the elongated portion of the cross-section) and not radially. Bending in radially is an undesirable characteristic of the elastic array as it is unstable to the touch and can "squish" around when the user attempts to use the device 1 as a stable grip between their fingers. The inferiority of a circular cross-sectional shape, in particular in an embodiment with a single wire spring, is illustrated in FIG. 17A. In this figure, the user 6 attempts to exert pressure against the wire spring with their fingers 6A and 6B, but due to weakness and/or bi-lateral bending, the spring deforms in an unstable and undesirable way. Consequently, the grip 1 does not feel like a solid grip to the user 6.

As previously stated, by making the outer edge 63 smooth, the need for an outer covering is eliminated, enabling a substantially thinner device 1 when in the compressed state. Such outer covering when compressed generally increases the thickness of the device in the collapsed position. The collapsed position may also be referred to as a compressed position or a retracted position.

In illustrative embodiments, the elastic elements 441 are configured to maintain their shape and resiliency over heavy usage and temperature fluctuations. Elastic elements 441 that fluctuate in tension or neutral height undesirably make for an unstable user experience. Contrary to conventional phone grip accessories, because of the desire for long-term stability, using plastic to form the entirety of the elastic element 441 is currently considered by the inventors to be suboptimal, as they generally are subject to "creep" and degrade faster than metal in most environments. However, illustrative embodiments may use biasing elements 441 formed from plastic. Therefore, illustrative embodiments may use metal elastic elements 441, such as steel. Because metal is so much harder than plastic, metal elastic elements 441 tend to be much thinner than plastic, and therefore sharper. For example, using metal strips which have a large width 65 may produce a desirable tension of the elastic array 4 and be quite thin. However, without the curved edge 63, thin and wide elements 441 made of metal can be extremely sharp to the touch by a user's hand. Alternatively, metal elements 441 with a relatively greater thickness 66 may feel less sharp to the user's hand (although they could still touch the top of the elastic element 441 and feel sharp if the width 65 is small) but undesirably increase the thickness of the array 4. Accordingly, illustrative embodiments have elements 441 with the width 65 greater than the thickness 66. In some embodiments, the ratio of width:thickness is greater than 1:1, such as 3:2, 4:3, or 5:4. Various embodiments have a width:thickness ratio of less than 15:1, such as less than 10:1.

Therefore, illustrative embodiments advantageously optimize for both comfort to the user's fingers when in contact with the elastic elements 441 and overall thinness of the device 1 by using metal as the elastic element core 443 with a non-metal (e.g., a plastic or rubber) elastic element coating 442. The elastic element coating 442 not only softens the edges of the metallic elastic element core 443, it also builds overall thickness of the elastic elements so that they are thicker (i.e. less sharp) to the user's fingers. Although the relatively thin elastic element coating 442 may be formed from a plastic, the metal core 443 dominates the characteristics of the element and therefore nuances of plastic (e.g., creep) are generally not significant. The inventor determined that a final elastic element 441 thickness greater than 0.5 mm with soft edges is comfortable to user's fingers when used as an expandable grip.

As mentioned previously, the elastic elements 441 in various embodiments may advantageously increase surface area and form a virtual solid volume. As illustrated in FIG. 13, when the user 6 contacts one or more elastic elements 441 within the elastic array 4 in the neutral position/expanded position, their fingers (e.g., middle finger 6A and index finger 6B) are obstructed by one or more wide, diagonal objects (i.e., the outwardly facing surfaces of the elastic elements 441). Further, when multiple fingers contact multiple sides of the elastic array 4, they all are in contact with at least one wide, diagonal object (e.g., multiple elastic elements 441). Thus, the elastic array 4 creates a "virtual solid volume" that can be easily gripped with two fingers by squeezing the array 4, e.g., as depicted in FIG. 14 and FIG. 15, without the user's fingers falling between elastic elements 441. In various embodiments, the thickness and shape of the elastic elements 441 complements or adds to the virtual solid volume that is easy to grasp and/or comfortable to contact using two fingers 6A and 6B. Accordingly, the user's fingers 6A and 6B don't slide between the members 441 of the elastic array 4 because there is ample surface area to squeeze or rest fingers 6A and 6B against.

Although in various embodiments the elements 441 do not rotate a full 360 degrees (a full 360 degree period), the elements 441 may generally have a uniform slope throughout their length (e.g., except at the ends which couple to the baseplate 3 and the frame).

In various embodiments, the height of the elements 441 in the neutral position may be between about 10 mm and 13 mm. In some embodiments, the height of the elements 441 may be sufficient to produce a gap of between about 10 mm and about 13 mm between the top 100 and the baseplate 3. Most human adult fingers have a cross-sectional height that falls between about 15 mm and 23 mm. Therefore, the inventors believe that a gap of approximately 10 mm to 13 mm provides room for most fingers of all sizes to get under the top 100 and experience appropriate downward contraction force 142 for the user's hand to feel secure. Preferably, the compression strength on the user's fingers is between 0.5 lbs to 2 lbs when the user's fingers expand the array 4 beyond its neutral position. For example, testing has shown that a total compression strength on the user's fingers between 0.8 lbs and 1.6 lbs provides a sturdy grip and is comfortable for users. In various embodiments, the elements 441 may have a rotation angle $\Theta$ of about 270 degrees to 450 degrees (e.g., when the elastic array 4 maximum diameter is approximately 30 mm).

Furthermore, as shown, the virtual solid volume may be smaller as it approaches the mobile device and may expand outwardly as it approaches the top 100. Said another way, the elastic array 4 may have an increased width/diameter near the top 100 and a decreased width/diameter near the mobile device. This advantageously allows the user's 6 fingers to fit closely together in a comfortable gripping position on the back of the mobile device (or case).

In some other embodiments, an outer sheath may surround the elastic elements 441 (e.g., extending from the first end 445 to the second end 447). The outer sheath provides comfort, even for very thin elastic elements 441 that may otherwise cut the user's 6 fingers, when gripping the elastic array 4. However, in testing, the outer sheath was found to contribute to an increased thickness of the overall device 1 in the collapsed configuration. Accordingly, illustrative embodiments advantageously may have an uncovered or unsheathed elastic array 4 (as shown in the figures), thereby providing a very thin overall grip 1. Furthermore, the uncovered elastic array 4 may provide a secure comfortable grip (e.g., comfortable due the dimensions of the elastic element 441 and secure grip because of the relative positions of elastic elements 441 with respect to one another and radial stability due to the elastic element 441 shape). The benefit of using multiple elastic elements 441 can be contrasted with the use of a wire spring 1004 shown in FIG. 16A, where the fingers may easily pass through the coil spring. Various embodiments may use the wire spring 1004 as shown in FIG. 17A. However, due to characteristics discussed above, the cross-section of a wire spring is likely weak in order to maintain the same thickness of an equivalent elongated shape and the circular cross-section bends along both axes (i.e. up and down and in and out). In many circumstances, the result is an unstable virtual volume which does not feel solid and feels floppy and squishy and does not support the user's fingers 6A and 6B. In an effort to create a comfortable grip using a wire spring 1004, a very thick wire element may be used. However, to provide a comfortable grip, illustrative embodiments use a large thickness for the wire (to not feel sharp) and a large number of coils (to create a virtual surface). In various embodiments, this undesirably causes a large expansion force and increases the thickness of the device (e.g., to accommodate larger magnets). Furthermore, the device 1 when transitioning to the expanded position would open very forcefully and have an unbalanced upward force due to a single point of contact with the top. Ultimately, the coils would undesirably produce a large contraction force as well, squeezing the user's fingers tightly.

There is also some balance between elastic array 4 neutral height and tension against the user's fingers. The expandable grip 1 opens to the neutral height. Preferably, in various embodiments, the neutral height is sufficient to allow virtually all finger sizes to insert under the top 100. Thus, small fingers push the top up slightly. Large fingers push the top 100 up a greater amount. Therefore, the elastic array 4 neutral height is sized in various embodiments such that small fingers feel secure inside the expandable grip 1 but large fingers do not push the top 100 up so much that it is uncomfortable. The inventors discovered that a gap of approximately 10 mm is sufficient for most users to successfully insert their fingers into the expandable grip 1 and not feel a lack of support (small fingers) or an uncomfortable amount of pressure (large fingers). However, the inventor believes that a large number of gap sizes are appropriate (e.g., about 8 mm to about 13 mm).

Illustrative embodiments balance the number, rotational angle, length, thickness and material of the elastic elements 441 within the elastic array 4 such that the tension created by the elastic elements 441, and the "virtual solid volume" created by the elastic array 4 for the user to squeeze against with their fingers (as shown in FIG. 13), are tuned for user comfort. If there are too many elastic elements 441, the expandable grip 1 may undesirably have too much tension.

If the radial angle of the elastic elements 441 is too small, the corresponding shorter elastic element length may yield a lower neutral height, or higher tension as the device 1 attempts to expand to a height of approximately 10 mm. On the other hand, too few elastic elements 441 make it difficult to provide the virtual solid volume for the user to feel. The inventors have discovered that 3-5 elastic elements 441 provide sufficient virtual volume as a grip to the user without over burdening the illustrative embodiments with a very short expansion height or very high tension.

Although there are many potential options for elastic elements 441, the number of permutations can be quickly bounded by considering user comfort, grip performance and elastic element durability and overall thickness of the array 4. An elastic array 4 that produces too much tension (i.e. both compression and expansion force) is uncomfortable to some users because it squeezes their fingers too tightly during use as a grip. Conversely, an elastic array 4 that produces too little tension feels floppy and insecure as a grip, especially on larger heavier phones. In practice, for most phones, the optimal "compression strength" has been found to be between about 0.8 lbs and about 2 lbs.

To illustrate some of these tradeoffs discussed above, particularly around elastic element 441 quantity, rotational angle, shape, thickness, and material, there are four embodiments presented in FIG. 16A-D (the top view of springs and elastic arrays) and FIG. 17A-D (side views of the embodiments which use the respective springs and elastic arrays) which all have approximately the same neutral height.

As previously discussed, FIG. 16A and FIG. 17A illustrate the use of a traditional wire spring as an elastic array (configuration 1004). It is considered by the inventor to be inferior due to a soft virtual volume, thickness of the device (to achieve the same tension) or weak tension (to achieve a small thickness), uneven upward force (due to a single point of contact) and ability to stretch far beyond desired maximum height and ability to break with less force than other embodiments (due to a single elastic element). Assuming the same thickness is achieved as other embodiments shown in the figures, the "zone of contact" 453 with fingers may contain multiple elastic elements against the fingers, but they feel soft due to radial bending and overall spring weakness.

Figure 16B:
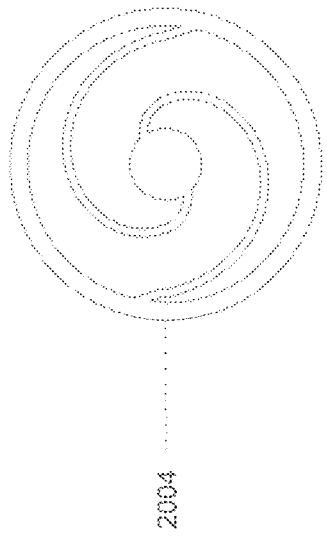
FIGS. 16A-16D are top views of springs and elastic arrays in accordance with illustrative embodiments of the invention.
Figure 17A:
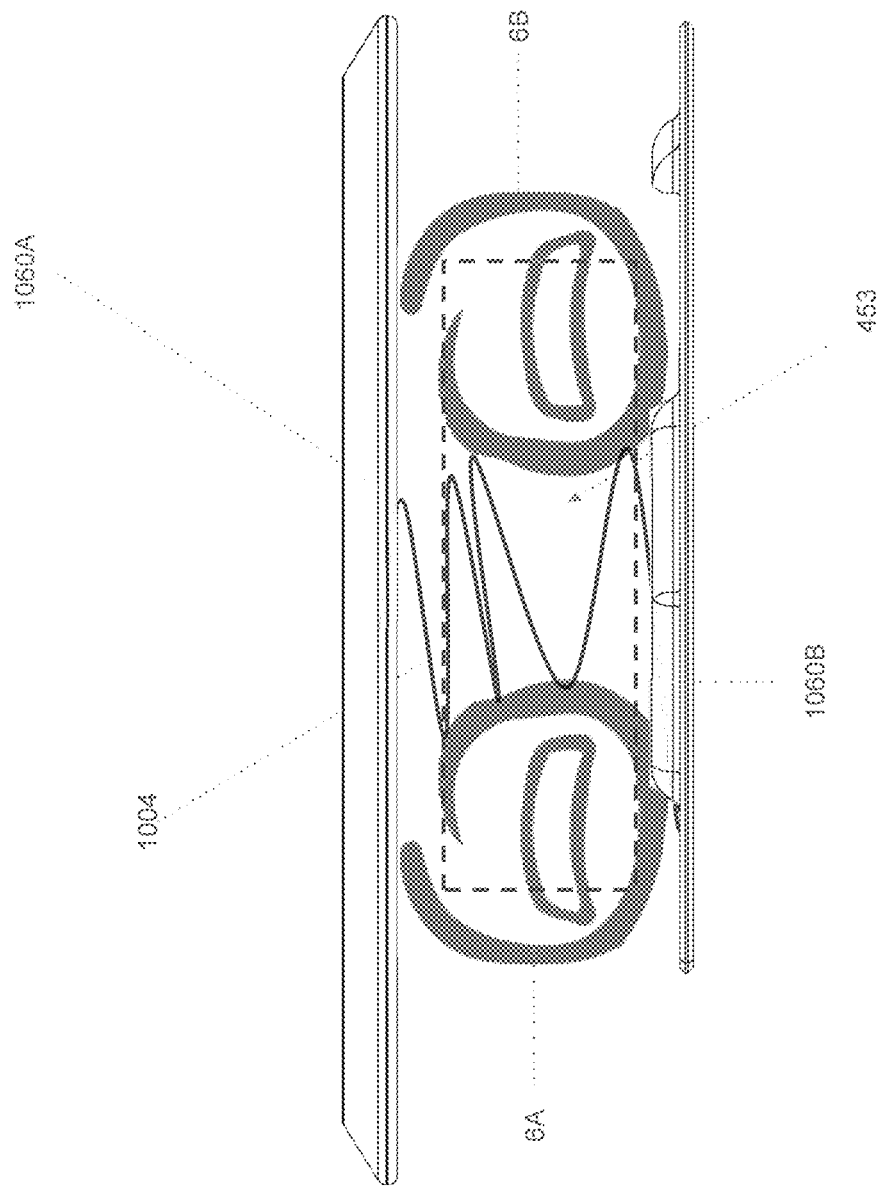
FIGS. 17A-17D are side views of a user putting a finger against an expanded expandable grip that uses the respective spring or elastic array shown in FIG. 16A-D in accordance with illustrative embodiments of the invention.
Figure 17B:
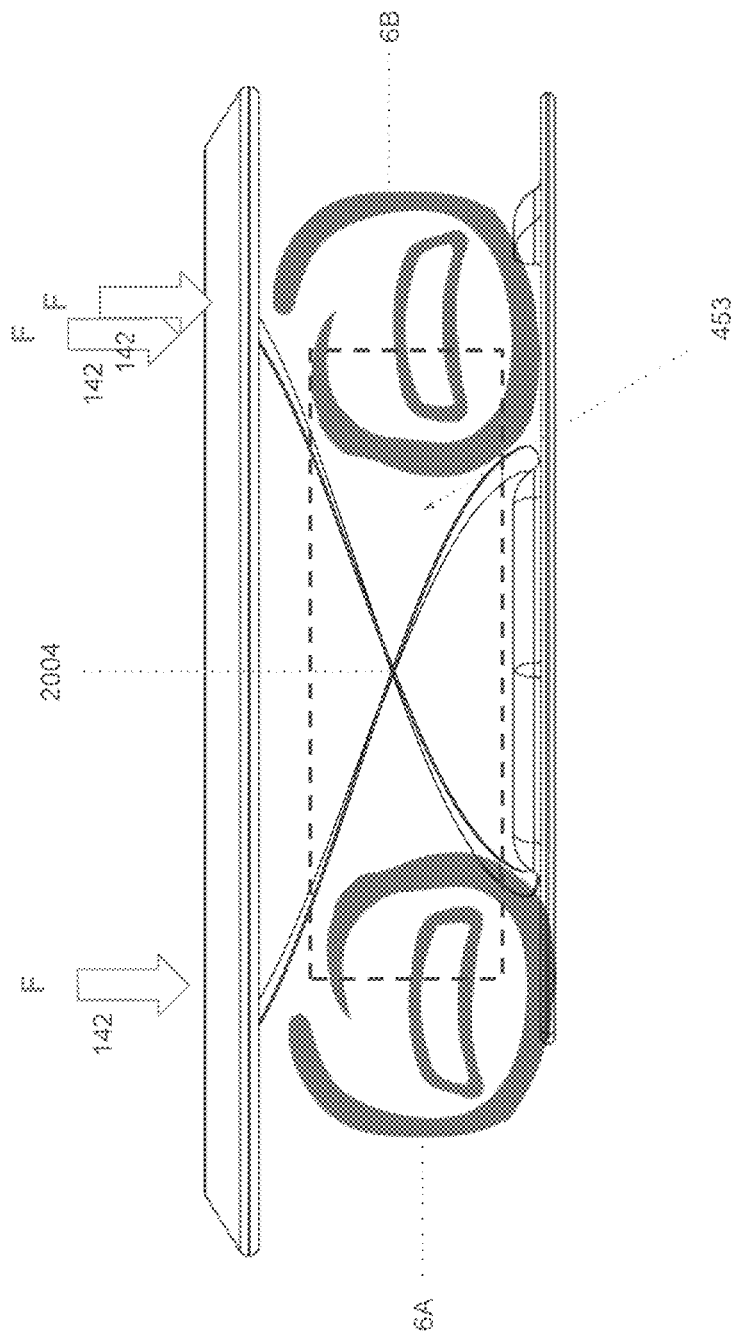

FIG. 16B and FIG. 17B illustrate an embodiment which uses two elastic elements 441, e.g., in the form of thin metal strips (e.g., less than 0.5 mm thick with non-rounded edges) at a rotational angle of 180 degrees (configuration 2004). Illustrative embodiments with thin metal strips lack at least three advantages of other embodiments. First, since there are so few elastic elements and they go up at such a steep angle, the fingers have very little to push against in the zone of contact 453. Furthermore, the wire strips are so thin that they feel very sharp and uncomfortable to the user 6. Additionally, because the rotational angle is small, and the elastic elements 441 are short (i.e., don't extend around a large angle), the expandable grip 1 neutral height and maximum height are significantly reduced compared to some other embodiments. Therefore, the expandable grip reaches a maximum height much faster and pushes back on the user's fingers 6A and 6B with a considerably heavier contraction force 142 when the array 4 is expanded beyond the neutral position (which is likely to be the case when the user's fingers are positioned under the top 100 and grasp the array 4).

Figure 16D:
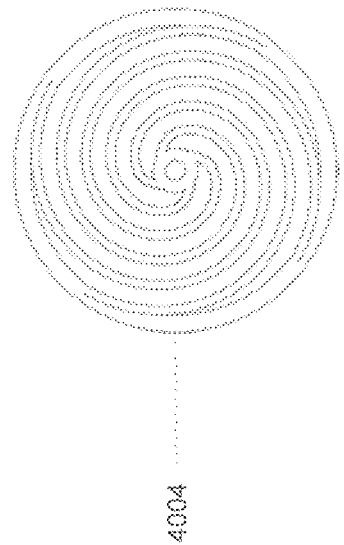
Figure 16A:
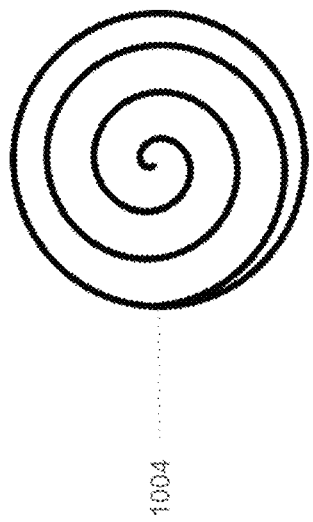
Figure 16C:
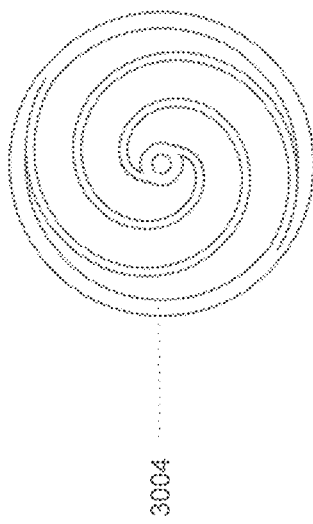
Figure 17C:
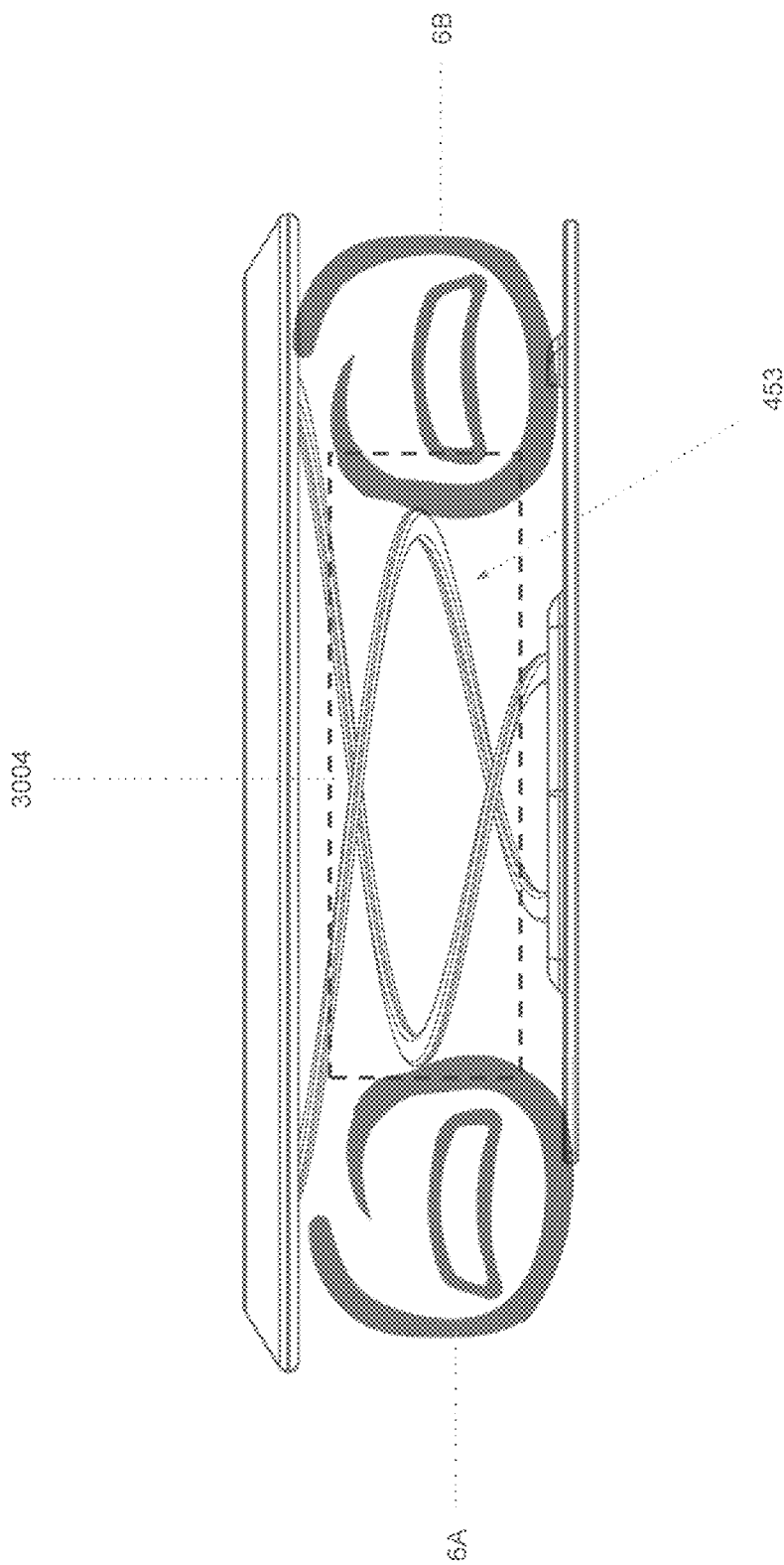

The array 4 shown in FIG. 16C and FIG. 17C has advantages over the arrays shown in FIGS. 16A-16B and FIGS. 17A-17B. This array 4 also has two elastic elements 441. However, these elastic elements 441 have a rotational angle of approximately 360 degrees (configuration 3004) and therefore the elements 441 have a greater length. Furthermore, the elements 441 preferably are coated, e.g., with a plastic or rubber, so they are thicker than 0.5 mm and have rounded edges. In FIG. 17C, the zone of contact 453 with the user's fingers 6A and 6B contains at least one elastic element 441 to push against for each finger, and the element 441 is thicker and more comfortable for the user's fingers. Additionally, because the elastic elements 441 are longer, they have more room to stretch and are not close to reaching their maximum height when the user inserts their fingers 6A and 6B and therefore provide ample room and a comfortable contraction force for a variety of different sized fingers.

Figure 17D:
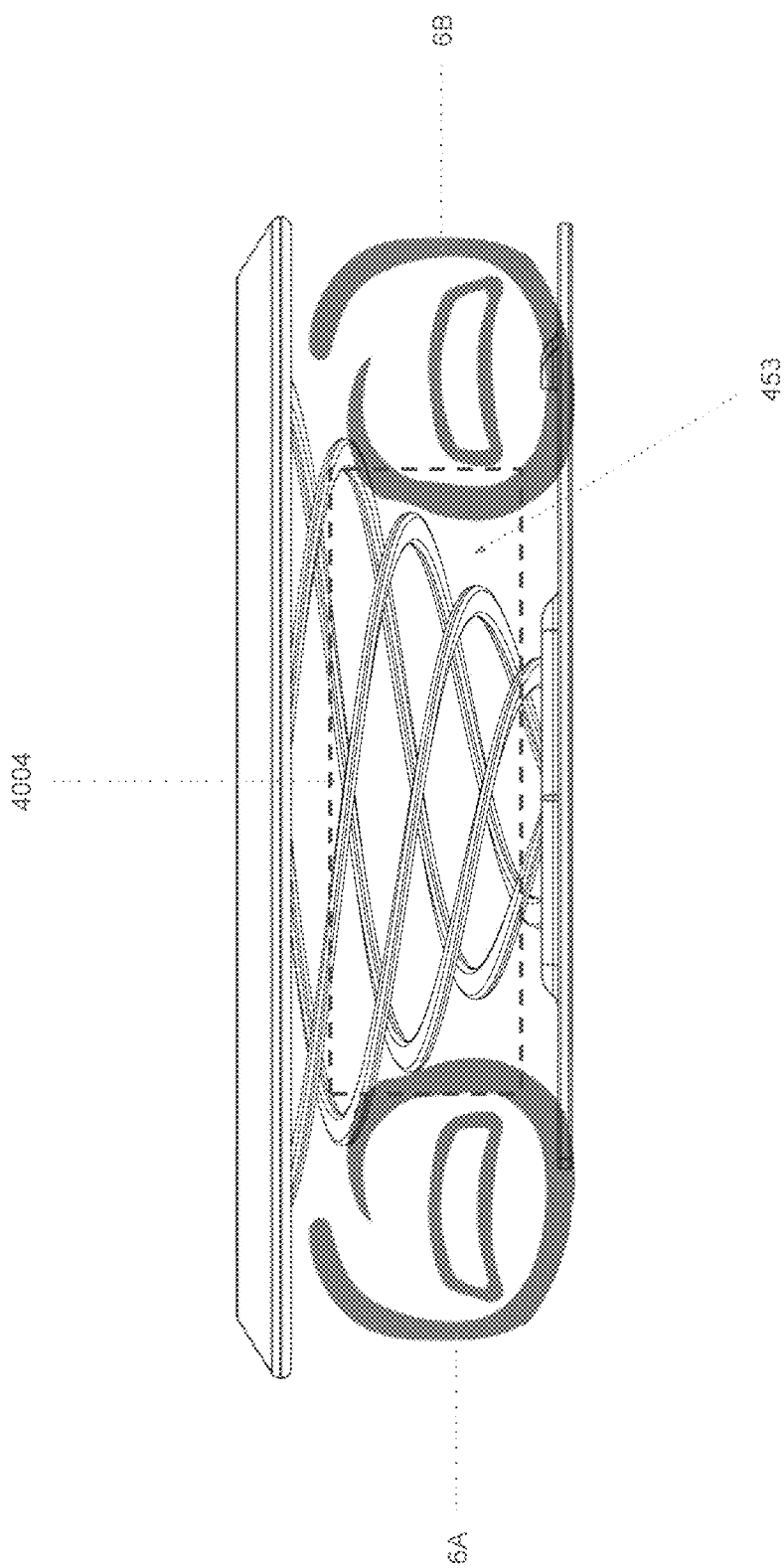

A fourth alternative is shown in FIG. 16D and FIG. 17D, which provides further advantages over the embodiments shown in FIG. 16C (the elastic array) and FIG. 17C. Here, the array 4 includes four elastic elements 441 having a rotational angle of about 360 degrees (configuration 4004). Furthermore, the elements 441 preferably are coated, e.g., with plastic or rubber, so they are thicker than 0.5 mm and have rounded edges. The user's fingers 6A and 6B make contact with multiple elastic elements (perhaps up to 3 depending on finger angle) in the zone of contact 453. These elements 441 are thick and comfortable to the touch so that the elastic array 4 forms a comfortable solid virtual volume for the user's fingers 6A and 6B. For example, if the array shown in FIG. 17C has a contraction force 142 of 0.8 lb against the user's fingers (and likely an expansion force of roughly equal value), the array 4 shown in FIG. 17D may have a contraction force 142 of about 1.6 lb, which advantageously feels more secure to the user. Another embodiment (not shown) may add additional elastic elements 441, which may provide an even more solid virtual volume to the user. However, one of skill in the art understands that in some embodiments too many elements 441 may produce too heavy of a contraction force.

Therefore, it can be seen, as outlined above, that a preferred embodiment of the expandable grip 1 utilizes a metal elastic element core 443 with a non-metal elastic element coating 442 to create 3-5 elastic elements 441 having rounded corners, where each elastic element has a thickness greater than 0.5 mm for comfort and less than 1.5 mm to preserve overall device thinness, and with the overall elastic array 4 compression strength (i.e., the force required to press the grip from the expanded configuration to the collapsed configuration) being between 1 lb and 2 lb. Illustrative embodiments may have an elastic element 441 rotational angle $\Theta$ of about 360 degrees which, when the elastic array diameter is approximately 30 mm, produces an elastic element 441 length of approximately 64 mm and ensures the user can expand the grip 1 to the desired maximum height with their fingers 6A and 6B. Various embodiments may employ an elongated elastic element 441 cross-section so that, amongst other characteristics, the elements 441 bend easily up and down, but not radially in and out towards the center of the device. Various embodiments may also have a neutral height such that there is approximately a 10 mm gap between the magnetic base 3 and the top 100 when in the expanded state so that the user may insert their fingers and feel a compression force downwards to produce a more secure grip. However, various embodiments may include a smaller gap (e.g., 6 mm gap) or a larger gap (e.g., 18 mm gap).

Figure 20:
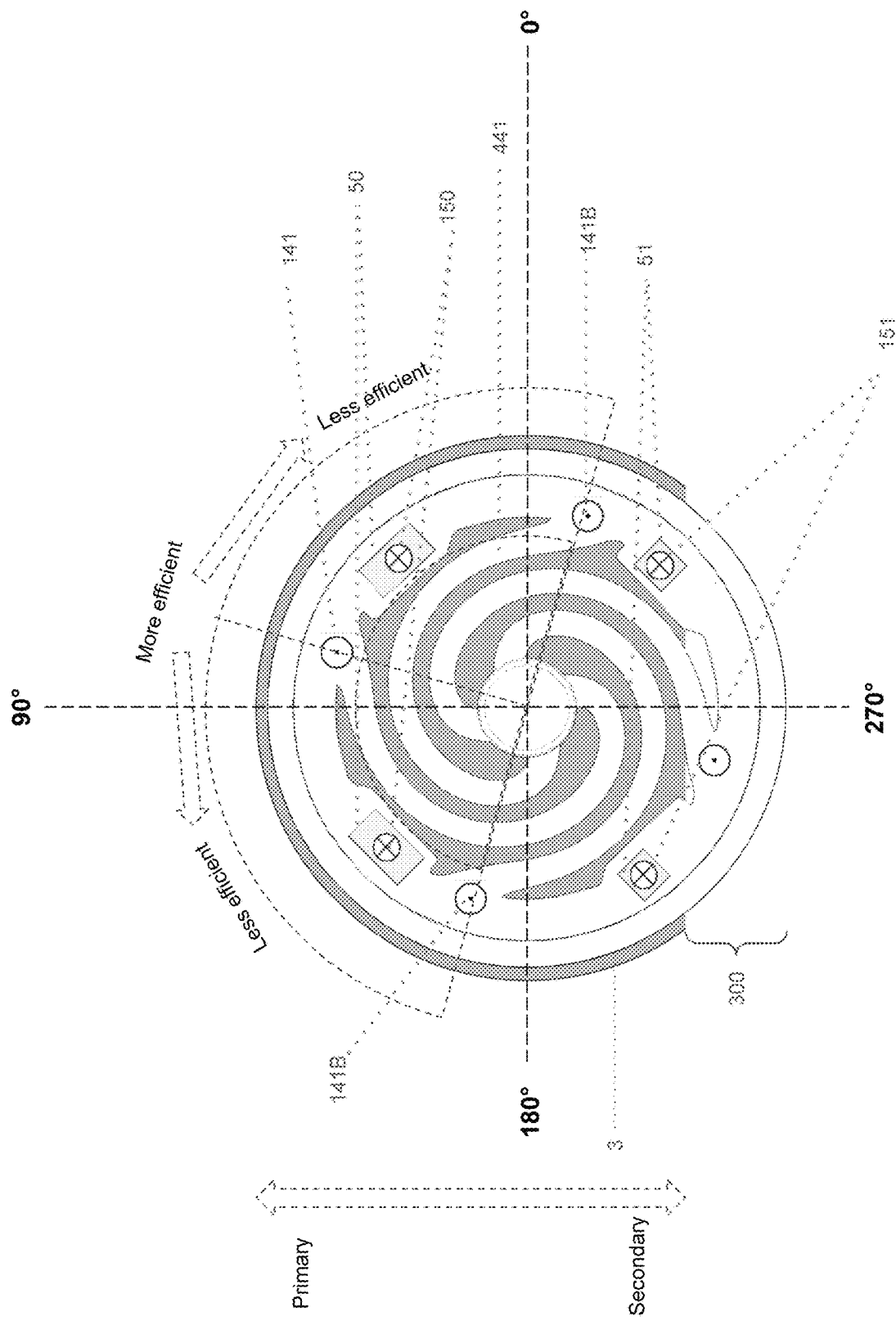
FIG. 20 shows a cutoff top view of the expandable grip with additional guides for magnet placement in accordance with illustrative embodiments of the invention.

FIG. 20 is a cutoff top view of the expandable grip 1 with additional guides for magnet placement in accordance with illustrative embodiments of the invention. In various embodiments, magnet strength and placement within the expandable grip 1 (e.g., within the frame) is configured so that the sum of the magnetic forces 150, 151 is more than the sum of the expansion forces 141 in the collapsed state. If the contraction forces from the magnet are not greater than the expansion forces 141, then the expandable grip 1 may require additional forces to counteract the expansion forces 141 to maintain the collapsed state shown in FIG. 5.

As described previously, the elastic elements 441 produce an upward expansion force 141 on the elastic frame 401, and thus, the entire top 100 of the device. Illustrative embodiments position magnets within the expandable grip 1 relative to the location of the upward expansion force 141 on the elastic frame 401. FIG. 20 illustrates magnetic forces 150, 151 going down towards the baseplate 3, as well as expansion forces 141 coming up from the elastic elements 441. Although only three expansion forces 141 are labeled in FIG. 20, the figure shows four expansion forces 141 (i.e., one from each element 441). For the expandable grip 1 to remain stable in the collapsed position, for each point of expansion force 141, illustrative embodiments provide a corresponding magnetic force 150, 151. In some embodiments, each of the corresponding magnetic forces 150, 151 is greater than the corresponding nearest expansion force 141 when the device 1 is in the collapsed position, such that the device 1 remains in the collapsed position. From a mechanical advantage standpoint, this means that magnetic forces 150, 151 which are nearer to the point of expansion force 141 are more efficient and provide more stability, whereas magnetic forces 150, 151 further from the point of expansion force 141 are less efficient. The markings on FIG. 20 indicating more efficient and less efficient are with respect to the magnetic force 150, 151. Although moving the magnetic force 150, 151 further away from a particular expansion force 141 may become less efficient with respect to a given expansion force 141, the magnetic force 150, 151 may move closer to a different expansion force 141B, and therefore become more efficient with respect to the different expansion force 141B.

Accordingly, within the elastic frame 4, illustrative embodiments advantageously place magnets 50, 51 adjacent to where the elastic elements 441 meet the frame and produce an expansion force 141 upward, without sacrificing other aspects of illustrative embodiments. Placing the magnets 50, 51 in relatively close proximity to the elastic elements 441 increases the stability of the device in the collapsed state. Advantageously, because a smaller magnetic force 150, 151 can be used due to mechanical efficiency, smaller magnets 50, 51 can be used, which aids in reducing the thickness of the expandable grip 1.

Figure 21:
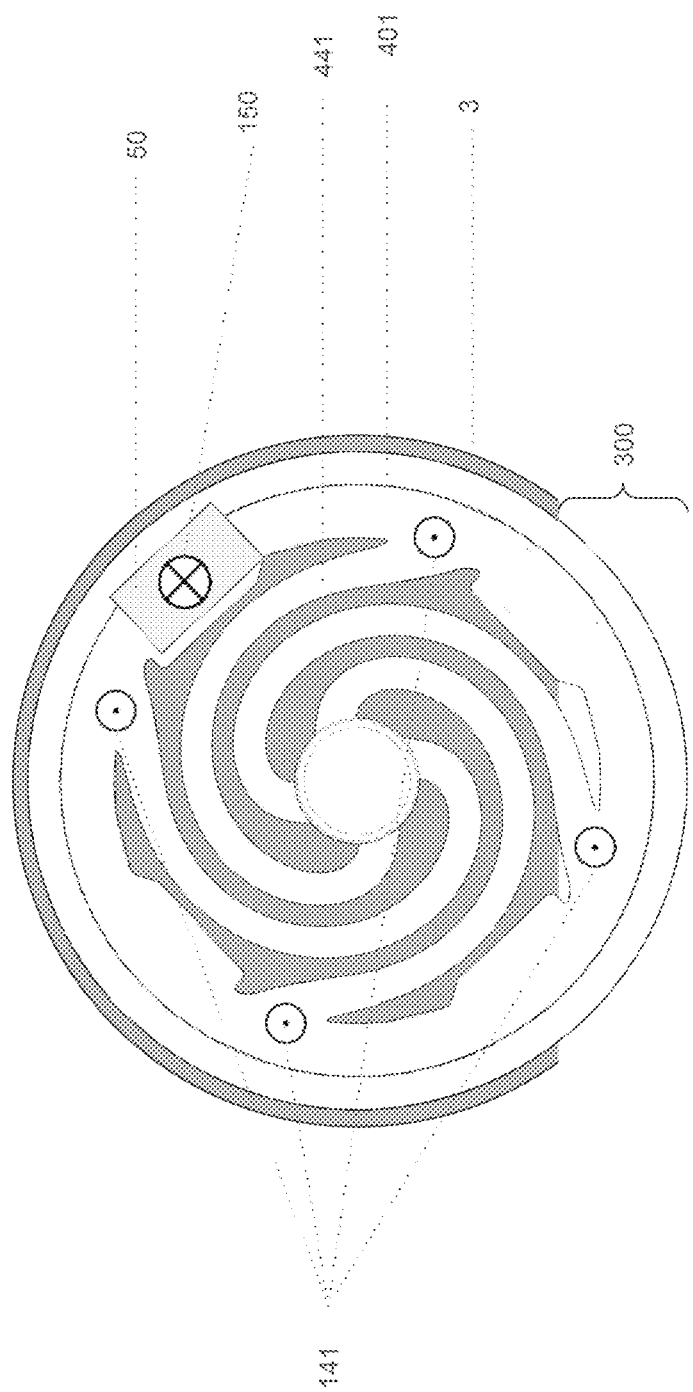
FIG. 21 is a cutoff top view of the expandable grip using two elastic elements and two magnets in accordance with illustrative embodiments of the invention.

As an additional example, an illustrative embodiment having a large magnet 50 to maintain the collapse position is shown in FIG. 21. A giant magnet 50 produces one large magnetic force 150 which is so large it can hold down all of the expansion forces 141 including the ones which push on the opposite side of the elastic frame 401. It can be seen that the expansion forces 141 have a large mechanical advantage to push up the magnet 50 because of the large distance between forces (similar to the mechanical advantage of a lever). Therefore, the single magnet 50 is very large and thick for stability and to prevent the user from accidentally expanding the device by lightly disturbing the elastic array 4 (e.g., by simply touching or tapping) on the opposite side (i.e., near the kick area). Accordingly, to assist with maintaining the low-profile of the device 1, illustrative embodiments may position a magnetic force adjacent to a corresponding expansion force. For example, a magnetic force may be in closer proximity to a particular expansion force than any other expansion force (as opposed to equidistant from the various expansion forces). However, in some embodiments, the magnetic force may be equidistant between expansion forces.

Returning to FIG. 20, multiple magnetic forces 150, 151 may contribute to holding down the expansion force 141. In various embodiments, the sum of the magnetic forces 150, 151 exceed the expansion forces 141, otherwise the device would not remain collapsed without some additional retention force. Previously, illustrative embodiments described that each of the corresponding magnetic forces 150, 151 is greater than the corresponding nearest expansion force 141 when the device 1 is in the collapsed position, such that the device 1 remains in the collapsed position. However, it should be understood that various embodiments may use multiple magnetic forces 150, 151 to overcome a particular expansion force 141 (e.g., two magnets for each expansion force, one on either side). Other embodiments may use a single ring shape magnet or multiple ring segments. Furthermore, illustrative embodiments may use the totality of magnetic forces to overcome expansion forces (e.g., not on a one-to-one basis). Furthermore, some embodiments may use other forces (e.g., friction fit between parts) beyond the expansion forces 141 and magnetic forces 150, 151 described herein to effectuate the expansion of the device and also to retain the device in the collapsed configuration.

Two types of magnets are described in the figures: primary 50 and secondary 51. The differentiation in name is used to illustrate the difference in function (or effect) depending on magnet mounting location. The difference in function revolves around the magnetic forces 150, 151 rather than the properties of the magnets 50, 51. The secondary magnet's 51 magnetic force 151 acts mostly against the compression force of the elastic array 4. The primary magnet's 50 magnetic force 150 acts both against the compression force of the elastic array 4 AND the user force 106 when applied over the kick area 300 as shown in FIG. 6 (i.e. the "user expansion force"). Primary magnets 50 and secondary magnets 51 may be larger, smaller or the same size as each other depending on the expansion characteristics desired. The primary magnet 50 significantly modulates the amount of user force required to expand the device 1. For example, larger primary magnets 50 increase the amount of user force 106 required to expand the device 1, and smaller primary magnets 50 decrease the required user force 106 to expand. However, as stated above, both magnet types 50, 51 create magnetic forces 150, 151 that act to counteract the expansion forces 141 and keep the device 1 collapsed. However, various embodiments are not limited to the primary magnet and secondary magnet arrangements described herein. Indeed, some embodiments may have no secondary magnets, for example.

Figure 22:
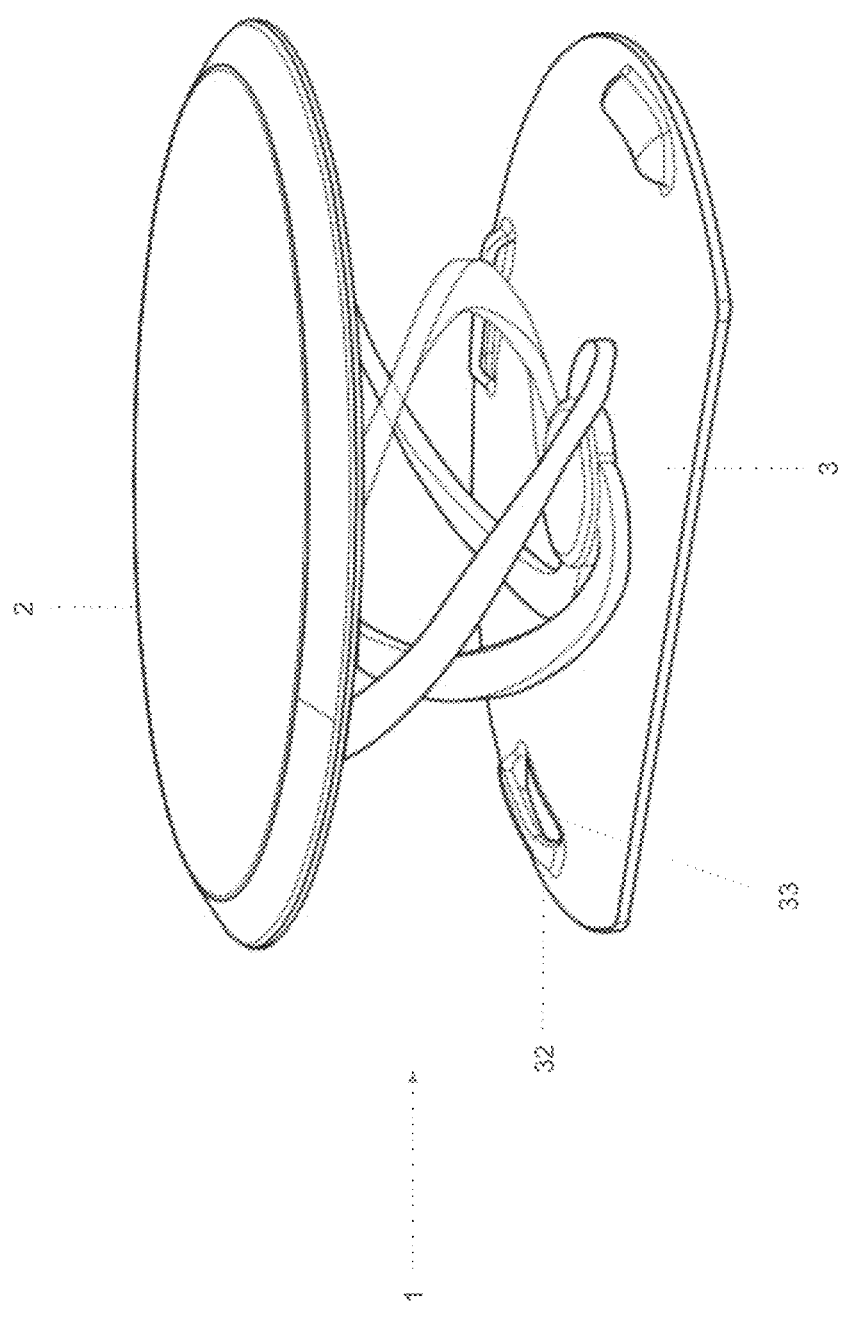
FIG. 22 is a perspective view of the expanded expandable grip in accordance with illustrative embodiments of the invention.
Figure 23:
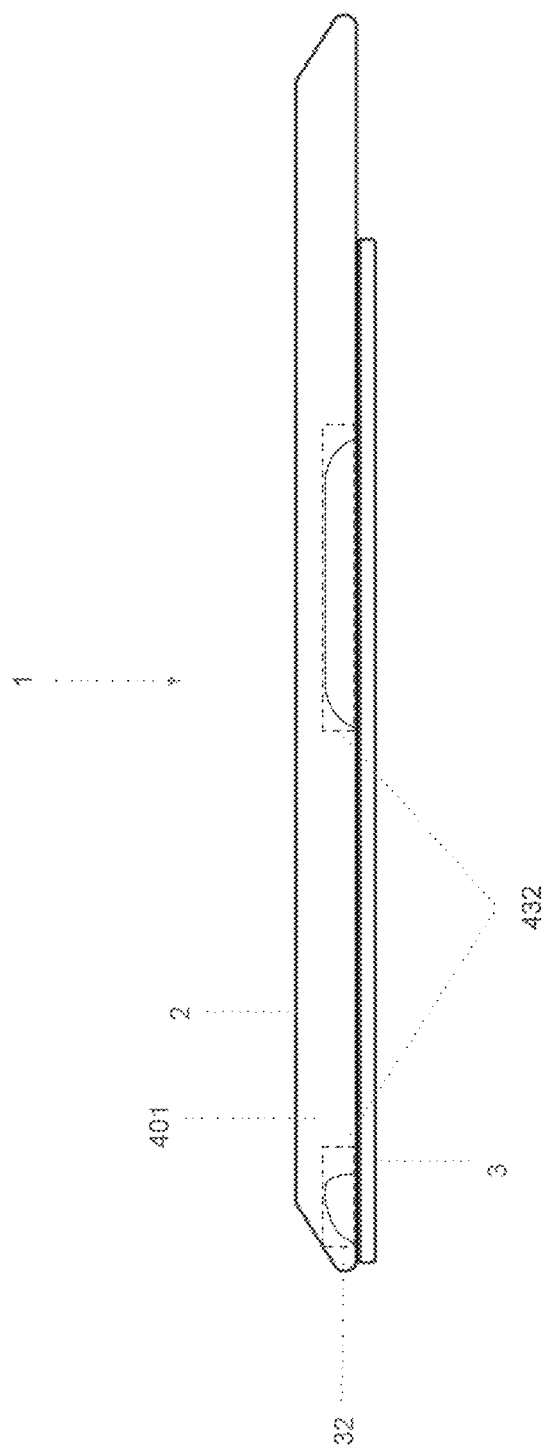
FIG. 23 is a cutoff side view of the expandable grip with detents and detent pockets in accordance with illustrative embodiments of the invention.

FIG. 22 illustrates a detent 32 of the expandable grip 1. The detent 32 helps prevent dislodgement of the cap 2 from the recess 33. The detent 32, which may be a raised portion of the baseplate 3, may also have a concavity or recess 33 which goes partially or entirely through the baseplate 3. The recess 33 is configured to receive a portion of the top 100 and to hold the top 100 in a fixed orientation (e.g., so that the device 1 may operate as a stand). In various embodiments, the detents 32 may be omitted, but the thickness of the baseplate is undesirably increased to provide a larger recess 33. In order to further provide a thin device 1, detent pockets 432 may also be positioned in or under the elastic frame 401 shown as dotted lines in FIG. 3 and FIG. 23. For simplicity, magnets are not shown in FIG. 23. The detent pocket 432 allows the expandable grip 1 to fully seat in the collapsed state as the detent 32 sticks up from the baseplate 3 but is retained within the detent pocket 432 inside the frame 401, advantageously reducing thickness in the collapsed configuration.

Figure 24:
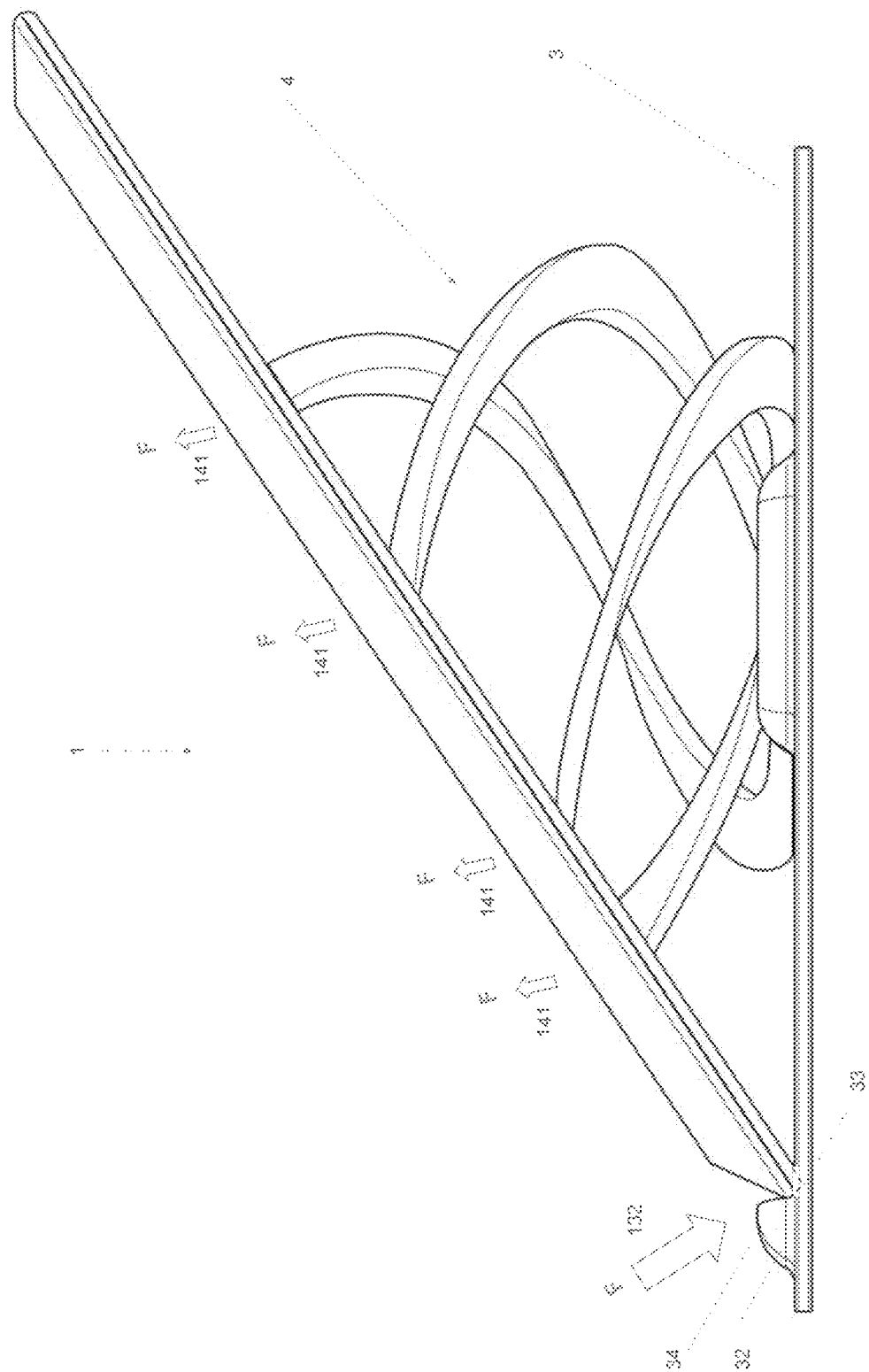
FIG. 24 shows the expandable grip in stand mode in accordance with illustrative embodiments of the invention.

FIG. 24 illustrates the expandable grip 1 placed in a stand configuration. Stand configuration is achieved by leaning the top of the device 1 over and placing a portion of the top 100 next to the detent 32 (on the center side) and inside a recess 33 so that at least a portion of the top 100 is positioned in or through the magnetic baseplate 3. Expansion forces 141 try to push the top 100 upwardly, but the top 100 is locked in place because the outer edge of the top 100 (i.e. the cap) is caught within the recess 33 pressing up against the detent 32 and cannot be moved without a user force 106 manually pulling the top 100 from the recess 33. Some embodiments, however, may not have detents 32, and may merely rely on the thickness of the recess 33 to hold the top and operate as a stand. However, in various embodiments, relying on the thickness of the recess 33 to operate as a stand increases the thickness of the base 3 and thus, the overall thickness of the device 1. Thus, illustrative embodiments having detents 32 advantageously provide a thin stand.

The detents 32 advantageously may be configured to provide a stand having an acute angle (e.g., less than 90 degrees) between the top and the mobile device 8. The device 1 may be configured in such a way that the elastic array 4 bends so that the edge of the cap easily locks into the detents 32. Stated another way, the detents 32 may be positioned in such a way so as to allow a user to easily press on the top, when in the expanded configuration, so that the elastic elements 441 bend and the cap falls into place within the detent 32. Furthermore, the outer surface 34 of the detent 32 may be curved or angled upwardly to help guide the top 100 into the interior of the detent where the top comes to rest. The curved outer surface also acts as a comfort mechanism to the user as their fingers pass over this feature when using the device.

While in the stand configuration, the expandable grip 1 can be used to prop up a mobile device 8 in both portrait (FIG. 25) and landscape (FIG. 26) (e.g., when adhered to the back and placed on a flat surface 7 such as a table).

As best shown in FIG. 1, the elastic frame 401 may be hollow in the middle and open on top. In various embodiments, this configuration provides a manufacturing/material advantage (e.g., the elastic array is formed from plastic and it is difficult to manufacture a very thin durable top). Additionally, illustrative embodiments provide an efficient assembly method, (e.g. the magnets 50, 51 are positioned into the magnet pockets 450,451 from the top). By positioning the magnets 50, 51 within the elastic array 4, the magnets 50, 51 add little or no thickness to the elastic array 4. There are many reasons that a durable smooth material (e.g., stainless steel) may be desired to be used as a cap 2, such as to provide a rigid solid smooth top of the expandable grip 1.

Figure 27:
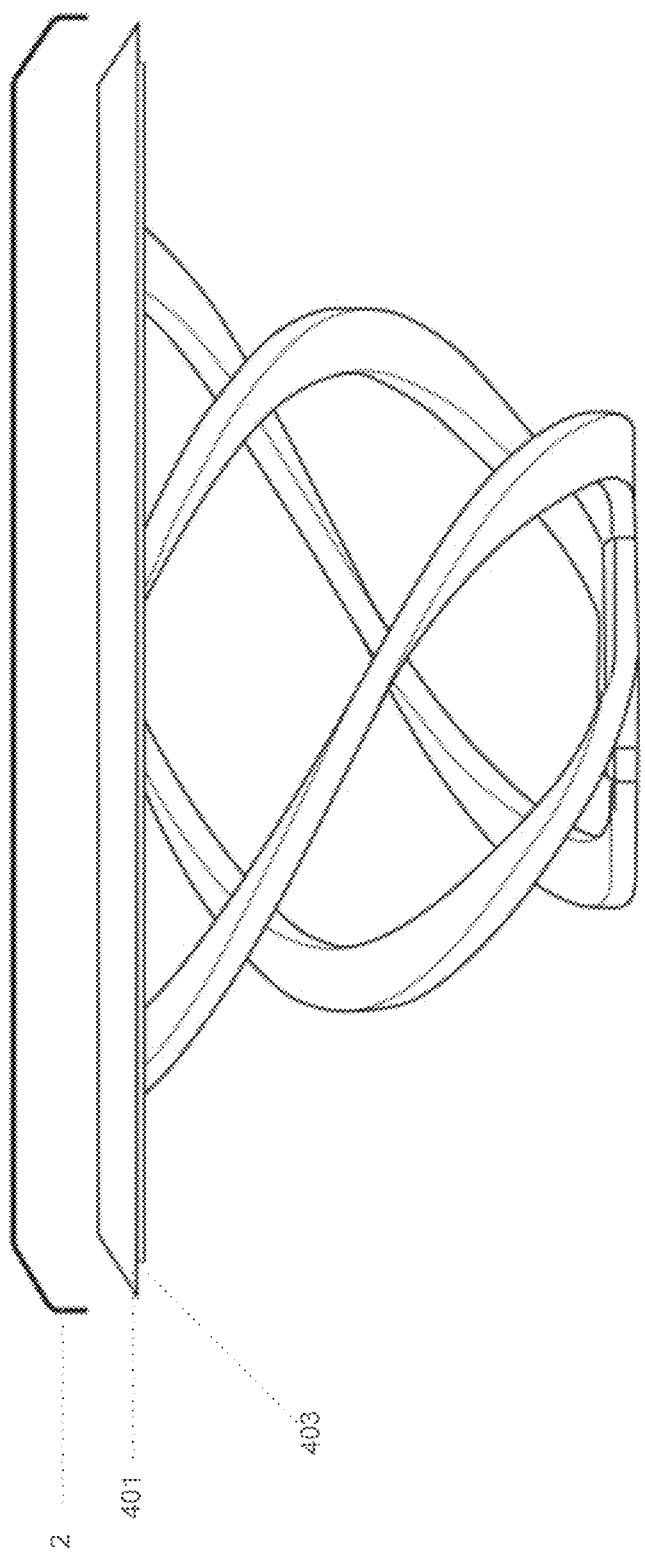
FIG. 27 is a side view of the expandable grip with a cap positioned above the expandable grip in accordance with illustrative embodiments of the invention.
Figure 28:
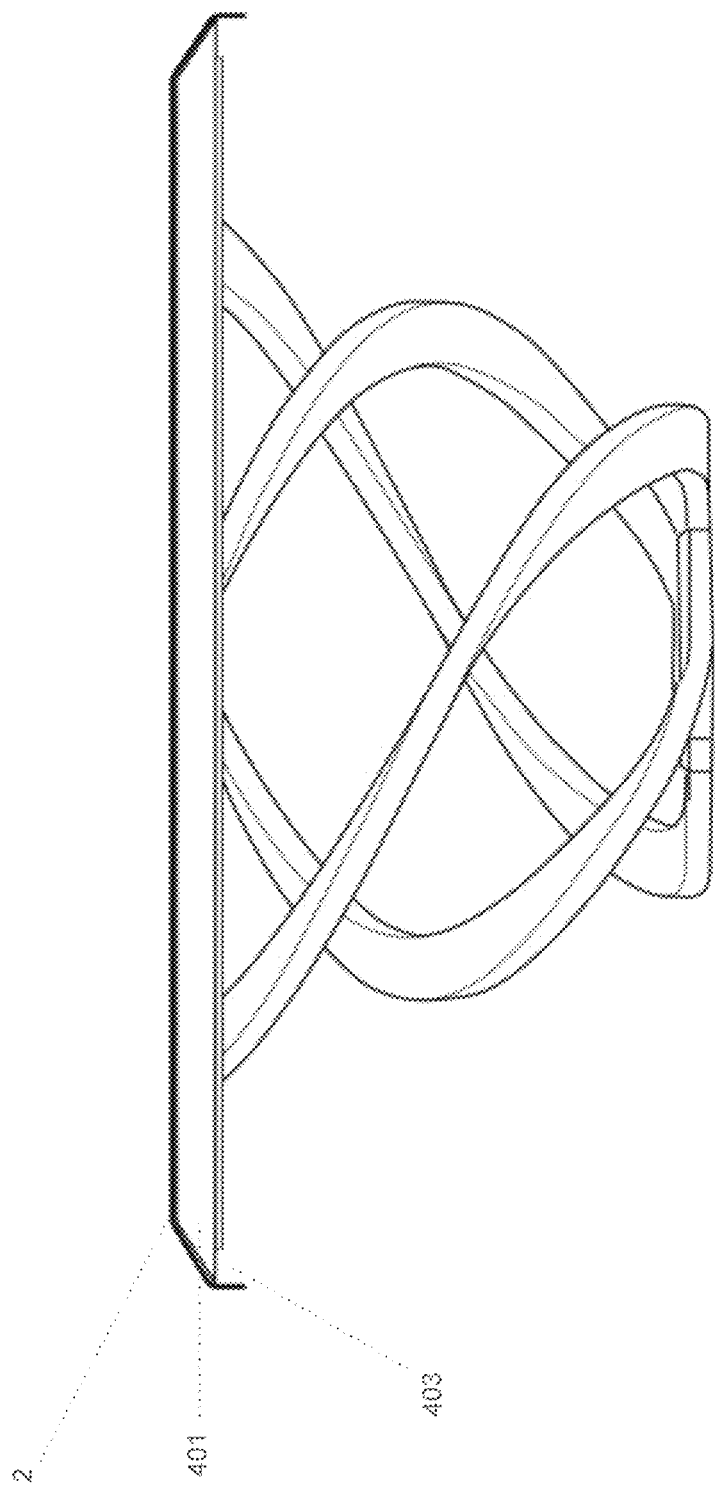
FIG. 28 is a side view of the expandable grip with the cap positioned on the elastic frame in accordance with illustrative embodiments of the invention.
Figure 29:
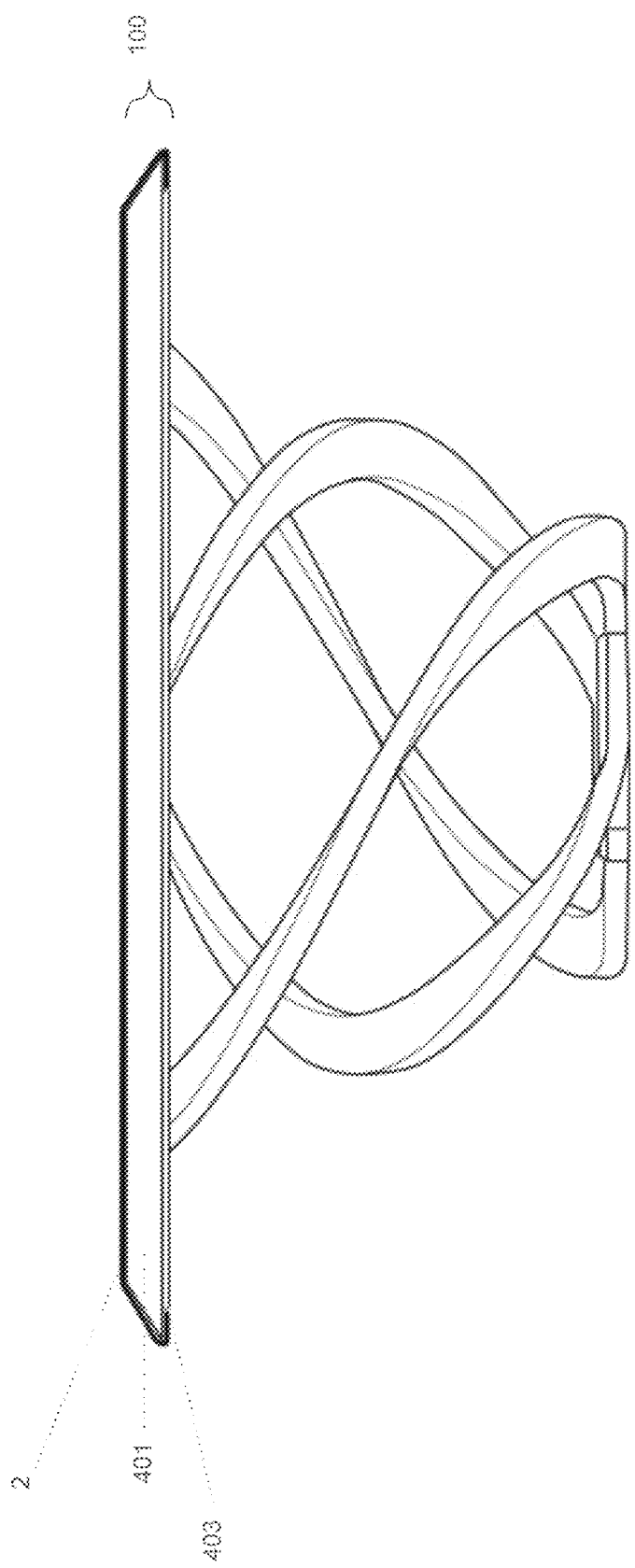
FIG. 29 is a side view of the expandable grip with the cap coined around the edges of the elastic frame in accordance with illustrative embodiments of the invention.

FIG. 27, FIG. 28 and FIG. 29 illustrate a process of installing the cap 2 onto the elastic frame 401. This process may also be referred to as "coining". The cap 2 may be formed from a thin malleable material (e.g., stainless steel). The cap 2 is positioned above the elastic frame 401 as shown in FIG. 27. The cap is then positioned on the frame 401 as shown in FIG. 28. The cap 2 may be securely installed on to the elastic frame 401 by bending the edges of the cap around the perimeter of the elastic frame 401. The bent edges of the cap 2 may be contained within an elastic frame shelf 403, which is a recess around the perimeter of the elastic frame 401 (e.g., a ring-shaped recess). Bending the cap 2 into the elastic frame shelf 403, as shown in FIG. 29, ensures that after the coining is complete, the underside of the top 100 of the device 1 is essentially smooth and the coined cap 2 has not added significant (or any) thickness to the bottom of the elastic frame 401. Without the frame shelf 403, the cap 2 could still be coined over the elastic frame 401. However, the underside of the top 100 may become uneven and the thickness of the cap 2 material adds to the overall thickness of the Expandable Grip 1 in the collapsed state.

Figure 30:
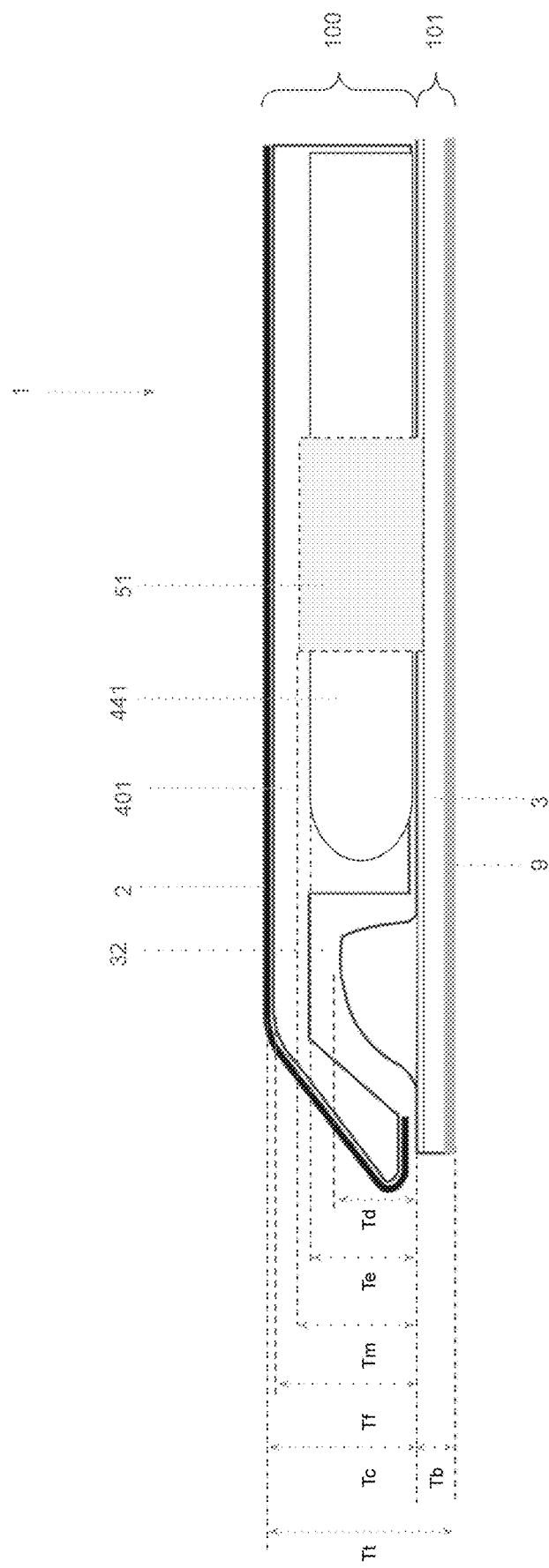
FIG. 30 is a cutoff side view of the expandable grip which illustrates various thicknesses in accordance with illustrative embodiments of the invention.

FIG. 30 illustrates some of the thicknesses of the expandable grip 1 to illustrate how a cross-section of the device 1 may stack up. As shown in FIG. 30, the majority of the elements are contained within the top 100 of the device within cross-sectional envelope of the cap 2 in the collapsed configuration. The detent 32, magnets 50, 51 and elastic elements 441 are all collocated inside the top 100 of the device 1, and can be considered to have a thickness (Td), (Tm), and (Te), respectively. The thickness (Te) of the elastic elements 441 is also shown as thickness 66 in FIG. 19B. In various embodiments, the two thicknesses that contribute to the thickness of the entire top 100 (Tc) of the device 1 are the elastic frame thickness (TO and the additional non-overlapping thickness of the material used for the cap 2, for a total thickness of the top 100 of Tc. The bottom of the device 1, which can be considered as the baseplate 3 and adhesive 9, may be a very small thickness (Tb) since only a small angle is required to expand the device 1 as shown in FIG. 7 and described above. The total height of the expandable grip 1 (i.e., the distance it protrudes from an electronic device or a case thereof in the collapsed configuration) is the sum of the thicknesses of the top (Tc) in the collapsed configuration plus the thickness of the bottom (Tb) for a total height of Tt. Although not shown in FIG. 30, in some embodiments the magnets 50, 51 may slightly protrude downwardly from the top 100 to ensure contact with the baseplate 3 and therefore may add some small amount of height to the device.

Because of how the expandable grip 1 is used, the top 100 of the device is comfortable for the user if greater than a certain thickness (e.g. 1 mm). The inventors believe that the reason for this is a very thin top (e.g., 0.25 mm) is sharp and could potentially cut or feel uncomfortable to the user's fingers. Therefore, illustrative embodiments advantageously push the larger components, such as the elastic elements 441, magnets 50, 51 and detents 32, into the top of the device to take advantage of this desired thickness. If these elements were positioned into the bottom 101 of the device 1, the bottom thickness (Tb) increases AND the top thickness (Tt) may remain thick to preserve comfort. It therefore can be seen that the expandable grip 1 may advantageously be configured to be used as a grip and/or a stand all while maintaining an extremely thin form factor (i.e. a total thickness (Tt) under 3.5 mm). This thin form factor reduces the likelihood that the device 1 may get caught on other items (e.g., in the pocket of the user when being pulled out of the pocket). Furthermore, the top 100 may have a curved or angled surface to help slide over other items, thereby reducing the likelihood of the device 1 getting caught on other items.

Illustrative embodiments couple with various electronic devices. For example, illustrative embodiments may couple the base 3 with a mobile device or a case of the mobile device. For purposes of this application, the base is considered to couple with the mobile device or the case of the mobile device if it is in direct or indirect contact with the mobile device or the case. Thus, if the base 3 contacts an intermediate piece that then couples to the phone or the case, the base is considered to be coupled with the mobile device or the case. To that end, the base 3 may include an adhesive, such as a permanently applied adhesive (e.g., glue). In other embodiments the adhesive 9 may be restickable (e.g., magnets or a microsuction film). In yet other applications there may be no adhesive 9 layer (e.g., an electronic device could contain a magnet (e.g., Apple magsafe) that attracts the baseplate 3). Furthermore, in some embodiments, the base 3 may be formed into the mobile device or a case of the mobile device. For instance, a mobile device or case may be built having the base 3 and the kick area 300 formed integrally with the device/case (e.g., the kick area 300 may be formed from removed material). In some embodiments, thus, the portion (or some portion) that "sticks" out from the case/phone is the height that the top 100 extends from the base 3 (Tc). Although not shown in FIG. 30, the height that the top 100 extends from the base 3 (Tc) may be increased if, for example, the magnet 51 increases the gap between the top 100 and the base 3. Additionally, or alternatively, the elastic elements may increase the gap between the top 100 and the base 3, and thus increase the height that the top extends from the base Tc, if the elements are not fully housed within the thickness of the top 100 while in the compressed state.

Although the elastic arrays 4 are shown in various figures as a helical downward facing conical shape, it should be understood that the elastic array 4, and the elastic elements 441, may be formed as an upward facing conical shape, an hourglass shape, a cylinder shape, or many other shapes that do not necessarily collapse perfectly into themselves and are not optimized for thickness or comfort, while still achieving many other advantages described herein. Furthermore, in some embodiments, the elastic array 4 may not collapse/compress and fit perfectly within the volume underneath the top 100. Accordingly, in some embodiments, the elastic elements 441 may increase the thickness (Tc) that the top 100 extends from the base 3.

Figure 31:
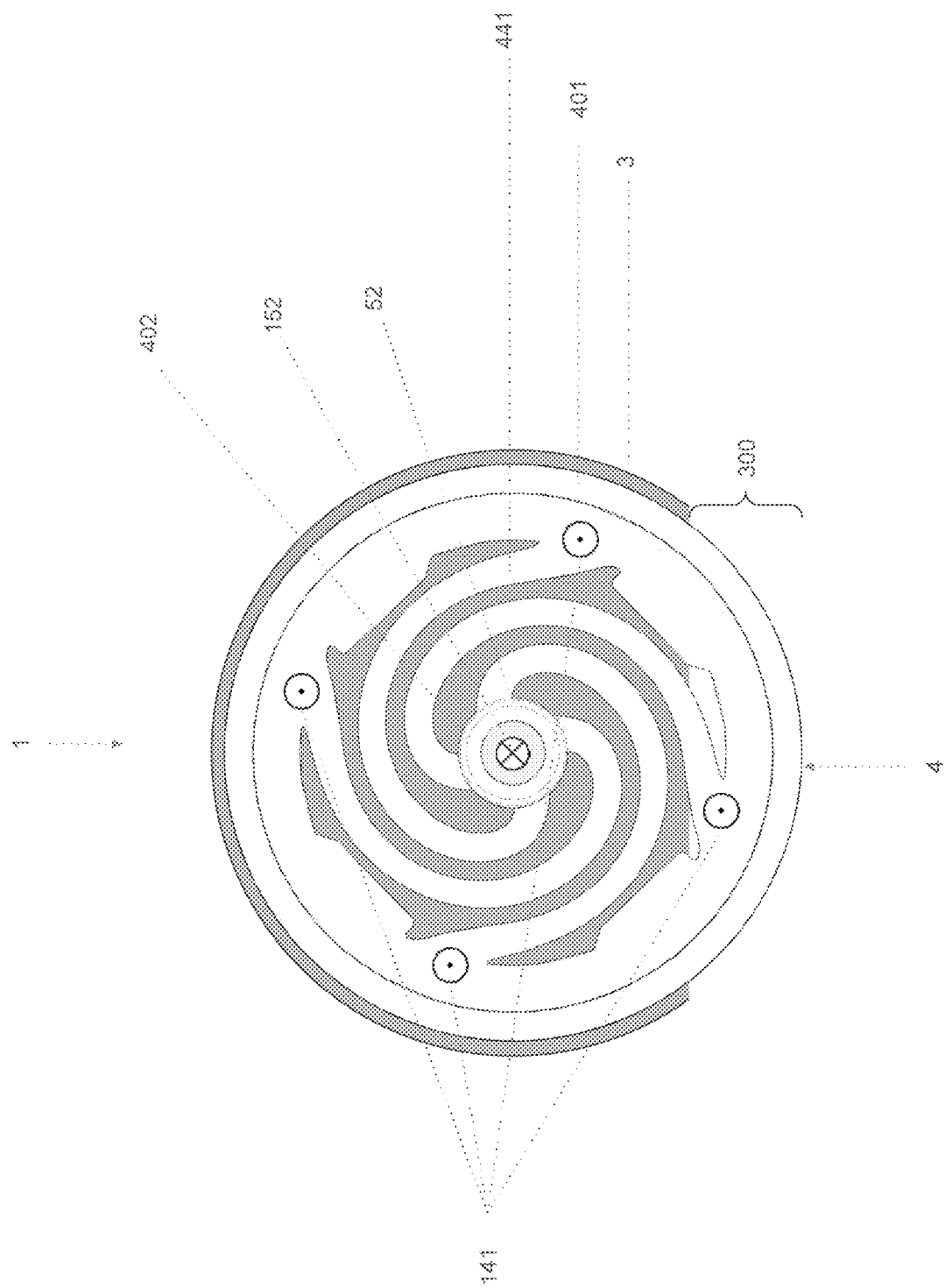
FIG. 31 is a cutoff top view of the expandable grip with a central magnet placement in accordance with illustrative embodiments of the invention.

FIG. 31 shows a single center magnet 52 mounted in the center of the expandable grip 1 that exerts a center magnetic force 152 downward towards the baseplate 3. However, illustrative embodiments having the center magnetic force 152 lack some of the advantages of illustrative embodiments with magnets placed around the edge of the elastic array 4, such as shown in FIG. 20. First, in order to achieve the appropriate neutral height, many elastic arrays 4 are spirals in a conical shape similar to those shown in figures. Therefore, where they come together in the center to a mechanical connection fastener 402 is a relatively small area and, in order to achieve the required amount of magnetic force 152 from the single central magnet 52 to counterbalance the expansion forces 141 within the area of the mechanical connection fastener 402, the magnet 52 is deep (i.e., thick) and therefore adds to the overall thickness of the expandable grip.

Figure 32:
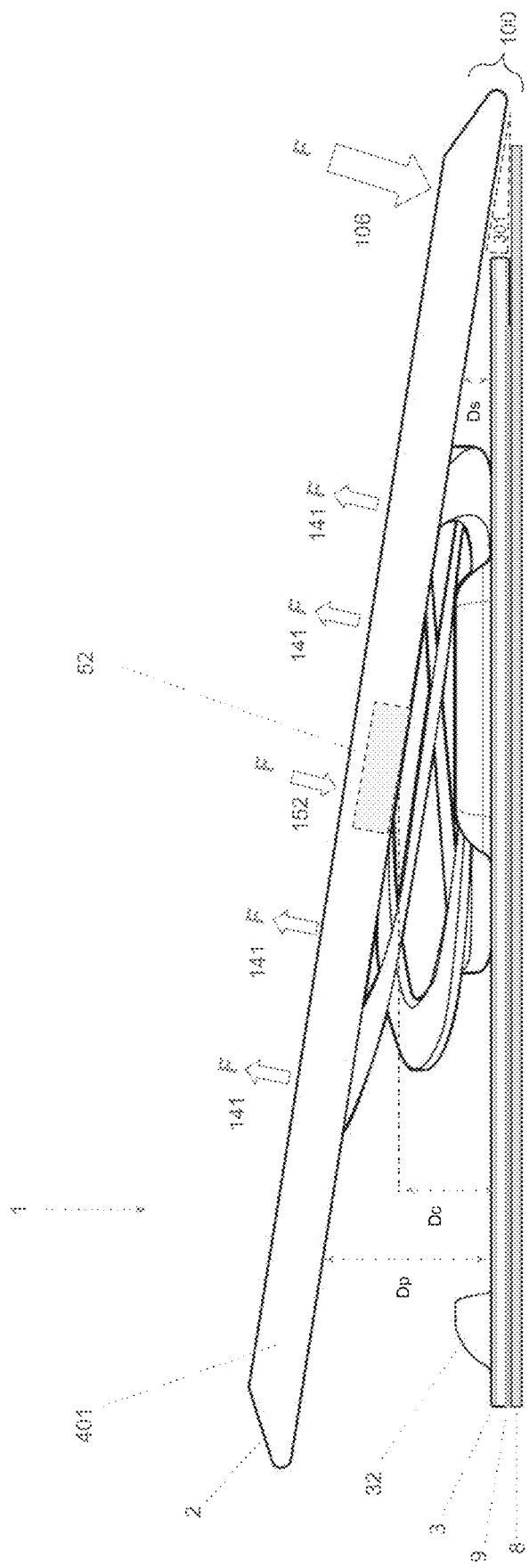
FIG. 32 is a cutoff side view of the expandable grip with a central magnet placement showing force lines and distance parameters in accordance with illustrative embodiments of the invention.

Another reason that using a center magnet 52 is not preferred is illustrated in FIG. 32, which is similar to FIG. 7 but with the center magnet 52 replacing both the primary 50 and secondary 51 magnets. In comparing FIG. 32 with FIG. 7, it can be seen that in both cases, when the user force 106 depresses the top 100 over the kick area 300, a small kick angle 301 is created. As discussed earlier regarding FIG. 7, the secondary magnet 51 may still be a small distance (Ds) from the baseplate and as such may still exert a secondary magnetic force 151 towards the plate. The primary magnet 50, because it is opposite the kick area 300, is relatively far away (Dp) from the baseplate 3 and as such has virtually zero magnetic force 150 towards the plate. As shown in FIG. 32, if a central magnet 52 is used, when kicked, the distance (Dc) created between the central magnet 52 and the baseplate 3 is somewhere between the distances of a primary magnet (Dp) and a secondary magnet (Ds). Therefore, some significant central magnetic force 152 may still be present in the system, which may prevent the device from expanding in a reliable and consistent manner. To ensure that the central magnetic force 152 is reduced to virtually zero, illustrative embodiments increase the kick angle 301, which increases the thickness of the baseplate 3, and, ultimately, increases the thickness of the expandable grip 1.

Figure 33:
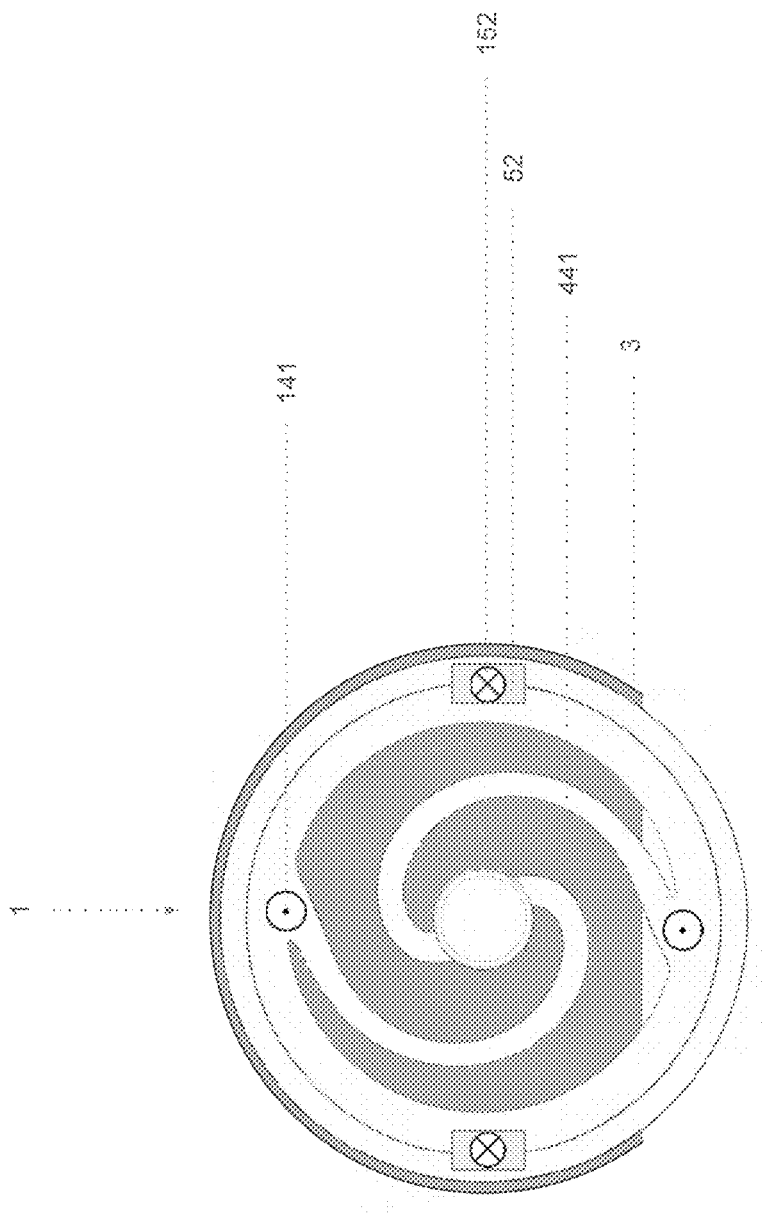
FIG. 33 is a cutoff top view of the expandable grip with edge central magnet placement in accordance with illustrative embodiments of the invention.

FIG. 33 illustrates another embodiment where multiple magnets 52 have been moved to the edge of the expandable grip 1, which has only two elastic elements 441. Contrary to the discussion of FIG. 31, the device 1 of FIG. 33 advantageously provides sufficient magnet placement area to create appropriate magnetic forces 152 to counteract the expansion forces 141 without increasing the thickness of the device 1. However, the magnets 52 are near the horizontal center of the device and may still exert a central magnetic force 152 when a kick angle 301 is created by the user as illustrated in FIG. 32. Also, the embodiment shown in FIG. 33 places magnets 52 far away from elastic element 441 connection points 62 and therefore are less efficient at retaining the device in the collapsed state as previously discussed.

Looking at FIG. 33, FIG. 31, and FIG. 21 in conjunction with the discussion of mechanical advantage of distance between the upward force of the elastic elements 441 against the downward force of the magnets 50, 51, various embodiments preferably place the magnets 50 and 51 along the edges of the elastic array frame 401. Taking in to account that there may be outside force against the top of the device (e.g., brushing against a pocket or fingertip) reinforces the strategy to distribute multiple magnetic forces around the edge of the device to counteract an upward force which could occur on any edge of the top.

Taken in their entirety, it can be seen from the figures and descriptions presented regarding magnet placement that illustrative embodiments advantageously position primary magnets 50 substantially opposite of the kick area 300 (e.g., if the kick area 300 is in the southern hemisphere, the magnets are in the northern hemisphere) and the secondary magnets 51 positioned near the kick area 300 (while managing other desirable characteristics of the device 1). In some embodiments, the secondary magnets 51 are positioned such that they are not in direct contact with the baseplate 3 when the kick angle 301 is created. Instead, the secondary magnets 51 may be placed slightly more towards the horizontal to prevent a very strong secondary magnetic force 151 remaining, which could disrupt expansion.

Figure 25:
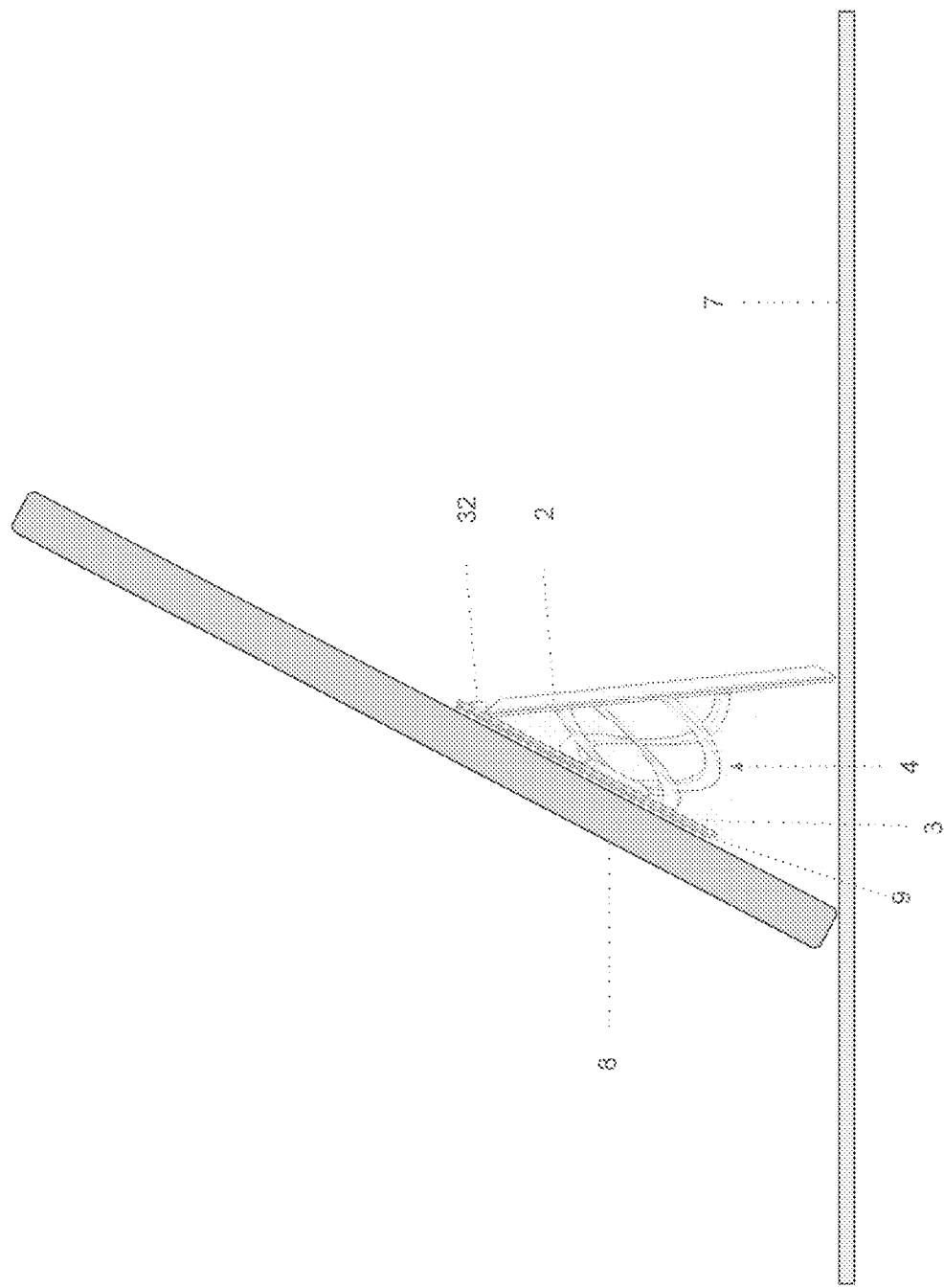
FIG. 25 is a side view of the expandable grip in stand mode, as the expandable grip is coupled to the back of a mobile device in a portrait orientation in accordance with illustrative embodiments of the invention.
Figure 26:
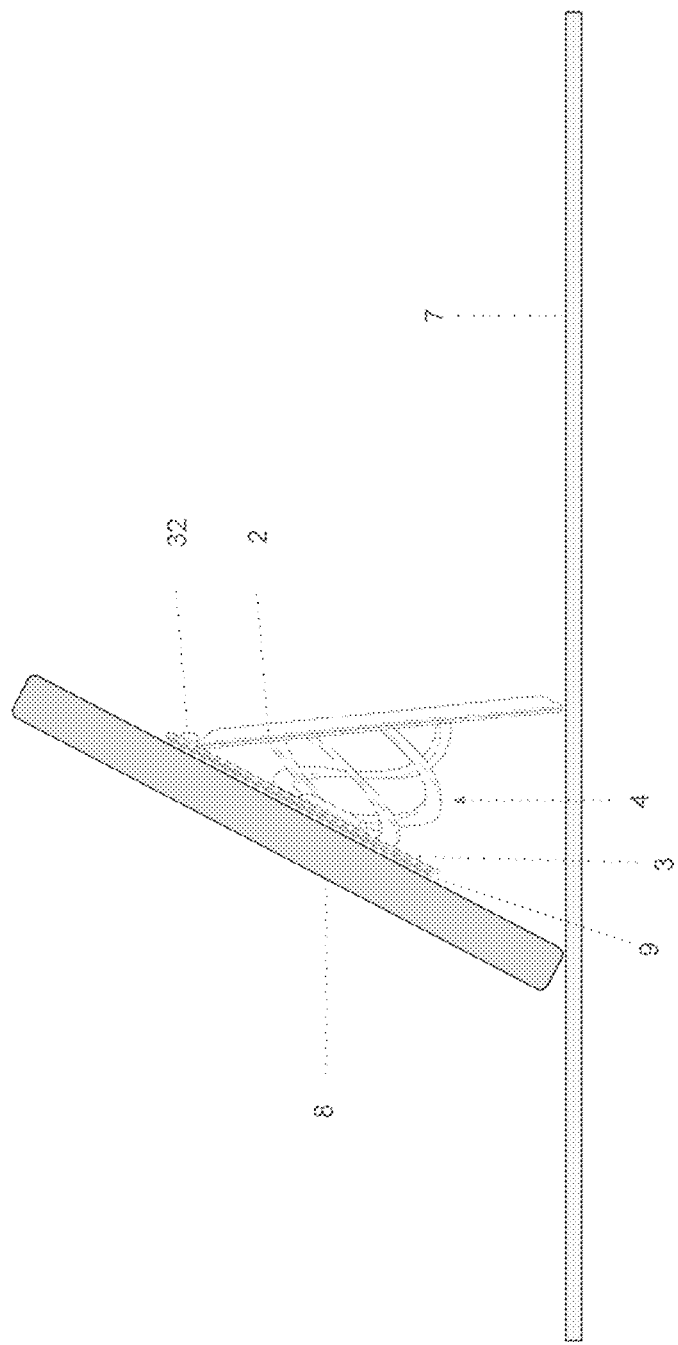
FIG. 26 is a side view of the expandable grip in stand mode, as the expandable grip is coupled to the back of a mobile device in a landscape orientation in accordance with illustrative embodiments of the invention.

As illustrated in FIG. 6, in various embodiments, the expansion of the expandable grip 1 is initiated by pressing the top 100 over the kick area 300. This simplistic opening mechanism advantageously allows the user 6 to expand the device 1 with one hand (and even with just one finger) while their other hand may be holding something, in a pocket, or otherwise resting. The user 6 may then position their fingers around the virtual solid volume defined by the elastic array 4 to grasp the expandable grip 1 without the use of their other hand. Alternatively, after one-handed expansion, the user 6 may use a finger of the same hand to push the top 100 of the expandable grip 1 in to a position where it is captured by a detent 32 to create a wedge shape which can be used to prop up a mobile device on a flat surface as shown in FIG. 25 and FIG. 26.

FIGS. 34A-34D show a process of using the expandable grip as a grip in accordance with illustrative embodiments. FIG. 34A shows the user coupling the expandable grip with a mobile device (e.g., using an adhesive). FIG. 34B shows the user transitioning the expandable grip from a collapsed position to an expanded position by depressing the top over the kick area (e.g., using just the user's thumb). FIG. 34C shows the expandable grip mounted to the mobile device in the neutral expanded position. In this position, a virtual solid volume is created by the elastic array 4 that is comfortable to grip. The virtual solid volume provides sufficient distance between different elastic elements 441 such that the user's finger does not slip through the elements 441. Furthermore, the elements 441 are configured not to cut the user's finger or to make transitioning from the expanded position back to the collapsed configuration overly difficult. Accordingly, in various embodiments, the elements 441 are formed of a given material, have a certain thickness, and have smoothed edges as described previously. FIG. 34D shows the user positioning their fingers between the top and the baseplate to be used as a comfortable grip for their mobile device. Optionally, to return the device 1 to the collapsed configuration, the user 6 may remove their fingers and press the top 100 down.

It should be noted that the process shown in FIGS. 34A-34D is simplified from a longer process that normally would be used to expand and use the grip 1. Accordingly, the process of expanding and using the grip 1 may have many steps that those skilled in the art likely would use. In addition, some of the steps may be performed in a different order than that shown. For example, the grip may be expanded prior to coupling with the mobile device. Additionally, or alternatively, some of the steps may be performed at the same time or skipped altogether. For example, when the grip 1 is integrated into the mobile device or a case thereof, the step of coupling the grip 1 to the device or case may be skipped. Those skilled in the art therefore can modify the process as appropriate.

FIGS. 35A-35D show a process for expanding the expandable grip 1 and using it in a stand configuration for viewing the mobile device. FIG. 35A shows the user 6 applying the expandable grip to the mobile device (e.g., using the adhesive). FIG. 35B shows the user expanding the expandable grip by depressing the top over the kick area. FIG. 35C shows the expandable grip mounted to the mobile device expanded to its neutral position. FIG. 35D shows the user positioning the top of the expandable grip 1 so that it is captured by the detent 32 (e.g., pushing the top 100 with a single finger). The wedge shape can be used to prop the mobile device up so it can be easily viewed as shown in FIG. 25 and FIG. 26.

It should be noted that the process shown in FIGS. 35A-35D is simplified from a longer process that normally would be used to expand and use the grip 1. Accordingly, the process of expanding and using the grip 1 may have many steps that those skilled in the art likely would use. In addition, some of the steps may be performed in a different order than that shown. For example, the grip may be expanded prior to coupling with the mobile device. Additionally, or alternatively, some of the steps may be performed at the same time or skipped altogether. For example, when the grip 1 is integrated into the mobile device or a case thereof, the step of coupling the grip 1 to the device or case may be skipped. Those skilled in the art therefore can modify the process as appropriate.

Figure 36:
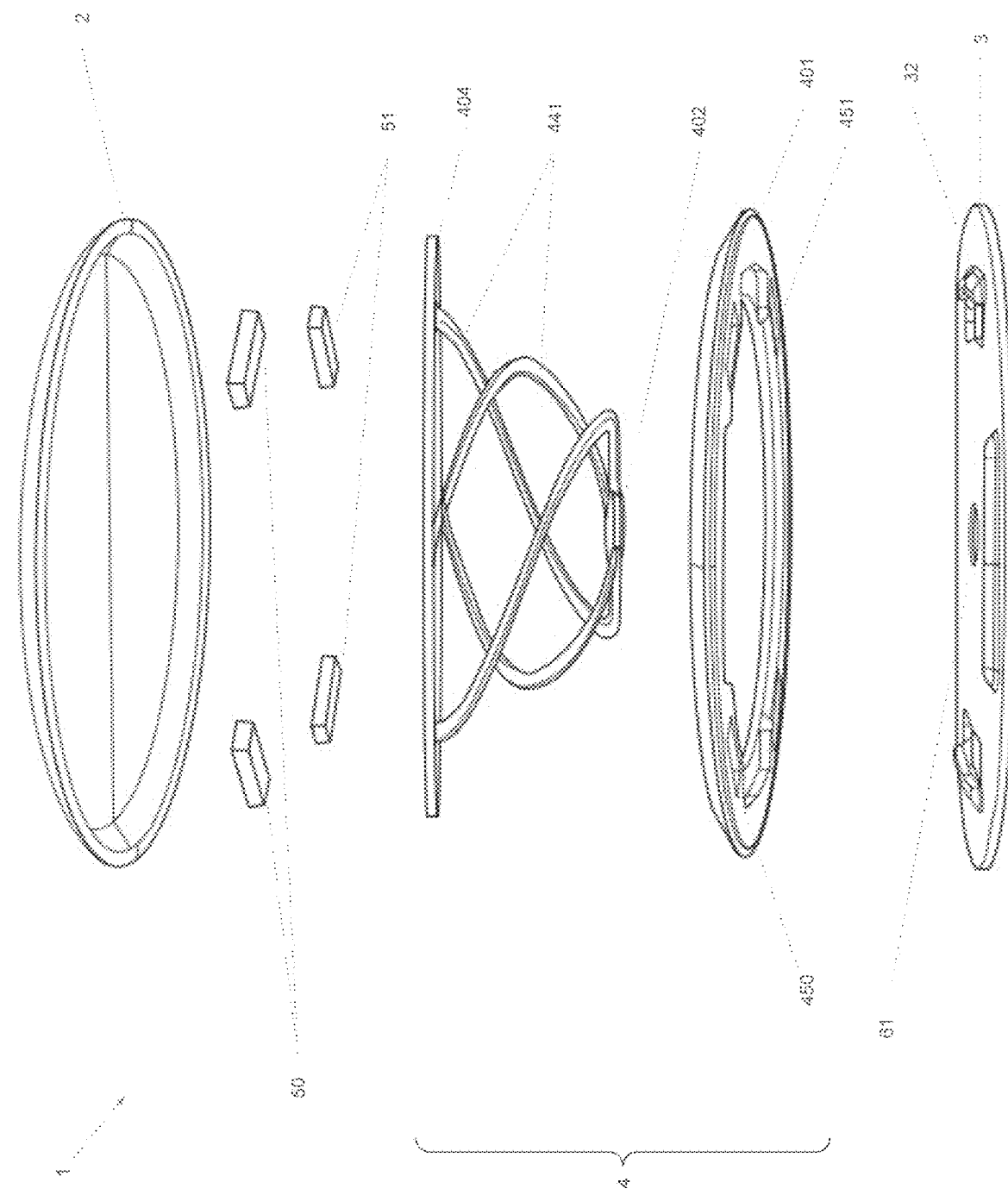
FIG. 36 is an exploded view of an alternative embodiment of the expandable grip in accordance with illustrative embodiments of the invention.

FIG. 36 shows an exploded view of an alternative embodiment of the grip 1 in accordance with illustrative embodiments. In comparing FIG. 36 to FIG. 1, it can be seen the primary difference is that the elastic array frame 401 may be physically separated from the elastic elements 441. In this embodiment, the elastic elements 441 may be connected on the top side to an elastic array subframe 404. The elastic array subframe 404 sits on top of (or inside) the elastic array frame 401 after assembly. After the cap 2 is attached to the elastic array frame 401, as described previously, the cap 2 mechanically encloses the elastic array subframe 404 within the elastic array frame 401, and mechanically attaches the two together. Illustrative embodiments may thus advantageously form the elastic elements 441 from a different material than the elastic array frame 401. For example, it may be advantageous to have the elastic array frame 401 formed from plastic so it is flexible and slightly compressible. Additionally, it may be advantageous for the elastic elements 441 to be formed from metal or coated metal. Some embodiments (e.g., shown in FIG. 36) provide an elegant method for using metallic core elastic elements 441 (and the elastic subframe 404) that are mechanically attached to a plastic elastic array 4 frame 401.

Figure 38:
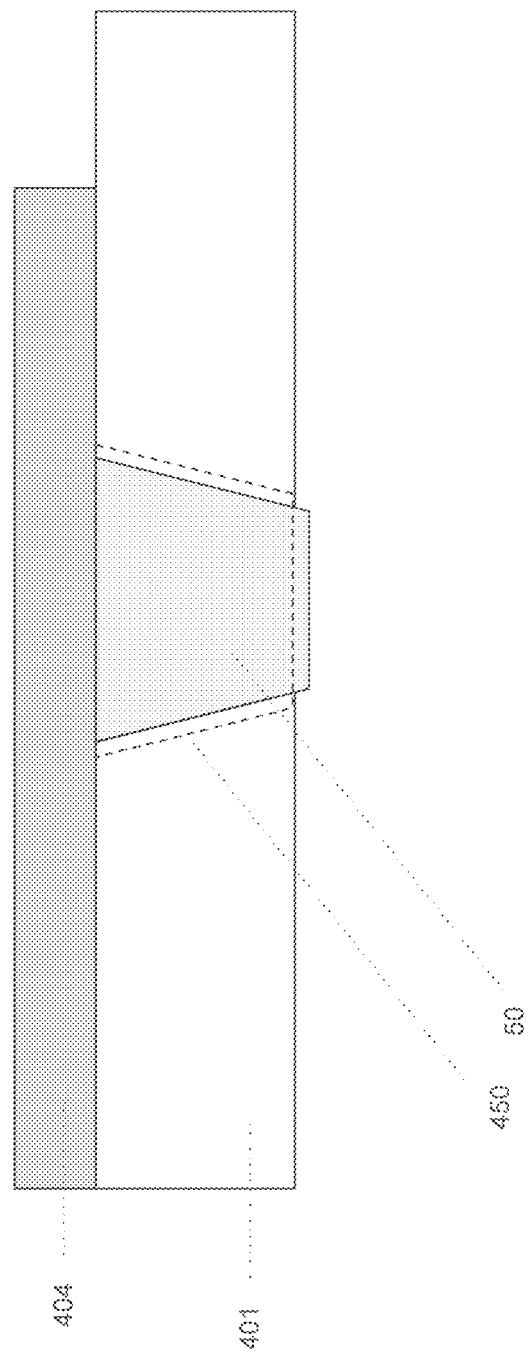
FIG. 38 shows a cutoff sideview of an elastic array frame in accordance with illustrative embodiments.

The primary 50 and the secondary 51 magnets are positioned with the elastic array frame 401 in the primary seat 450 and the secondary seat 451, respectively. These seats (or holes in the frame) act to secure the magnets 50, 51 in place and position them both horizontally (i.e. with respect to expansion forces 141) but also vertically to make reliable contact with the baseplate 3 (i.e., the magnets don't stick out too far and don't add thickness to the device 1). Furthermore, the magnets are uniformly positioned (for stability), and that all are mechanically stable when making many expansion/contraction cycles. In order to vertically secure the magnets 50, 51, the seats 450, 451, may be chamfered (or angled) so that the magnets may easily be placed in to the seats from the top of the elastic array frame 401, but cannot go through the other side of the elastic array frame without physically distorting the elastic array frame material (which would require force beyond the normal use of the device 1). The magnets 50, 51 may also have a corresponding chamfered shape. Using this method, the magnets 50, 51 are "sandwiched" between this chamfer on the bottom and the cap (or elastic array subframe 404) on the top, thereby securely and reliably locking the position of the magnets in the device. FIG. 38 is a cutoff sideview of an elastic array frame 401 using the array subframe 404 in accordance with illustrative embodiments. FIG. 38 further illustrates a chamfered primary magnet 50 sandwiched between the subframe 404 and chamfered primary seat 450. It can be seen in FIG. 38 how this sandwiched/chamfered seating system reliably secures the magnets 50, 51 within the elastic array frame 401.

Figure 37:
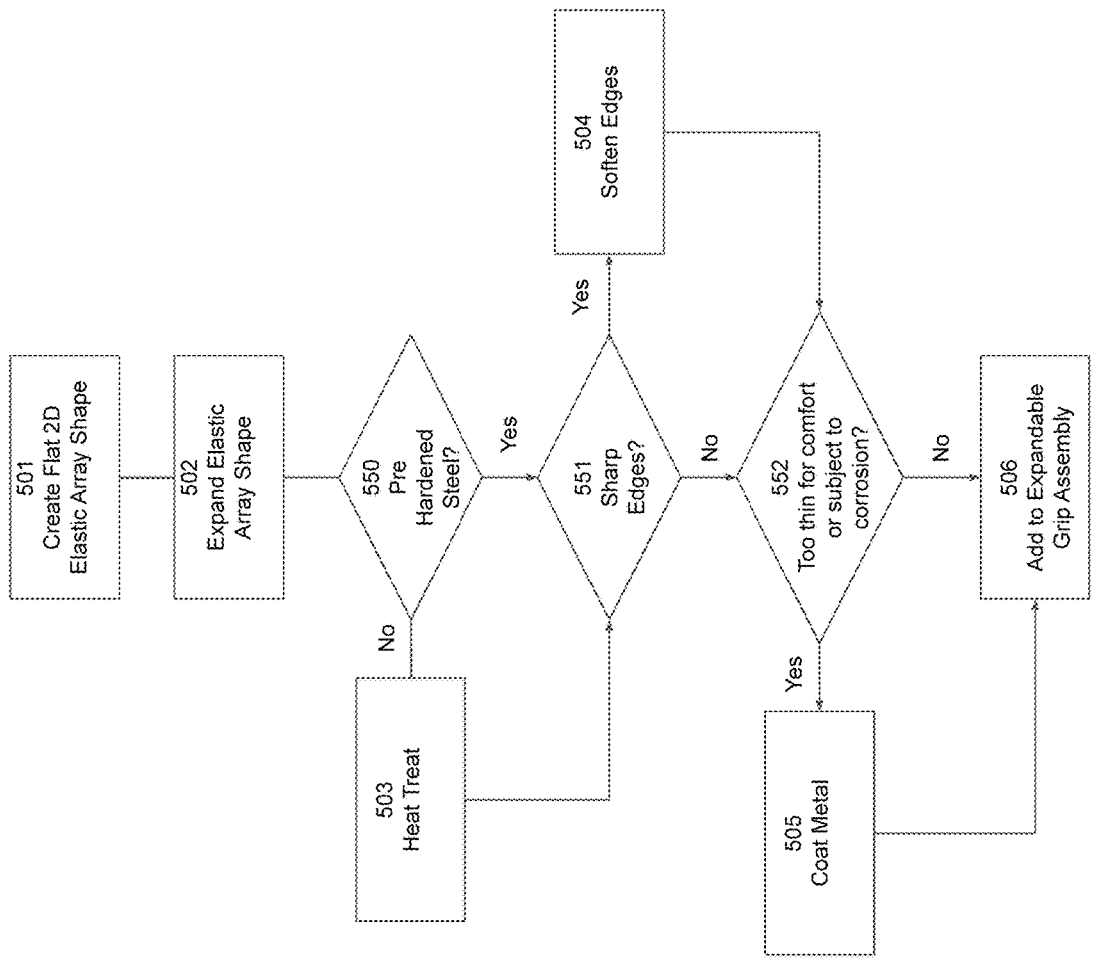
FIG. 37 shows a process of creating the elastic array in accordance with illustrative embodiments of the invention.

FIG. 37 shows a process of manufacturing the elastic array 4, and/or a set of elastic elements 441 attached to an elastic array subframe 404 in accordance with illustrative embodiments. Various embodiments may use steel as the elastic element core 443. The process begins at step 501, which forms an elastic array 4 from a steel sheet (e.g., using either a die, chemical etching, waterjet, laser or other high precision technology). Although having some thickness, this sheet is very thin, and for the purposes of this discussion, will be referred to as a 2D shape. The 2D shape may resemble the top down views of the elastic array, such as that shown in FIG. 3 or FIG. 16D. The process proceeds to step 502, which expands the elastic array shape (e.g., using a press, progressive die, or other mechanical tool which pushes the center of the 2D elastic array 4 outwards to create a 3D shape similar to what is shown in FIG. 1). If a pre-hardened steel is used at step 550, then there is no need to heat treat the steel to harden it. Alternatively, if a pre-hardened steel is not used, the process may proceed to step 503, which heat treats the steel with any of the well-known steel tempering technologies.

The process proceeds to step 551, which asks if the 3D shape has sharp edges. If the 3D array 4 has sharp edges from previous steps, then the edges are softened at step 504 (e.g., using a tumbler, sanding or other edge smoothing devices). Finally, if the steel elastic array 4 is so thin that it is uncomfortable against the user's fingers, or the steel used is subject to corrosion, the elastic array 4 or some section of the elastic array 4, such as just the elastic elements 441, may be coated 505 with a plastic, rubber or other durable coating to create an elastic element coating 442. Now that a hardened steel elastic array 4 has been created and has elastic elements 441 with a soft curved edge 63 (e.g., from the breaking and coating) the elastic array 4 can be assembled with the remaining components of the expandable grip 1.

It should be noted that the process shown in FIG. 37 is simplified from a longer process that normally would be used manufacture the elastic array. Accordingly, the process of manufacturing the elastic array may have many steps that those skilled in the art likely would use. In addition, some of the steps may be performed in a different order than that shown. Additionally, or alternatively, some of the steps may be performed at the same time or skipped altogether. For example, in some embodiments, the sharp edges are not softened in step 504. Those skilled in the art therefore can modify the process as appropriate.

It should be apparent that various embodiments advantageously enable a low-profile and thin device. The device 1, when in the collapsed configuration, may have a total thickness of 5 mm, 4 mm, or less. By using all of the various above disclosed advantages, the device 1 may have a total thickness of 3 mm or less in the collapsed configuration. Illustrative embodiments advantageously enable the manufacture of an expandable grip 1 using magnets to keep the grip 1 in the collapsed configuration while maintaining a total thickness (Tt) of 5 mm, 4 mm, or less. Furthermore, illustrative embodiments advantageously enable the manufacture of an expandable grip 1 having a biasing element to expand into the expanded configuration while maintaining a total thickness (Tt) of 5 mm, 4 mm, or less. Significantly, illustrative embodiments enable a thin grip that has a relatively tall neutral expanded position (the position where the frame/top 100 is not applying force back towards the base 3) of about 8 mm to about 13 mm. Accordingly, the user's fingers that are positioned around the array 4 are gently and securely compressed between the top 100 and the base 3, but not crushed or squeezed by the device when it is used as a grip. Alternatively designed mobile grips may achieve a similar low thickness but suffer from lack of comfort (e.g., steel rings), lack of durability (e.g., designs which utilize degradable elastic or rubber straps), inability to open with one hand, and/or do not offer dynamic usage (e.g., ability to grip around any angle, use as a portrait stand, etc.) compared to the expandable grip 1. Also, due to the interesting nature of expanding and contracting, the expandable grip 1 may be more enjoyable to use than alternatively designed mobile grips.

One skilled in the art will realize the embodiments described herein may be embodied in other specific forms without departing from the spirit or essential characteristics thereof. The foregoing embodiments are therefore to be considered in all respects illustrative rather than limiting of the embodiments described herein.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used.

Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the above discussion discloses various exemplary embodiments of the invention, it should be apparent that those skilled in the art can make various modifications that will achieve some of the advantages of the invention without departing from the true scope of the invention.

Submitted with the present specification is an appendix with figures showing multiple views of designs for the grip 1, array 4, baseplate 3, top 100, elastic elements 441, and/or detents 33, among other things, in accordance with illustrative embodiments. In various figures, the broken lines represent contour lines, environmental features, or other parts of the design that form no part of a claimed design. Applicant reserves the right to pursue one or more design patent applications using one or more figures from the appendix as support for a claimed design.

In the appendix:

FIGS. 1, 10, 19, 28, 37, 46, 55, 64, 73, and 82 show a top perspective view of the front-left of the device or array, in accordance with illustrative embodiments.

FIGS. 2, 11, 20, 29, 38, 47, 56, 65, 74, and 83 show a top perspective view of the back-right of the device or array, in accordance with illustrative embodiments.

FIGS. 3, 12, 21, 30, 39, 48, 57, 66, 75, and 84 show a top view of the device or array, in accordance with illustrative embodiments.

FIGS. 4, 13, 22, 31, 40, 49, 58, 67, 76, and 85 show a bottom view of the device or array, in accordance with illustrative embodiments.

FIGS. 5, 14, 23, 32, 41, 50, 59, 68, 77, and 86 show a right-side view of the device or array, in accordance with illustrative embodiments.

FIGS. 6, 15, 24, 33, 42, 51, 60, 69, 78, and 87 show a left-side view of the device or array, in accordance with illustrative embodiments.

FIGS. 7, 16, 25, 34, 43, 52, 61, 70, 79, and 88 show a rear view of the device or array, in accordance with illustrative embodiments.

FIGS. 8, 17, 26, 35, 44, 53, 62, 71, 80, and 89 show a front view of the device or array, in accordance with illustrative embodiments.

FIGS. 9, 18, 27, 36, 45, 54, 63, 72, 81, and 90 show a bottom perspective view of the front-left of the device or array, in accordance with illustrative embodiments.

FIGS. 1-36 show the device with a connector that couples the elastic elements in broken lines, in accordance with illustrative embodiments. Surface shading and contours are also shown in broken lines.

FIGS. 37-72 shown the array with a connector that couples the elastic elements in unclaimed broken lines, in accordance with illustrative embodiments.

FIGS. 73-90 show the baseplate in solid lines, in accordance with illustrative embodiments. The array and top are shown in broken lines. Surface shading and contours are also shown in broken lines.

What is claimed is:

1. A method of operating an extendable grip for a mobile device, the method comprising:
   providing an extendable grip, the extendable grip having:
      a base coupled with a mobile device or a case of a mobile device, the base having a truncated portion,
      a plurality of elastic elements having a first end and a second end, the plurality of elastic elements coupled with the base at the first end, the plurality of elastic elements coupled with a top at the second end, the plurality of elastic elements configured to provide an expansion force that biases the top away from the base, the base and the top configured to produce a magnetic force that biases the top and the base towards one another;
   transitioning from a collapsed position, in which the plurality of elastic elements are compressed, to a neutral position, in which the plurality of elastic elements are at a stable extended position, by pressing down on a portion of the top that overhangs the truncated portion,
   wherein the plurality of elastic elements do not overlap in the collapsed position.

2. The method as defined by claim 1, wherein the top includes one or more magnets, the one or more magnets configured to provide the magnetic force that biases the top towards the base.

3. The method as defined by claim 1, wherein transitioning is performed by a user while holding the mobile device using a finger from the same hand that holds the mobile device, the transitioning being caused by providing a single force.

4. The method as defined by claim 1, wherein the elastic elements extend 10 mm to 13 mm from the base in the neutral position, and the top provides a compression force against a user's fingers when the user grips the plurality of elastic elements.

5. The method as defined by claim 1, further comprising using the extendable grip as a stand.

6. A device comprising:
   a base having at least one magnet;

a coupling portion for coupling the base to a mobile device or a case of a mobile device;

an elastic array configured to transition from a collapsed state to an expanded state, the elastic array further configured to move a button from a collapsed position to an expanded position, the elastic array having at least one magnet therein, the at least one magnet configured to retain the elastic array in the collapsed state;

wherein the total height of the device in the collapsed state is 4 mm or less.

7. The device of claim 6, wherein the elastic array comprises a plurality of elastic elements that each have a cross-sectional width to cross-sectional thickness ratio of greater than 1:1 and less than 15:1.

8. The device of claim 6, wherein the elastic array lays flat in the collapsed state.

9. The device of claim 6, wherein the elastic array forms a virtual solid volume.

10. The device of claim 6, wherein the elastic array comprises a top.

11. The device of claim 10, wherein the at least one magnet of the elastic array is positioned in the top.

12. The device of claim 10, wherein the top includes a frame and the button.

13. The device of claim 6, wherein the elastic array includes elastic members, the elastic members configured to be non-linear in the expanded position.

\* \* \* \* \*